(12) United States Patent
Maruyama et al.

(10) Patent No.: US 10,414,980 B2
(45) Date of Patent: *Sep. 17, 2019

(54) LIQUID-CRYSTAL DISPLAY

(71) Applicant: DIC Corporation, Tokyo (JP)

(72) Inventors: Kazunori Maruyama, Kita-adachi-gun (JP); Takashi Kitsunai, Kita-adachi-gun (JP); Shinji Ogawa, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 15/328,178

(22) PCT Filed: Jul. 23, 2015

(86) PCT No.: PCT/JP2015/070958
§ 371 (c)(1),
(2) Date: Jan. 23, 2017

(87) PCT Pub. No.: WO2016/017521
PCT Pub. Date: Feb. 4, 2016

(65) Prior Publication Data
US 2017/0218270 A1    Aug. 3, 2017

(30) Foreign Application Priority Data

Jul. 29, 2014 (JP) .............................. 2014-153824

(51) Int. Cl.
| | | |
|---|---|---|
| *G02F 1/1333* | (2006.01) | |
| *C09K 19/30* | (2006.01) | |
| *C09K 19/42* | (2006.01) | |
| *G02F 1/1368* | (2006.01) | |
| *C09K 19/34* | (2006.01) | |
| *C09K 19/54* | (2006.01) | |
| *G02F 1/1337* | (2006.01) | |
| *G02F 1/1343* | (2006.01) | |
| *G02F 1/1362* | (2006.01) | |
| *C09K 19/12* | (2006.01) | |

(52) U.S. Cl.
CPC ...... *C09K 19/3066* (2013.01); *C09K 19/3402* (2013.01); *C09K 19/42* (2013.01); *C09K 19/54* (2013.01); *G02F 1/1337* (2013.01); *G02F 1/1368* (2013.01); *G02F 1/13439* (2013.01); *G02F 1/134309* (2013.01); *G02F 1/136286* (2013.01); *C09K 2019/122* (2013.01); *C09K 2019/123* (2013.01); *C09K 2019/3004* (2013.01); *C09K 2019/3009* (2013.01); *C09K 2019/3016* (2013.01); *C09K 2019/3027* (2013.01); *C09K 2019/3036* (2013.01); *C09K 2019/3037* (2013.01); *C09K 2019/3422* (2013.01); *G02F 1/134363* (2013.01); *G02F 2001/133738* (2013.01); *G02F 2001/134372* (2013.01); *G02F 2201/121* (2013.01); *G02F 2201/123* (2013.01)

(58) Field of Classification Search
CPC ............ C09K 19/3066; C09K 19/3402; C09K 19/42; C09K 19/54; C09K 2019/122; C09K 2019/123; C09K 2019/3004; C09K 2019/3009; C09K 2019/3016; C09K 2019/3027; C09K 2019/3036; C09K 2019/3037; C09K 2019/3422; G02F 1/1333; G02F 1/1337; G02F 1/134309; G02F 1/13439; G02F 1/136286; G02F 1/1368; G02F 1/134363; G02F 2001/133738; G02F 2001/134372; G02F 2201/121; G02F 2201/123
USPC ................................................... 252/299.62
See application file for complete search history.

(56) References Cited

U.S. PATENT DOCUMENTS

| | | |
|---|---|---|
| 6,497,828 B1 | 12/2002 | Hirschmann et al. |
| 8,368,067 B2 | 2/2013 | Uchiyama et al. |
| 8,860,912 B2 | 10/2014 | Kaneoya et al. |
| 8,885,124 B2 | 11/2014 | Kaneoya et al. |
| 8,961,823 B2 | 2/2015 | Gotoh et al. |
| 9,120,968 B2 | 9/2015 | Kaneoya et al. |

(Continued)

FOREIGN PATENT DOCUMENTS

| | | |
|---|---|---|
| CN | 101133138 A | 2/2008 |
| CN | 101276106 A | 10/2008 |

(Continued)

OTHER PUBLICATIONS

International Search Report dated Oct. 20, 2015, issued in counterpart International Application No. PCT/JP2015/070958 (1 page).

(Continued)

*Primary Examiner* — Geraldina Visconti

(74) *Attorney, Agent, or Firm* — Westerman, Hattori, Daniels & Adrian, LLP

(57) ABSTRACT

This invention provides an FFS type liquid crystal display containing one type or two or more types of compounds selected from the group of compounds represented by General Formula (i), General Formula (ii), and General Formula (iii) and one type or two or more types of compounds selected from compounds represented by General Formula (II). This display makes it possible to realize excellent display characteristics without deteriorating various liquid crystal display characteristics such as dielectric anisotropy, viscosity, nematic-phase maximum temperature, nematic-phase stability at low temperatures, or $\gamma_1$ and the display burn-in characteristics.

8 Claims, 5 Drawing Sheets

(56) References Cited

U.S. PATENT DOCUMENTS

| | | | |
|---|---|---|---|
| 9,376,618 B2* | 6/2016 | Ogawa | C09K 19/12 |
| 9,464,229 B2* | 10/2016 | Kurisawa | C09K 19/42 |
| 10,031,384 B2 | 7/2018 | Ogawa et al. | |
| 2001/0010576 A1 | 8/2001 | Lee et al. | |
| 2001/0048501 A1 | 12/2001 | Kim et al. | |
| 2003/0117558 A1 | 6/2003 | Kim et al. | |
| 2005/0280762 A1 | 12/2005 | Lee et al. | |
| 2006/0257763 A1 | 11/2006 | Araki | |
| 2008/0239181 A1 | 10/2008 | Jin | |
| 2009/0268150 A1 | 10/2009 | Hattori et al. | |
| 2009/0309066 A1 | 12/2009 | Klasen-Memmer et al. | |
| 2010/0140614 A1 | 6/2010 | Uchiyama et al. | |
| 2010/0271569 A1 | 10/2010 | Ohkuma et al. | |
| 2011/0116017 A1 | 5/2011 | Gere | |
| 2011/0193020 A1 | 8/2011 | Klasen-Memmer et al. | |
| 2011/0248216 A1 | 10/2011 | Klasen-Memmer et al. | |
| 2011/0297881 A1 | 12/2011 | Hirata et al. | |
| 2012/0236246 A1 | 9/2012 | Furusato et al. | |
| 2012/0261614 A1 | 10/2012 | Goto et al. | |
| 2012/0268706 A1 | 10/2012 | Goebel et al. | |
| 2012/0326084 A1 | 12/2012 | Klasen-Memmer et al. | |
| 2013/0169906 A1 | 7/2013 | Nakanishi et al. | |
| 2013/0183460 A1 | 7/2013 | Klasen-Memmer et al. | |
| 2013/0193377 A1 | 8/2013 | Saigusa et al. | |
| 2013/0207039 A1 | 8/2013 | Hattori et al. | |
| 2013/0265527 A1 | 10/2013 | Takeuchi et al. | |
| 2013/0329168 A1 | 12/2013 | Chung et al. | |
| 2014/0016075 A1 | 1/2014 | Iwata et al. | |
| 2014/0104522 A1 | 4/2014 | Onda et al. | |
| 2014/0104524 A1 | 4/2014 | Lee et al. | |
| 2014/0218667 A1 | 8/2014 | Miyachi et al. | |
| 2015/0002773 A1 | 1/2015 | Ogawa et al. | |
| 2015/0070646 A1 | 3/2015 | Kim et al. | |
| 2015/0275089 A1 | 10/2015 | Katano et al. | |
| 2016/0272889 A1* | 9/2016 | Ogawa | C09K 19/0403 |
| 2017/0210988 A1* | 7/2017 | Maruyama | C09K 19/3066 |
| 2017/0218270 A1 | 8/2017 | Maruyama et al. | |

FOREIGN PATENT DOCUMENTS

| | | |
|---|---|---|
| CN | 102264867 A | 11/2011 |
| CN | 103476905 A | 12/2013 |
| JP | S5170602 A | 6/1976 |
| JP | 11-202356 A | 7/1999 |
| JP | H11-202356 A | 7/1999 |
| JP | 2000-019321 A | 1/2000 |
| JP | 2000-192040 A | 7/2000 |
| JP | 2002-31812 A | 1/2002 |
| JP | 2002-309255 A | 10/2002 |
| JP | 2003-233083 A | 8/2003 |
| JP | 2005-281559 A | 10/2005 |
| JP | 2006-165528 A | 6/2006 |
| JP | 2006-317602 A | 11/2006 |
| JP | 2007-096055 A | 4/2007 |
| JP | 2009-058546 A | 3/2009 |
| JP | 2009-109542 A | 5/2009 |
| JP | 2009-163014 A | 7/2009 |
| JP | 2010-503733 A | 2/2010 |
| JP | 2010-189560 A | 9/2010 |
| JP | 2010-250117 A | 11/2010 |
| JP | 2010-256509 A | 11/2010 |
| JP | 2010535910 A | 11/2010 |
| JP | 2011-141356 A | 7/2011 |
| JP | 2011-186043 A | 9/2011 |
| JP | 2013-144796 A | 7/2013 |
| JP | 2013-173915 A | 9/2013 |
| JP | 5288224 B1 | 9/2013 |
| JP | 2014-81450 A | 5/2014 |
| KR | 20120048434 A | 5/2012 |
| KR | 20120120992 A | 11/2012 |
| TW | 200808943 A | 2/2008 |
| TW | 200819520 A | 5/2008 |
| TW | 2008-29965 A | 7/2008 |
| TW | 200918646 A | 5/2009 |
| TW | 2011-24479 A | 7/2011 |
| TW | 201139343 A | 11/2011 |
| TW | 2011-42502 A | 12/2011 |
| TW | 2012-45426 A | 11/2012 |
| TW | 2013-21484 A | 6/2013 |
| WO | 2010/095506 A1 | 8/2010 |
| WO | 2011/092973 A1 | 8/2011 |
| WO | 2012/053323 A1 | 4/2012 |
| WO | 2012/117875 A1 | 9/2012 |
| WO | 2012/144321 A1 | 10/2012 |
| WO | 2013024749 A1 | 2/2013 |
| WO | 2013/115164 A1 | 8/2013 |
| WO | 2013/133383 A1 | 9/2013 |
| WO | 2014/069550 A1 | 5/2014 |

OTHER PUBLICATIONS

Park et al., "Comparison of the Process Margin between FFS and IPS mode", Proceedings of The 18th International Display Workshops, ISSN-L 1883-2490, Dec. 9, 2011, vol. 3, pp. 1561-1562, Cited in Japanese Office Action dated May 26, 2016 issued in counterpart of JP Patent Application No. 2014-153824 (2 pages).

Seen et al., "A new liquid Crystal Fringe-Field Switching Device with Superior Outdoor Readability", Japanese Journal of Applied Physics, ISSN: 00214922, Aug. 2010, vol. 49, No. 8, pp. 084302-1-084302-3, cited in Japanese Office Action dated May 26, 2016 issued in counterpart of JP Patent Application No. 2014-153824 (3 pages).

International Search Report dated Oct. 20, 2015, issued in PCT/JP2015/070947.

Non Final Office Action dated Oct. 2, 2017, issued in U.S. Appl. No. 15/329,331.

International Search Report dated Jan. 27, 2015, issued in Application No. PCT/JP2014/079197.

Non-Final Office Action dated Apr. 21, 2017, issued in U.S. Appl. No. 15/035,652.

Final Office Action dated Aug. 16, 2017, issued in U.S. Appl. No. 15/035,652.

K. Nomura, et al. "Room-temperature fabrication of transparent flexible thin-film transistors using amorphous oxide semiconductors", Nature Publishing Group, vol. 432, 2204, p. 488-492.

Young Jin Lim et al., "High performance transflective liquid crystal display associated with fringe-field switching device", Optics Express, Apr. 25, 2014, vol. 19, No. 9, pp. 8085-8091, cited in Korean Office Action dated Dec. 22, 2014, corresponds to U.S. Appl. No. 14/405,057: (7 pages).

International Search Report dated Dec. 10, 2013, issued in application No. PCT/JP2013/076805(counterpart to U.S. Appl. No. 14/405,057: (3 pages).

Written Opinion dated Dec. 10, 2013, issued in application No. PCT/JP2013/076805(counterpart to U.S. Appl. No. 14/405,057: (4 pages).

International Search Report dated Oct. 20, 2015, issued in application No. PCT/JP2015/071211(counterpart to U.S. Appl. No. 15/329,437: (2 pages).

Non-Final Office Action dated Mar. 7, 2016, issued in U.S. Appl. No. 14/405,057 (14 pages).

Non-Final Office Action dated Jun. 5, 2019, issued in counterpart U.S. Appl. No. 15/329,331 (9 pages).

* cited by examiner

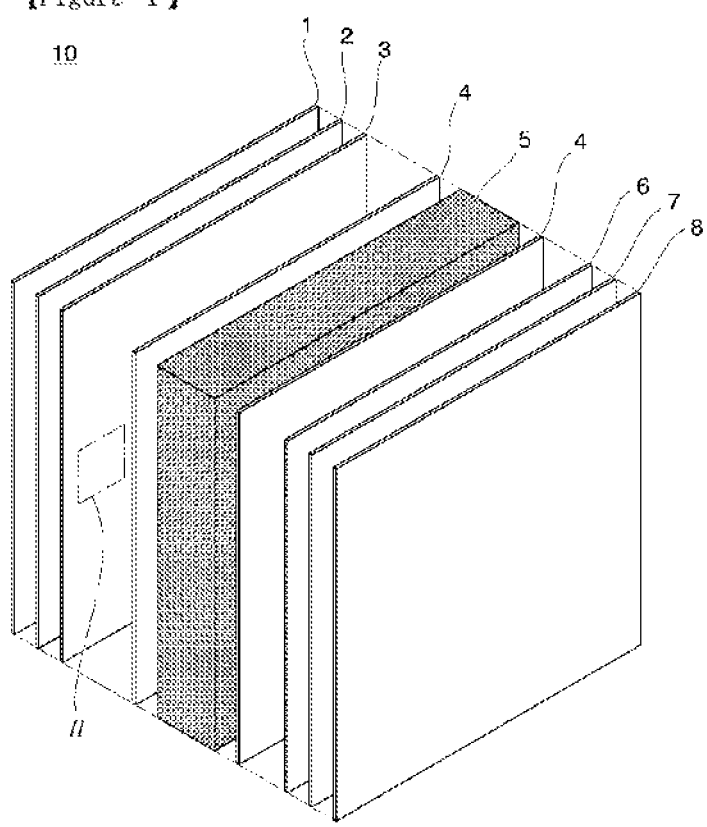
[Figure 1]

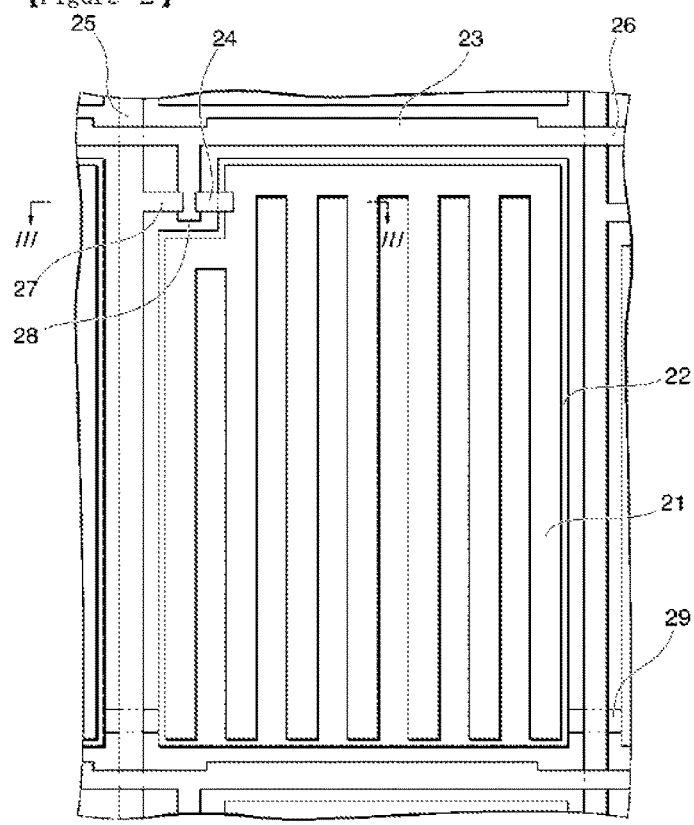
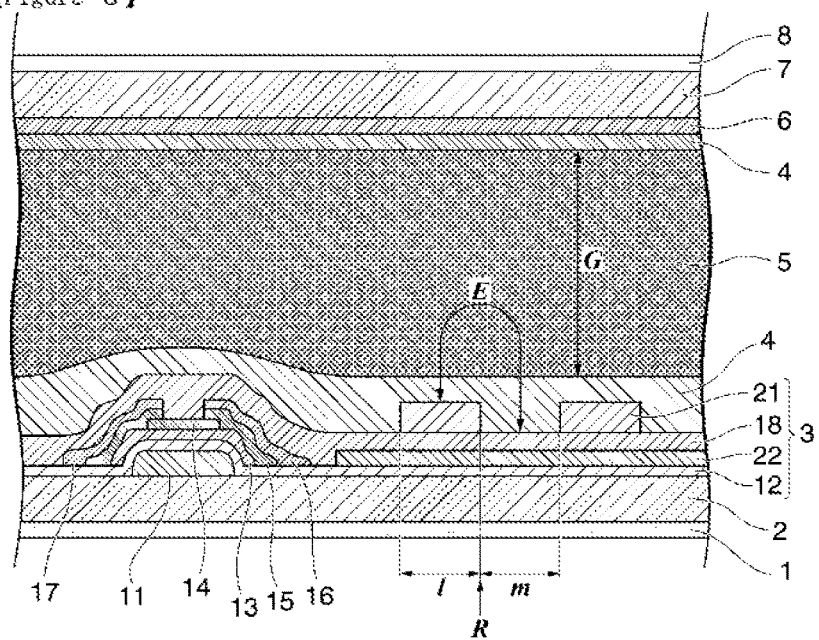

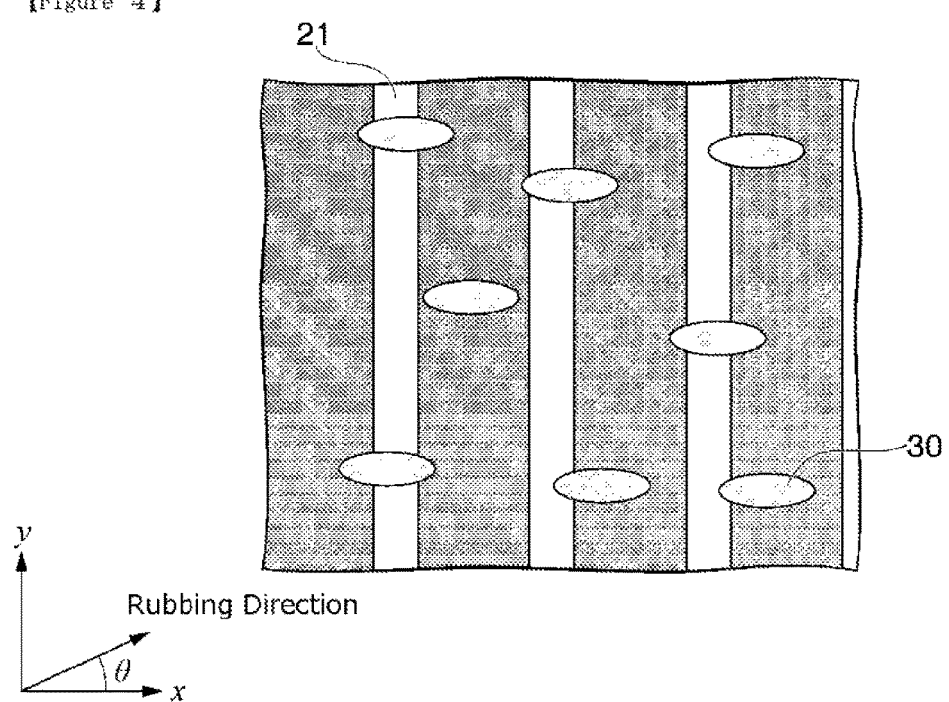
[Figure 4]

[Figure 5]
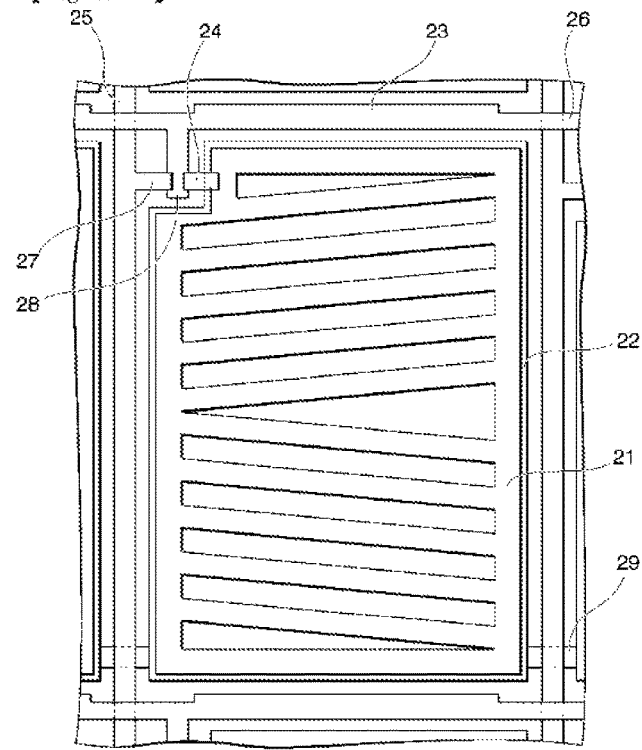
[Figure 6]
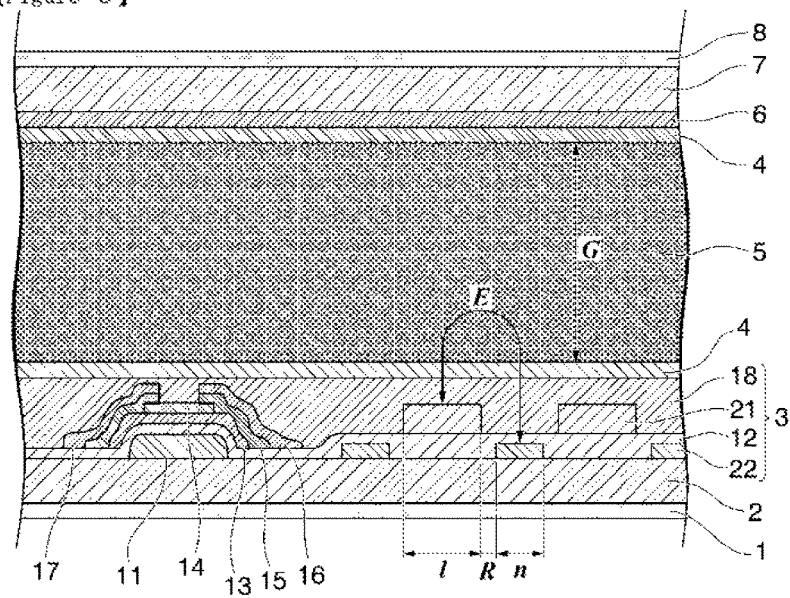

[Figure 7]
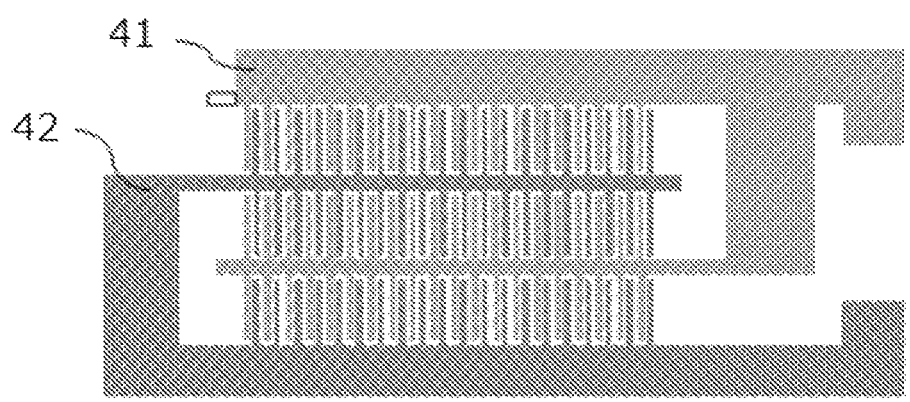

LIQUID-CRYSTAL DISPLAY

TECHNICAL FIELD

The present invention relates to an FFS mode liquid crystal display device using a nematic liquid crystal composition having negative dielectric anisotropy, which has high transmittance and a high opening ratio.

BACKGROUND ART

From the fact that display quality is excellent, active matrix type liquid crystal displays have been put on the market for portable terminals, liquid crystal televisions, projectors, computers and the like. In the active matrix type, thin film transistors (TFT), metal-insulator-metals (MIM), or the like are used for each pixel, and it is important that the liquid crystal compound or the liquid crystal composition used in this type has a high voltage holding ratio. In addition, a liquid crystal display combining a Vertical Alignment (VA) mode, an In-Plane Switching (IPS) mode, and an Optically Compensated Bend, Optically Compensated Birefringence (OCB) mode to obtain wider viewing angle characteristics and an Electrically Controlled Birefringence (ECB) mode reflective liquid crystal display to obtain a brighter display have been proposed. To handle such liquid crystal displays, new liquid crystal compounds or liquid crystal compositions are currently being proposed.

At present, as the liquid crystal display for smartphones, a high-quality fringe field switching mode liquid crystal display device (FFS mode liquid crystal display device) with which is a type of an IPS mode liquid crystal display with excellent visual characteristics is widely used (refer to PTLs 1 and 2). The FFS mode is a mode introduced for improving the low opening ratio and transmittance of the IPS mode, and as the liquid crystal composition used, a material using a p-type liquid crystal composition having positive dielectric anisotropy is widely used from the viewpoint of easily lowering a voltage. In addition, since most applications of the FFS mode are for portable terminals, there is a strong demand for more power saving, and liquid crystal display manufacturers are continuing to carry out active development in this regard, such as adoption of arrays using IGZO.

On the other hand, currently, it is also possible to improve the transmittance by changing a liquid crystal material currently using a p-type material to an n-type material having negative dielectric anisotropy (refer to PTL 3). This is because the FFS mode does not produce a perfect parallel electric field unlike the IPS mode, and in the case of using the p-type material, the liquid crystal molecules close to the pixel electrode tilt along the fringe electric field of the major axis of the liquid crystal molecules, thus the transmittance is deteriorated. On the other hand, in the case of using the n-type liquid crystal composition, since the polarization direction of the n-type composition is the minor axis direction of the molecules, the influence of the fringe electric field simply rotates the liquid crystal molecules along the major axis and the major axis of the molecule is maintained in a parallel arrangement, thus the transmittance does not decrease.

However, although an n-type liquid crystal composition is typical as a liquid crystal composition for VA, the VA mode and the FFS mode are different in all the points of alignment direction, electric field direction, and required optical characteristics. Further, the FFS mode liquid crystal display has the features of the electrode structure as described below and, in the VA mode, electrodes are provided on both of the two substrates, whereas in the FFS mode, electrodes are provided only in the array substrate. Therefore, nothing is known about problems such as burn-in or drip trace for which it is difficult to predict the effects with the related art. Accordingly, even if the liquid crystal composition used for VA is simply used for this purpose, it is difficult to form a high-performance liquid crystal display as required today, and there is a demand to provide an n-type liquid crystal composition optimized for FFS mode.

CITATION LIST

Patent Literature

PTL 1: JP-A-11-202356
PTL 2: JP-A-2003-233083
PTL 3: JP-A-2002-31812

SUMMARY OF INVENTION

Technical Problem

The problem of the present invention is to provide a liquid crystal display using an n-type liquid crystal composition which is able to realize excellent display characteristics by using an FFS mode liquid crystal display which is excellent in various characteristics as a liquid crystal display such as dielectric anisotropy ($\Delta\varepsilon$), viscosity ($\eta$), nematic phase-isotropic liquid transition temperature ($T_{NI}$), nematic phase stability at low temperatures, and rotational viscosity ($\gamma_1$).

Solution to Problem

The inventors of the present invention conducted intensive research in order to solve the problems described above and, as a result of researching the formation of various liquid crystal compositions most suitable for an FFS mode liquid crystal display, the present inventors found that a liquid crystal composition containing a specific liquid crystal compound was useful and completed the present invention.

The present invention provides a liquid crystal display including a first transparent insulating substrate and a second transparent insulating substrate that are disposed so as to face each other, a liquid crystal layer containing a liquid crystal composition, which is interposed between the first substrate and the second substrate, for each pixel on the first substrate, a common electrode containing a transparent-conductive-material; a plurality of gate bus lines and data bus lines disposed in a matrix shape; a thin film transistor provided at an intersection between the gate bus lines and data bus lines; and a pixel electrode containing a transparent-conductive-material, which is driven by the thin film transistor, and alignment layers which induce homogeneous alignment between the liquid crystal layer and each of the first and second substrates, in which an alignment direction of each alignment layer is parallel, a distance R between the pixel electrodes and the common electrode is smaller than a distance G between the first substrate and the second substrate so that the pixel electrodes and a common electrode form fringe electric fields therebetween, the common electrode is disposed closer to the first substrate than the pixel electrodes over nearly the entire surface of the first substrate, and the liquid crystal composition has negative dielectric anisotropy and contains one or more of compounds selected from the group of compounds represented by the following General Formula (i), General Formula (ii), or General Formula (iii) and one or more of compounds selected from the compounds represented by the following General Formula (IV).

[Chem. 1]

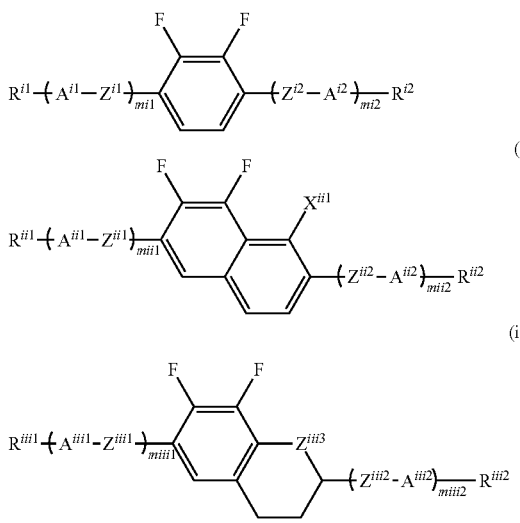

In the formulas, $R^{i1}$, $R^{i2}$, $R^{ii1}$, $R^{ii2}$, $R^{iii1}$, and $R^{iii2}$ each independently represent an alkyl group having 1 to 10 carbon atoms, one or two or more non-adjacent —$CH_2$— in the alkyl group may each independently be substituted with —CH=CH—, —C≡C—, —O—, —CO—, —COO— or —OCO—, in addition, one or two or more hydrogen atoms present in the group may be independently substituted with a fluorine atom or a chlorine atom, $A^{i1}$, $A^{i2}$, $A^{ii1}$, $A^{ii2}$, $A^{iii1}$, and $A^{iii2}$ each independently represent a group selected from the group consisting of (a) a 1,4-cyclohexylene group (one —$CH_2$— or two or more non-adjacent —$CH_2$— present in this group may be substituted with —O—), (b) a 1,4-phenylene group (one —CH= or two or more non-adjacent —CH= present in the group may be substituted with —N=) and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=); and group (a), group (b), and group (c) described above may each independently be substituted with a cyano group, a fluorine atom, or a chlorine atom, $Z^{i1}$, $Z^{i2}$, $Z^{ii1}$, $Z^{ii2}$, $Z^{iii1}$ and $Z^{iii2}$ each independently represent a single bond, —$OCH_2$—, —$CH_2O$—, —$OCF_2$—, —$CF_2O$—, —$CH_2CH_2$—, or —$CF_2CF_2$—, provided that at least one $Z^{i1}$ represents —$OCH_2$—, —$CH_2O$—, —$OCF_2$—, —$CF_2O$—, —$CH_2CH_2$—, or —$CF_2CF_2$—, $Z^{iii3}$ represents —$CH_2$— or an oxygen atom, $X^{ii1}$ represents a hydrogen atom or a fluorine atom, $m^{i1}$, $m^{i2}$, $m^{ii1}$, $m^{ii2}$, $m^{iii1}$, and $m^{iii2}$ each independently represent an integer of 0 to 3, $m^{i1}+m^{i2}$ is 0, 1, 2, or 3, provided that, in the case where $m^{i1}+m^{i2}$ is 1, 2, or 3, $m^{i1}$ represents 1, 2, or 3, and $m^{iii1}+m^{iii2}$ and $m^{iii1}+m^{iii2}$ are 1, 2, or 3, and in the case where there is a plurality of $A^{i1}$ to $A^{iii2}$ and $Z^{i1}$ to $Z^{iii2}$, these may be the same or different.

[Chem. 2]

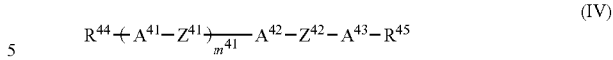

In the formula, $R^{44}$ and $R^{45}$ each independently represent an alkyl group having 1 to 8 carbon atoms; one or two or more of —$CH_2$— in the group may be substituted with —O—, —CH=CH—, —CO—, —OCO—, —COO—, —C≡C—, —$CF_2O$—, or —$OCF_2$— as long as the oxygen atoms are not directly adjacent to each other; and one or two or more of hydrogen atoms in the group may be each independently substituted with a fluorine atom or a chlorine atom, $A^{41}$ to $A^{43}$ each independently represent a group selected from the group consisting of (a) a 1,4-cyclohexylene group (one —$CH_2$— or two or more non-adjacent —$CH_2$— present in this group may be substituted with —O—), (b) a 1,4-phenylene group (one —CH= or two or more non-adjacent —CH= present in the group may be substituted with —N=) and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=); and group (a), group (b), and group (c) described above may each independently be substituted with a cyano group, a fluorine atom, or a chlorine atom, $Z^{41}$ and $Z^{42}$ each independently represent a single bond, —CH=CH—, —C≡C—, —$CH_2CH_2$—, —$(CH_2)_4$—, —$OCH_2$—, —$CH_2O$—, —$OCF_2$—, or —$CF_2O$—

$m^{41}$ represents an integer of 0 to 2, and in the case where a plurality of $A^{41}$ and $Z^{41}$ are present, these may be the same or different.

Advantageous Effects of Invention

The FFS mode liquid crystal display of the present invention is excellent in high-speed responsiveness, has a feature of generating few display defects, and has excellent display characteristics. The liquid crystal display of the present invention is useful for displays such as liquid crystal TVs or monitors.

BRIEF DESCRIPTION OF DRAWINGS

FIG. 1 is a diagram schematically showing an example of a configuration of a liquid crystal display of the present invention.

FIG. 2 is a planar diagram in which a region surrounded by a line II of an electrode layer 3 formed on a substrate 2 in FIG. 1 is enlarged.

FIG. 3 is a cross-sectional view which cuts away the liquid crystal display shown in FIG. 1 in the direction along the line III-III in FIG. 2.

FIG. 4 is a view schematically showing an alignment direction of the liquid crystal induced by an alignment layer 4.

FIG. 5 is a planar diagram in which another example of the region surrounded by the line II of the electrode layer 3 formed on the substrate 2 in FIG. 1 is enlarged.

FIG. 6 is a cross-sectional diagram of another example which cuts away the liquid crystal display shown in FIG. 1 in the direction of line III-III in FIG. 2.

FIG. 7 is a planar diagram in which the electrode configuration of the liquid crystal display is enlarged.

DESCRIPTION OF EMBODIMENTS

As described above, the present invention found an optimum n-type liquid crystal composition for an FFS mode liquid crystal display. Hereinafter, first, description will be given of embodiments of the liquid crystal composition of the present invention.
(Liquid Crystal Layer)

The liquid crystal composition of the present invention contains one type or two or more types of compounds represented by General Formula (i), General Formula (ii), or General Formula (iii).

[Chem. 3]

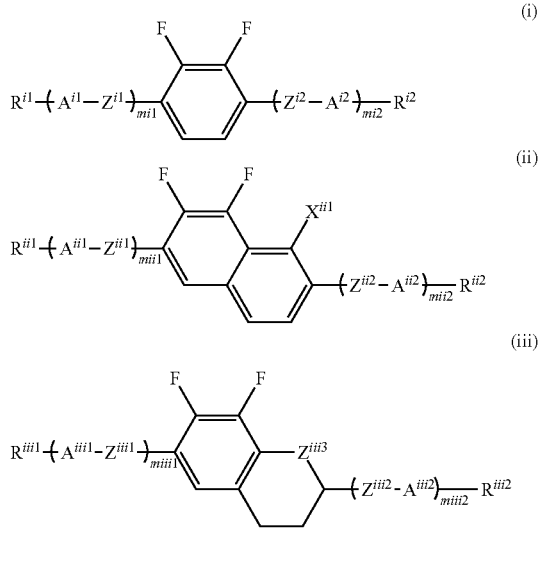

The compounds represented by General Formula (i), General Formula (ii) or General Formula (iii) are preferably compounds having a negative dielectric anisotropy (Δε) whose absolute value is larger than 3.

In General Formula (i), General Formula (ii), and General Formula (iii), $R^{i1}$, $R^{ii1}$, and $R^{iii1}$ each independently preferably represent an alkyl group having 1 to 8 carbon atoms, an alkoxy group having 1 to 8 carbon atoms, an alkenyl group having 2 to 8 carbon atoms or an alkenyloxy group having 2 to 8 carbon atoms, more preferably an alkyl group having 1 to 5 carbon atoms, an alkoxy group having 1 to 5 carbon atoms, an alkenyl group having 2 to 5 carbon atoms, and an alkenyloxy group having 2 to 5 carbon atoms, an alkyl group having 1 to 5 carbon atoms or an alkenyl group having 2 to 5 carbon atoms is even more preferable, an alkyl group having 2 to 5 carbon atoms or an alkenyl group having 2 to 3 carbon atoms is even more preferable, and an alkenyl group having 3 carbon atoms (propenyl group) is particularly preferable. $R^{i2}$, $R^{ii2}$, and $R^{iii2}$ each independently preferably represent an alkyl group having 1 to 8 carbon atoms, an alkoxy group having 1 to 8 carbon atoms, an alkenyl group having 2 to 8 carbon atoms or an alkenyloxy group having 2 to 8 carbon atoms, more preferably an alkyl group having 1 to 5 carbon atoms, an alkoxy group having 1 to 5 carbon atoms, an alkenyl group having 2 to 5 carbon atoms or an alkenyloxy group having 2 to 5 carbon atoms, and even more preferably an alkoxy group having 1 to 4 carbon atoms. An alkenyl group is preferable in the case where emphasis is placed on improvement of the response speed of the display and an alkyl group is preferable in the case where emphasis is placed on reliability such as the voltage holding ratio.

In addition, in the case where the ring structure to which $R^{i1}$, $R^{i2}$, $R^{ii1}$, $R^{ii2}$, $R^{iii1}$ and $R^{iii2}$ are bonded is a phenyl group (aromatic group), a linear alkyl group having 1 to 5 carbon atoms, a linear alkoxy group having 1 to 4 carbon atoms, and an alkenyl group having 4 to 5 carbon atoms are preferable, and in the case where the ring structure to which $R^{i1}$, $R^{i2}$, $R^{ii1}$, $R^{ii2}$, $R^{iii1}$ and $R^{iii2}$ are bonded is saturated, such as cyclohexane, pyran, and dioxane, a linear alkyl group having 1 to 5 carbon atoms, a linear alkoxy group having 1 to 4 carbon atoms, and a linear alkenyl group having 2 to 5 carbon atoms are preferable. In order to stabilize the nematic phase, it is preferable that the total of the carbon atoms and the oxygen atoms when present be 5 or less, and linear is preferable.

In the case where $R^{i1}$, $R^{i2}$, $R^{ii1}$, $R^{ii2}$, $R^{iii1}$ and $R^{iii2}$ are alkenyl groups, these are preferably selected from the group represented by any one of formula (R1) to formula (R5). (The black dot in each formula represents a connecting point with the ring.)

[Chem. 4]

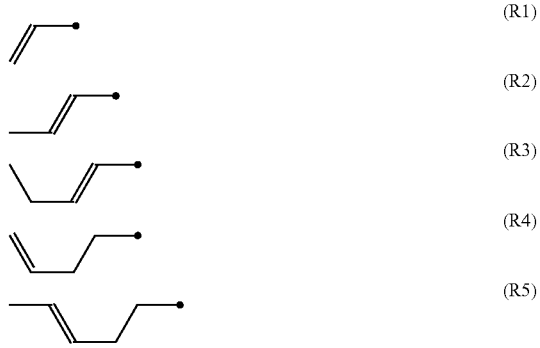

In order to improve the transmittance of the liquid crystal display, particularly in the case where $m^{i1}+m^{i2}$ is 2 or 3, at least one group of $R^{i1}$ or $R^{i2}$ is preferably a group other than formula (R2), and more preferably an alkyl group or an alkoxy group. Similarly, in the case where $m^{ii1}+m^{ii2}$ is 2 or 3, at least one group of $R^{ii1}$ or $R^{ii2}$ is preferably a group other than formula (R2), and more preferably an alkyl group or alkoxy group. In addition, in the case where $m^{iii1}+m^{iii2}$ is 2 or 3, at least one group of $R^{iii1}$ or $R^{iii2}$ is preferably a group other than formula (R2), and more preferably an alkyl group or alkoxy group.

In General Formula (i), General Formula (ii) and General Formula (iii), $A^{i1}$, $A^{i2}$, $A^{ii1}$, $A^{ii2}$, $A^{iii1}$, and $A^{iii2}$ are each independently preferably aromatic in the case where there is a demand to increase Δn and preferably aliphatic in order to improve the response speed, and $A^{21}$ preferably represents a trans-1,4-cyclohexylene group, a 1,4-phenylene group, a 2-fluoro-1,4-phenylene group, a 3-fluoro-1,4-phenylene group, a 3,5-difluoro-1,4-phenylene group, a 2,3-difluoro-1,4-phenylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, or a 1,2,3,4-tetrahydronaphthalene-2,6-diyl group, more preferably represent the following structure.

[Chem. 5]

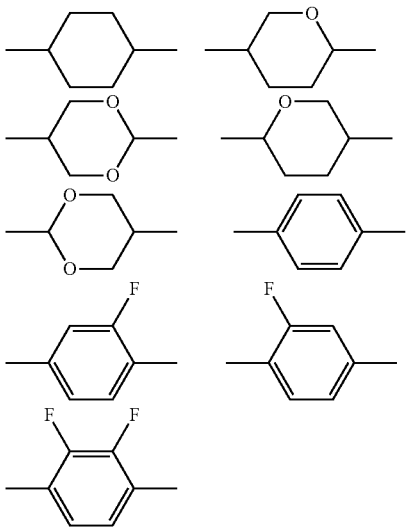

Even more preferably represent a trans-1,4-cyclohexylene group or a 1,4-phenylene group.

$Z^{i1}$, $Z^{i2}$, $Z^{ii1}$, $Z^{ii2}$, $Z^{iii1}$ and $Z^{iii2}$ each independently preferably represents —CH$_2$O—, —CF$_2$O—, —CH$_2$CH$_2$—, —CF$_2$CF$_2$— or a single bond, more preferably —CH$_2$O—, —CH$_2$CH$_2$—, or a single bond, and particularly preferably —CH$_2$O— or a single bond. At least one of $Z^{i1}$ represents —OCH$_2$—, —CH$_2$O—, —OCF$_2$—, —CF$_2$O—, —CH$_2$CH$_2$— or —CF$_2$CF$_2$—, with —CH$_2$O—, —CF$_2$O—, —CH$_2$CH$_2$—, or —CF$_2$CF$_2$ being preferable, —CH$_2$O— or —CH$_2$CH$_2$— are more preferable, and —CH$_2$O— is particularly preferable.

$m^{i1}$, $m^{i2}$, $m^{ii1}$, $m^{ii2}$, $m^{iii1}$, and $m^{iii2}$ each independently represent an integer of 0 to 3, $m^{i1}+m^{i2}$ is 0, 1, 2, or 3, in the case where $m^{i1}+m^{i2}$ represents 1, 2, or 3, $m^{i1}$ represents 1, 2, or 3, $m^{ii1}+m^{ii2}$ and $m^{iii1}+m^{iii2}$ are 1, 2, or 3, with $m^{i1}+m^{i2}$, $m^{ii1}+m^{ii2}$ and $m^{iii1}+m^{iii2}$ being 1 or 2 being preferable.

As the compound represented by General Formula (i), it is preferable to contain one type or two or more types of compounds represented by General Formula (i-1).

[Chem. 6]

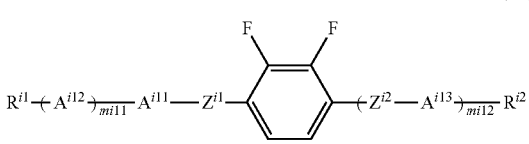

(i-1)

In the formula, $A^{i11}$, $A^{i12}$ and $A^{i13}$ each independently represent a 1,4-cyclohexylene group or a 1,4-phenylene group, but one —CH$_2$— or two or more non-adjacent —CH$_2$— present in the 1,4-cyclohexylene group may be substituted with —O— or —S—, one hydrogen atom present in the 1,4-phenylene group may each independently be substituted with a fluorine atom or a chlorine atom, $m^{i11}$ and $m^{i12}$ each independently represent 0 or 1, and $R^{i1}$, $R^{i2}$, $Z^{i1}$, and $Z^{i2}$ each independently represent the same meanings as $R^{i1}$, $R^{i2}$, $Z^{i1}$ and $Z^{i2}$ in General Formula (i).

The compound represented by General Formula (i-1) is preferably a compound represented by General Formula (i-1A), General Formula (i-1B) or General Formula (i-1C).

[Chem. 7]

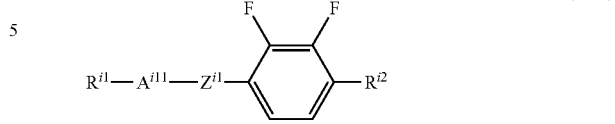

(i-1A)

In the formula, $R^{i1}$, $R^{i2}$, $A^{i11}$, and $Z^{i1}$ independently represent the same meanings as $R^{i1}$, $R^{i2}$, $A^{i11}$ and $Z^{i1}$ in General Formula (i-1).

[Chem. 8]

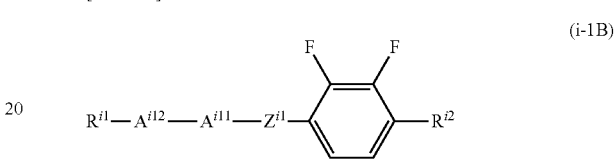

(i-1B)

In the formula, $R^{i1}$, $R^{i2}$, $A^{i11}$, $A^{i12}$, and $Z^{i1}$ each independently represent the same meanings as $R^{i1}$, $R^{i2}$, $A^{i11}$, $A^{i12}$ and $Z^{i1}$ in General Formula (i-1).

[Chem. 9]

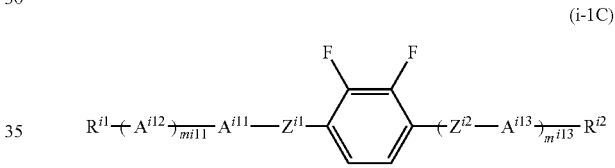

(i-1C)

In the formula, $m^{i13}$ represents 1 or 2, $R^{i1}$, $R^{i2}$, $A^{i11}$, $A^{i12}$, $A^{i13}$, $Z^{i1}$, $Z^{i2}$, and $m^{i11}$ each independently represent the same meanings as $R^{i1}$, $R^{i2}$, $A^{i11}$, $A^{i12}$, $A^{i13}$, $Z^{i1}$, $Z^{i2}$, and $m^{i11}$ in General Formula (i-1).

As the compound represented by General Formula (i-1A), the compounds represented by the following General Formula (i-1A-1) to General Formula (i-1A-4) are preferable, a compound represented by General Formula (i-1A-1) and a compound represented by General Formula (i-1A-4) are more preferable, and a compound represented by General Formula (i-1A-1) is even more preferable.

[Chem. 10]

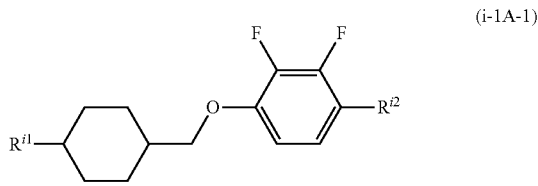

(i-1A-1)

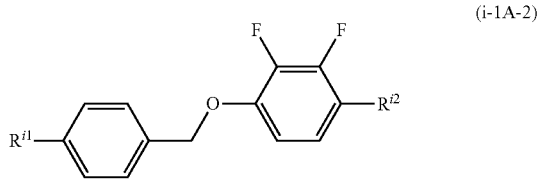

(i-1A-2)

-continued (i-1A-3)
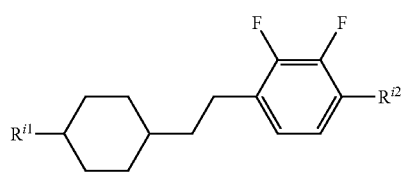

(i-1A-4)
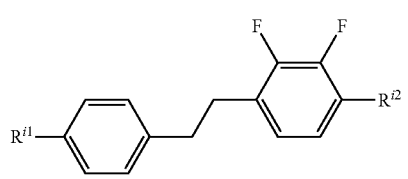

In the formulas, $R^{i1}$ and $R^{i2}$ each independently represent the same meanings as $R^{i1}$ and $R^{i2}$ in General Formula (i-1).

As the compound represented by General Formula (i-1B), the compounds represented by the following General Formula (i-1B-1) to General Formula (i-1B-7) are preferable, the compounds represented by General Formula (i-1B-1) and General Formula (i-1B-3) and the compound represented by General Formula (i-1B-6) are more preferable, and a compound represented by General Formula (i-1B-1) and a compound represented by General Formula (i-1B-3) are even more preferable.

[Chem. 11]

(i-1B-1)
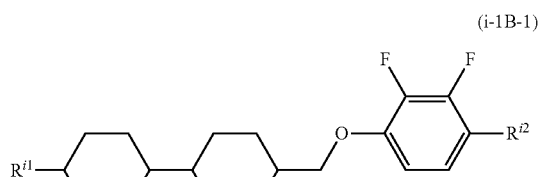

(i-1B-2)
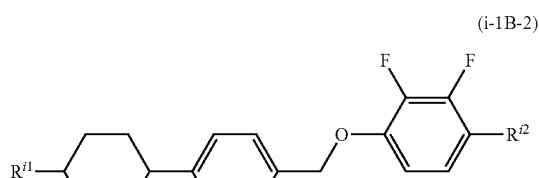

(i-1B-3)
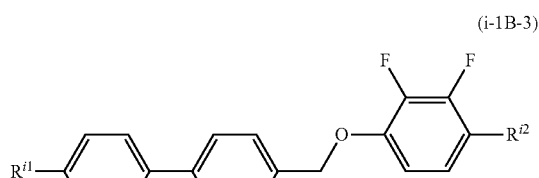

(i-1B-4)

-continued (i-1B-5)
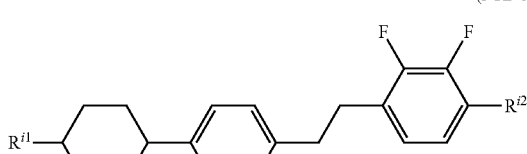

(i-1B-6)
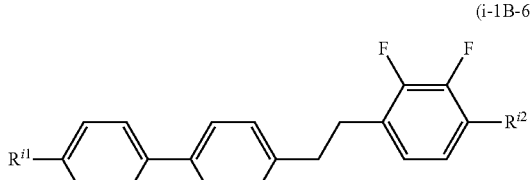

(i-1B-7)
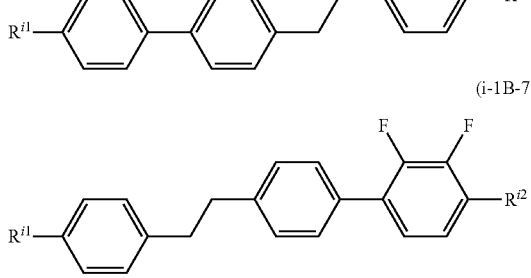

In the formulas, $R^{i1}$ and $R^{i2}$ each independently represent the same meanings as $R^{i1}$ and $R^{i2}$ in General Formula (i-1).

As the compound represented by General Formula (i-1C), the compounds represented by the following General Formula (i-1C-1) to General Formula (i-1C-4) are preferable, and the compounds represented by General Formula (i-1C-1) to General Formula (i-1C-2) are more preferable.

[Chem. 12]

(i-1C-1)
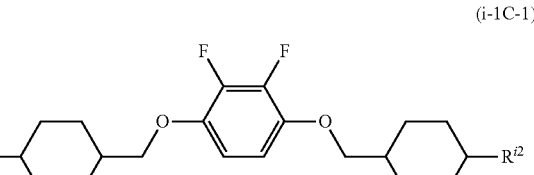

(i-1C-2)
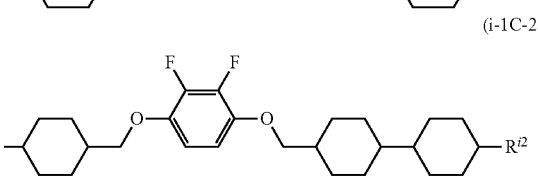

(i-1C-3)
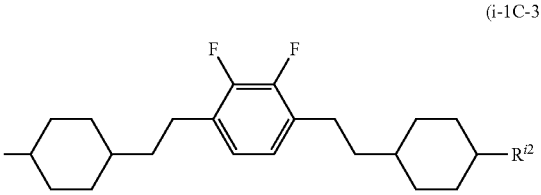

(i-1C-4)
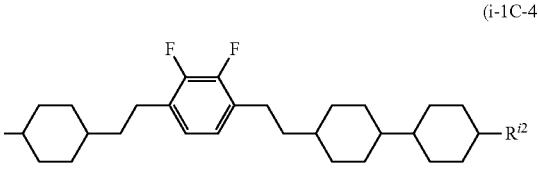

In the formulas, $R^{i1}$ and $R^{i2}$ each independently represent the same meanings as $R^{i1}$ and $R^{i2}$ in General Formula (i-1).

In addition, in the present invention, the compound represented by General Formula (i) is preferably the compound represented by General Formula (i-1D).

[Chem. 13]

(i-1D)

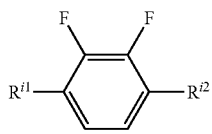

In the formula, $R^{i1}$ and $R^{i2}$ each independently represent the same meanings as $R^{i1}$, $R^{i2}$, $A^{i11}$ and $Z^{i1}$ in General Formula (i-1).

As the compound represented by General Formula (i-1D), the compound represented by the following General Formula (i-1D-1) to General Formula (i-1D-14) is preferable.

[Chem. 14]

(i-1D-1)
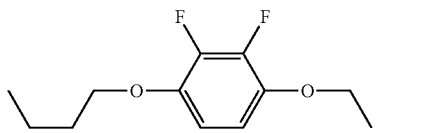

(i-1D-2)
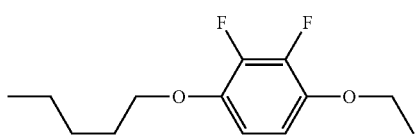

(i-1D-3)
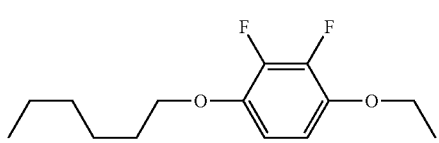

(i-1D-4)
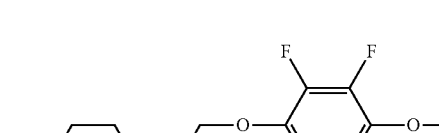

(i-1D-5)
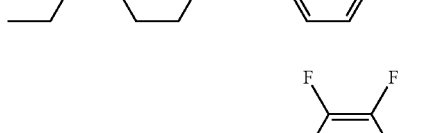

(i-1D-6)
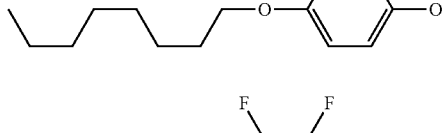

(i-1D-7)
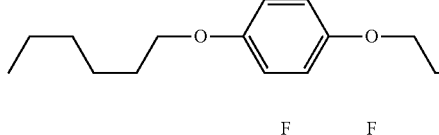

(i-1D-8)
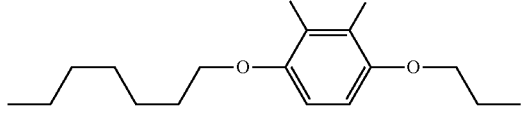

(i-1D-9)
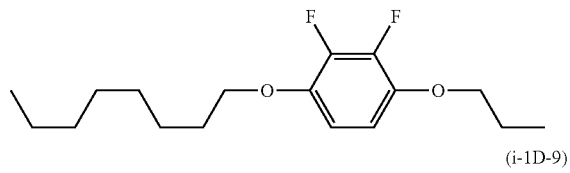

(i-1D-10)
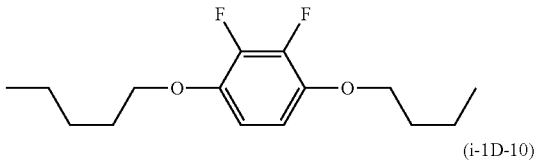

(i-1D-11)
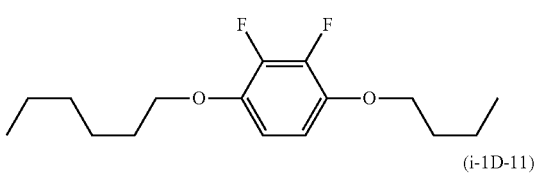

(i-1D-12)
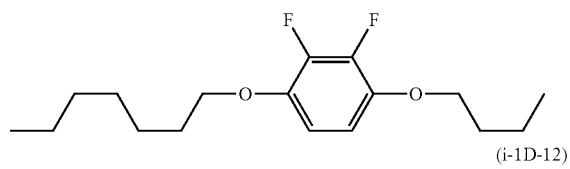

(i-1D-13)
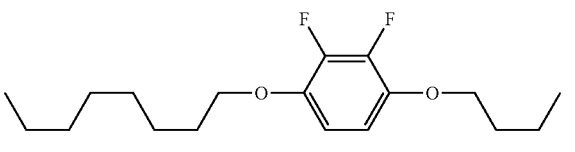

(i-1D-14)
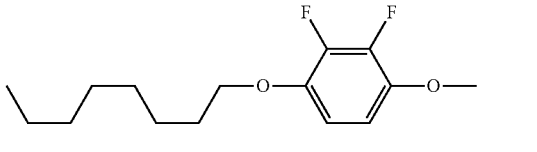

The lower limit value of the content of the compound represented by General Formula (i-1D) in the liquid crystal composition according to the present invention is preferably 1% by mass, and more preferably 2% by mass, and the upper limit value is preferably 15% by mass, more preferably 12% by mass, even more preferably 10% by mass, particularly preferably 8% by mass, and most preferably 7% by mass.

The compound represented by General Formula (ii) is preferably the compound represented by General Formula (ii-1A), General Formula (ii-1B), or General Formula (ii-1C).

[Chem. 15]

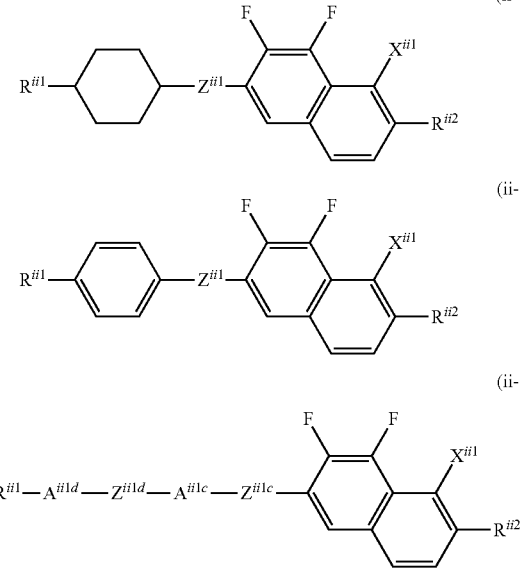

(ii-1A)
(ii-1B)
(ii-1C)

In the formulas, $R^{ii1}$, $R^{ii2}$, $Z^{ii1}$ and $X^{ii1}$ each independently represent the same meanings as $R^{ii1}$, $R^{ii2}$, $Z^{i1}$ and $X^{ii1}$ in General Formula (ii), $A^{ii1c}$ and $A^{ii1d}$ each independently represent a 1,4-cyclohexylene group or a 1,4-phenylene group, but one —CH$_2$— or two or more non-adjacent —CH$_2$— present in the 1,4-cyclohexylene group may be substituted with —O— or —S—, one hydrogen atom present in the 1,4-phenylene group may each independently be substituted with a fluorine atom or a chlorine atom, and $Z^{ii1c}$ and $Z^{ii1d}$ each independently represent a single bond, —OCH$_2$—, —CH$_2$O—, —OCF$_2$—, —CF$_2$O—, —CH$_2$CH$_2$— or —CF$_2$CF$_2$—.

In the compound represented by General Formula (ii-1A) or General Formula (ii-1B), $Z^{ii1}$ preferably represents a single bond, —OCH$_2$—, —CH$_2$O—, or —CH$_2$CH$_2$.

The compound represented by General Formula (ii-1C) is preferably a compound represented by the following General Formula (ii-1C-1) to General Formula (i-1C-6).

[Chem. 16]

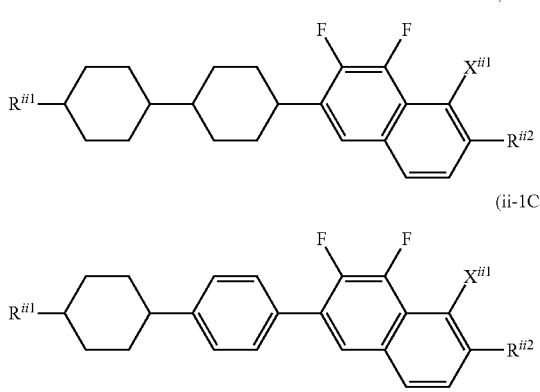

(ii-1C-1)
(ii-1C-2)

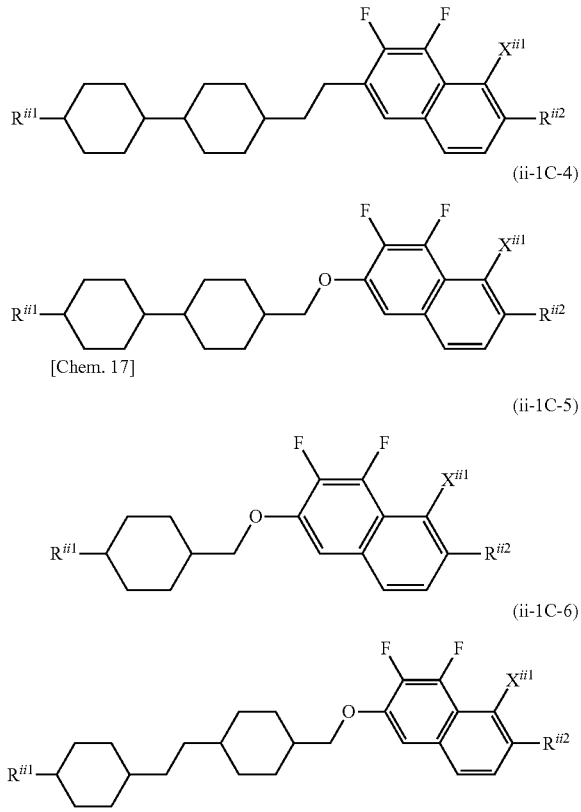

(ii-1C-3)
(ii-1C-4)

[Chem. 17]

(ii-1C-5)
(ii-1C-6)

In the formulas, $R^{ii1}$ and $R^{ii2}$ each independently represent the same meanings as $R^{ii1}$ and $R^{ii2}$ in General Formula (ii).

The compound represented by General Formula (iii) is preferably a compound represented by General Formula (ii-1A), General Formula (ii-1B), or General Formula (ii-1C).

[Chem. 18]

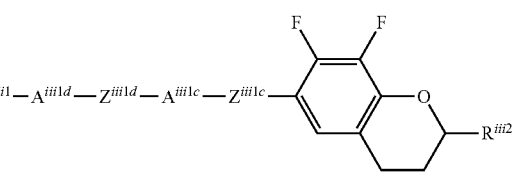

(iii-1A)
(iii-1B)
(iii-1C)

In the formulas, $R^{iii1}$, $R^{iii2}$ and $Z^{iii1}$ each independently represent the same meanings as $R^{iii1}$, $R^{iii2}$ and $Z^{iii1}$ in General Formula (iii), $A^{iii1c}$ and $A^{iii1d}$ each independently represent a 1,4-cyclohexylene group or a 1,4-phenylene group, but one —CH$_2$— or two or more non-adjacent —CH$_2$— present in the 1,4-cyclohexylene group may be substituted with —O— or —S—, one hydrogen atom present in the 1,4-phenylene group may be independently substituted with a fluorine atom or a chlorine atom, and $Z^{iii1c}$ and $Z^{iii1d}$ each independently represent a single bond, —OCH$_2$—, —CH$_2$O—, —OCF$_2$—, —CF$_2$O—, —CH$_2$CH$_2$— or —CF$_2$CF$_2$—.

In the compound represented by General Formula (iii-1A) or General Formula (iii-1B), $Z^{iii1}$ preferably represents a single bond, —OCH$_2$—, —CH$_2$O—, or —CH$_2$CH$_2$.

The compound represented by General Formula (iii-1C) is preferably a compound represented by the following General Formula (ii-1C-1) to General Formula (i-1C-3).

[Chem. 19]

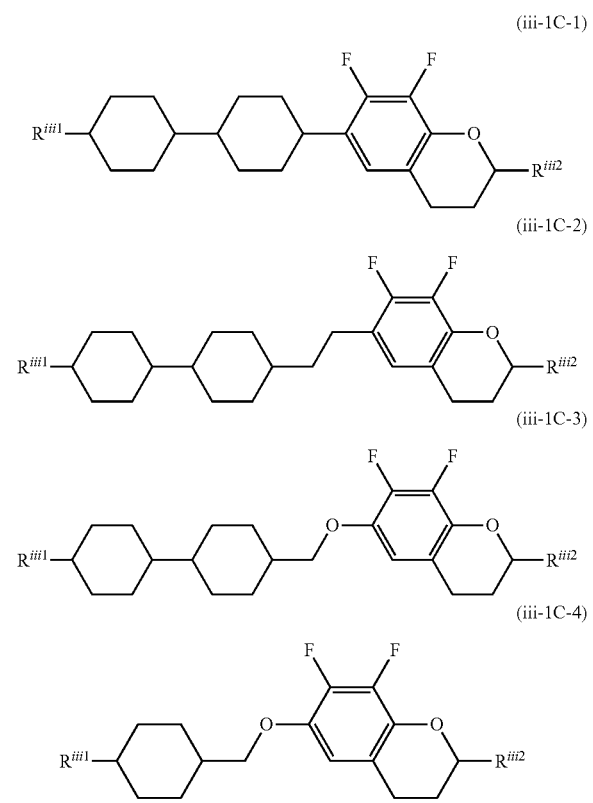

In the formulas, $R^{iii1}$ and $R^{iii2}$ each independently represent the same meanings as $R^{iii1}$ and $R^{iii2}$ in General Formula (iii).

In the liquid crystal composition of the present invention, in the case where two or more types of the compound represented by General Formulas (i) to (iii) are contained, only two or more types of compounds selected from any one formula out of the compounds represented by General Formulas (i) to (iii) may be contained, and two or more types of compounds selected from two or more formulas selected from the compounds represented by General Formulas (i) to (iii) may be contained.

The liquid crystal composition of the present invention preferably contains one type or two or more types of compounds represented by General Formula (i), more preferably contains one type or two or more types of compounds represented by General Formula (i-1A), General Formula (i-1B), or General Formula (i-1C), and even more preferably contains two types to ten types.

More specifically, General Formula (i-1A), General Formula (i-1B), and General Formulas (i-1C) preferably contain one type or two or more types of compounds selected from the group of compounds represented by General Formula (i-1A-1), General Formula (i-1B-1), and General Formula (i-1C-1), and more preferably a combination of a compound represented by General Formula (i-1A-1) and a compound represented by General Formula (i-1B-1).

The total content of the compounds represented by General Formula (i), General Formula (ii) and General Formula (iii) is preferably 10 to 90% by mass, more preferably 15 to 90% by mass, more preferably 20 to 90% by mass, still more preferably 20 to 80% by mass, still more preferably 30 to 80% by mass, still more preferably 45 to 80% by mass, and particularly preferably 45 to 75% by mass.

More specifically, the lower limit value of the total content of the compounds represented by General Formula (i), General Formula (ii), and General Formula (iii) in the composition (below, % in the composition represents % by mass) is preferably 1% by mass or more, preferably 5% or more, more preferably 10% or more, more preferably 13% or more, more preferably 15% or more, more preferably 18% or more, more preferably 20% or more, more preferably 23% or more, more preferably 25% or more, more preferably 28% or more, more preferably 30% or more, more preferably 33% or more, more preferably 35% or more, more preferably 38% or more, and more preferably 40% or more. In addition, the upper limit value is preferably 95% or less, more preferably 90% or less, more preferably 88% or less, more preferably 85% or less, more preferably 83% or less, more preferably 80% or less, more preferably 78% or less, more preferably 75% or less, more preferably 73% or less, more preferably 70% or less, more preferably 68% or less, more preferably 65% or less, more preferably 63% or less, more preferably 60% or less, more preferably 55% or less, more preferably 50% or less, and more preferably 40% or less.

The liquid crystal composition of the present invention contains one type or two or more types of compounds represented by General Formula (IV).

[Chem. 20]

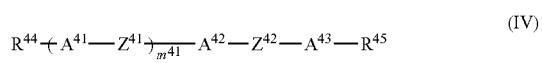

In General Formula (IV), $R^{44}$ and $R^{45}$ each independently preferably represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and are preferably linear. An alkenyl group is preferable in the case where emphasis is placed on improving the response speed of the display, and an alkyl group is preferable in the case where emphasis is placed on reliability such as the voltage holding ratio. In the case where $R^{44}$ and $R^{45}$ are an alkenyl group, it is preferably selected from a group represented by any one of formula (R1) to formula (R5).

[Chem. 21]

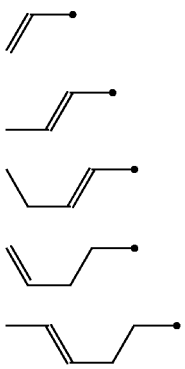

(R1)

(R2)

(R3)

(R4)

(R5)

The black dots in each formula represent the connecting points with the rings.

The combination of $R^{44}$ and $R^{45}$ is not particularly limited; however, a combination where both represent an alkyl group, a combination where one represents an alkyl group and the other represents an alkenyl group, or a combination where one represents an alkyl group and the other represents an alkoxy group, or a combination where one represents an alkyl group and the other represents an alkenyloxy group is preferable. In the case where emphasis is placed on reliability, it is preferable that both $R^{44}$ and $R^{45}$ be alkyl groups, and in the case where emphasis is placed on reducing the volatility of the compound, $R^{44}$ and $R^{45}$ are preferably an alkoxy group, and in the case where emphasis is placed on a reduction in viscosity, at least one is preferably an alkenyl group.

In order to improve the transmittance of the liquid crystal display, particularly in the case where $m^{41}$ is 1 or 2, at least one group of $R^{44}$ or $R^{45}$ is preferably a group other than the formula (R2), and more preferably an alkyl group or an alkoxy group.

In the case where it is necessary to increase Δn, $A^{41}$ to $A^{43}$ are preferably aromatic, and are preferably aliphatic in order to improve the response speed, and each independently preferably represents a trans-1,4-cyclohexylene group, a 1,4-phenylene group, a 2-fluoro-1,4-phenylene group, a 3-fluoro-1,4-phenylene group, a 2,5-difluoro-1,4-phenylene group, a 3,5-difluoro-1,4-phenylene group, a 1,4-cyclohexenylene group, a tetrahydropyran-2,5-diyl group, a 1,3-dioxane-2,5-diyl group, a 1,4-bicyclo[2.2.2]octylene group, a naphthalene-2,6-diyl group, a decahydronaphthalene-2,6-diyl group, or a 1,2,3,4-tetrahydronaphthalene-2,6-diyl group, and any one of the following structures:

[Chem. 22]

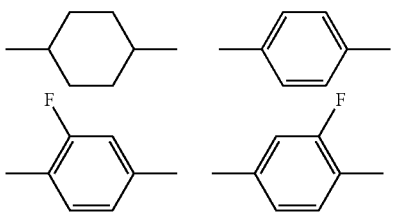

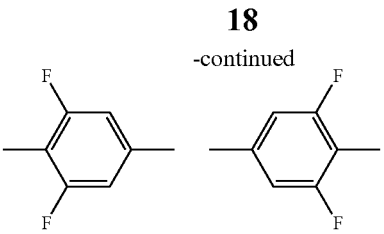

is preferable, and any one of:

[Chem. 23]

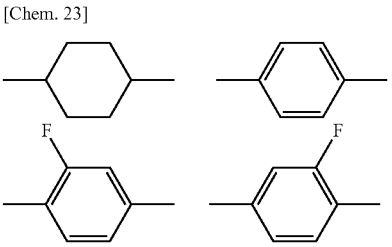

is more preferable.

$Z^{41}$ and $Z^{42}$ each independently represent a single bond, —CH=CH—, —C≡C—, —CH$_2$CH$_2$—, —(CH$_2$)$_4$—, —OCH$_2$—, —CH$_2$O—, —OCF$_2$—, or —CF$_2$O—, more preferably a single bond, —CH$_2$CH$_2$—, —OCF$_2$— or —CF$_2$O—, and particularly preferably a single bond in the case where emphasis is placed on the response speed.

$m^{41}$ preferably represents an integer of 1 or 2. In the case where there is a plurality of $A^{41}$ and $Z^{41}$, these may be the same or different.

The compound represented by General Formula (IV) may be used alone, and it is also possible to use a combination thereof. There are no particular restrictions on the types of compound which are able to be combined, but the compounds are used in combination as appropriate according to the desired performances such as solubility at low temperature, transition temperature, electrical reliability, birefringence, and the like. As the types of the compound to be used, for example, one embodiment of the present invention may have one type. Alternatively, other embodiments of the present invention may have two types, three types, four types, five types, six types, seven types, eight types, nine types, or ten or more types.

In the composition of the present invention, the content of the compound represented by General Formula (IV) needs to be appropriately adjusted according to the desired performances such as the solubility at a low temperature, the transition temperature, the electrical reliability, the birefringence, the process adaptability, the drip traces, the burn-in, and dielectric anisotropy.

The content of the compound represented by General Formula (IV) is preferably 1% by mass to 80% by mass, more preferably 1% by mass to 70% by mass, more preferably 1% by mass to 60% by mass, more preferably 10% by mass to 50% by mass, more preferably 10% by mass to 40% by mass, and more preferably 15% by mass to 40% by mass.

More specifically, the lower limit value of the content of the compound represented by General Formula (IV) in the composition is preferably 0.5% by mass or more (below, % in the composition represents % by mass), preferably 1% or more, more preferably 3% or more, more preferably 5% or more, more preferably 8% or more, more preferably 10% or more, more preferably 13% or more, more preferably 15% or more, more preferably 18% or more, and more preferably 20% or more. In addition, the upper limit value is preferably 80% or less, more preferably 70% or less, more preferably 65% or less, more preferably 60% or less, more preferably 55% or less, more preferably 50% or less, more preferably 45% or less, more preferably 40% or less, more preferably 38% or less, more preferably 35% or less, more preferably 33% or less, more preferably 30% or less, more preferably 28% or less, and more preferably 25% or less.

As the compound represented by General Formula (IV), it is preferable that one type or two or more types of compounds represented by General Formula (IV-1) be contained.

[Chem. 24]

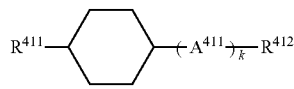
(IV-1)

In the formula, $R^{411}$ and $R^{412}$ each independently represent an alkyl group having 1 to 8 carbon atoms, an alkenyl group having 2 to 8 carbon atoms, an alkoxy group having 1 to 8 carbon atoms or an alkenyloxy group having 2 to 8 carbon atoms, $A^{411}$ represents a 1,4-phenylene group or a trans-1,4-cyclohexylene group, and k represents 1 or 2, and two $A^{411}$'s may be the same or different in the case where k is 2.

The total content of the compounds represented by General Formula (IV-1) is preferably 1% by mass to 80% by mass, more preferably 1% by mass to 70% by mass, more preferably 1% by mass to 60% by mass, more preferably 10% by mass to 50% by mass, more preferably 10% by mass to 40% by mass, and more preferably 15% by mass to 40% by mass.

More specifically, the lower limit value of the content of the compound represented by General Formula (IV-1) is preferably 0.5% by mass or more in the composition (below, % in the composition represents % by mass), more preferably 1% or more, more preferably 3% or more, more preferably 5% or more, more preferably 8% or more, more preferably 10% or more, more preferably 13% or more, more preferably 15% or more, more preferably 18% or more, and more preferably 20% or more. In addition, the upper limit value is preferably 80% or less, more preferably 70% or less, more preferably 65% or less, more preferably 60% or less, more preferably 55% or less, more preferably 50% or less, more preferably 45% or less, more preferably 40% or less, more preferably 38% or less, more preferably 35% or less, more preferably 33% or less, more preferably 30% or less, more preferably 28% or less, and more preferably 25% or less.

Specific examples of the compound represented by General Formula (IV-1) include compounds represented by the group of compounds represented by the following General Formula (IV-1a) to General Formula (IV-1f).

[Chem. 25]

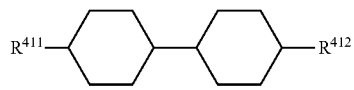
(IV-1a)

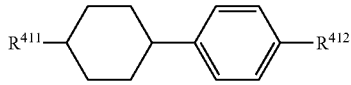
(IV-1b)

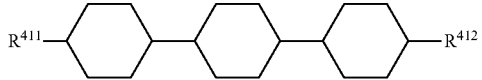
(IV-1c)

(IV-1d)

(IV-1e)

(IV-1f)

In the formulas, $R^{411}$ and $R^{412}$ each independently represent the same meanings as $R^{411}$ and $R^{412}$ in General Formula (IV-1).

$R^{411}$ and $R^{412}$ each independently preferably represent an alkyl group having 1 to 8 carbon atoms, an alkenyl group having 2 to 8 carbon atoms or an alkoxy group having 2 to 8 carbon atoms, and more preferably an alkyl group having 1 to 5 carbon atoms, an alkenyl group having 2 to 5 carbon atoms, and an alkoxy group having 2 to 5 carbon atoms. Alternatively, $R^{41'}$ and $R^{42}$ may be the same or different, but preferably represent different substituents.

The compound selected from the group of compounds represented by General Formula (IV-1a) to General Formula (IV-1f) preferably contains 1 type to 10 types, particularly preferably 1 type to 8 types, particularly preferably 1 type to 5 types, and 2 types or more of the compounds is also preferable. It is preferable that the compound represented by General Formula (IV-1a) be contained. In the compound represented by General Formula (IV-1a), in the case where $R^{411}$ represents an alkenyl group, for example, it is preferable at least one type of compound selected from the group of compounds represented by General Formula (IV-1a1) be contained

[Chem. 26]

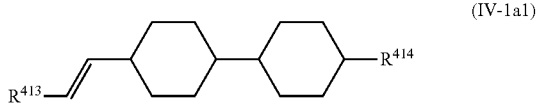
(IV-1a1)

In the formula, $R^{413}$ represents a hydrogen atom or a methyl group, $R^{414}$ represents an alkyl group having 1 to 5 carbon atoms, an alkenyl group having 2 to 5 carbon atoms, or an alkoxy group having 1 to 4 carbon atoms.

More specifically, the compound represented by General Formula (IV-1a1) is preferably the compound described below.

[Chem. 27]

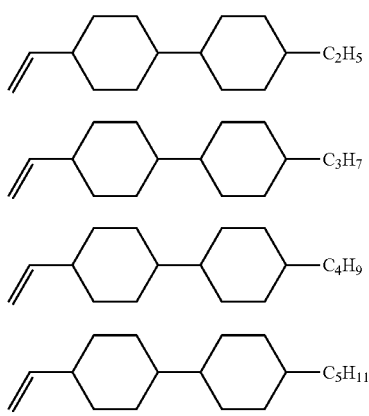

(IV-1a1-1)
(IV-1a1-2)
(IV-1a1-3)
(IV-1a1-4)

[Chem. 28]

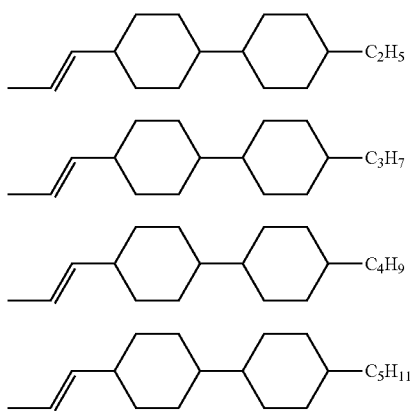

(IV-1a1-5)
(IV-1a1-6)
(IV-1a1-7)
(IV-1a1-8)

In the case where the compound represented by General Formula (IV-1a1) is contained, the lower limit value of the content of the compound represented by General Formula (IV-1a1) in the liquid crystal composition is preferably 1% by mass, preferably 5% by mass, more preferably 15% by mass, still more preferably 20% by mass, particularly preferably 23% by mass, and most preferably 25% by mass, and the upper limit value is preferably 70% by mass, more preferably 60% by mass, still more preferably 55% by mass, particularly preferably 52% by mass, and most preferably 50% by mass. More specifically, in the case where emphasis is placed on the response speed, the lower limit value is preferably 20% by mass, more preferably 30% by mass, even more preferably 35% by mass, particularly preferably 38% by mass, and most preferably 35% by mass, and the upper limit value is preferably 70% by mass, more preferably 60% by mass, even more preferably 55% by mass, particularly preferably 52% by mass, and most preferably 50% by mass. In the case where more emphasis is placed on the driving voltage, the lower limit value is preferably 5% by mass, more preferably 15% by mass, even more preferably 20% by mass, particularly preferably 23% by mass, and most preferably 25% by mass, and the upper limit value is preferably 60% by mass, more preferably 50% by mass, even more preferably 45% by mass, particularly preferably 42% by mass, and most preferably 40% by mass. The ratio of the compound represented by General Formula (IV-1a1) is such that the lower limit value of the content of the compound represented by General Formula (IV-1a1) in the total content of the compound represented by General Formula (IV) in the liquid crystal composition is preferably 60% by mass, more preferably 70% by mass, even more preferably 75% by mass, particularly preferably 78% by mass, and most preferably 80% by mass, and the upper limit value is preferably 90% by mass, more preferably 95% by mass, even more preferably 97% by mass, still more preferably 99% by mass, and particularly preferably 100% by mass.

In addition, as the compound represented by General Formula (IV-1a) to General Formula (IV-1e) other than the compound represented by General Formula (IV-1a1), more specifically, the following are preferable.

[Chem. 29]

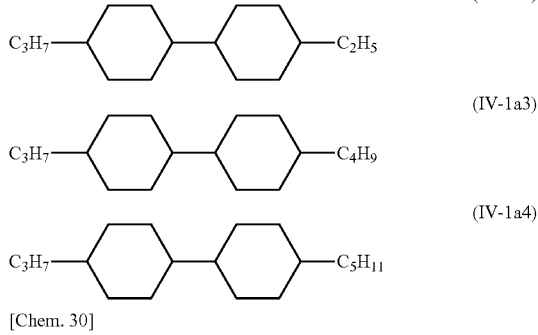

(IV-1a2)
(IV-1a3)
(IV-1a4)

[Chem. 30]

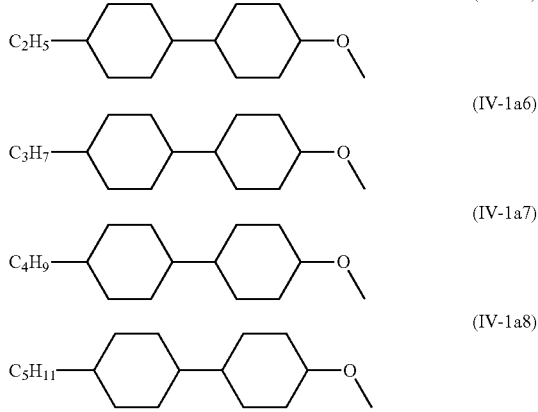

(IV-1a5)
(IV-1a6)
(IV-1a7)
(IV-1a8)

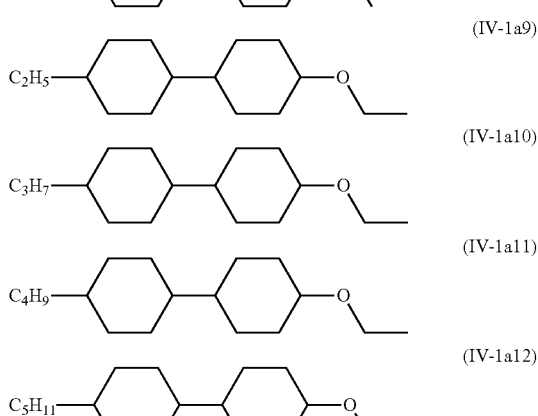

(IV-1a9)
(IV-1a10)
(IV-1a11)
(IV-1a12)

[Chem. 31]

(IV-1a13)
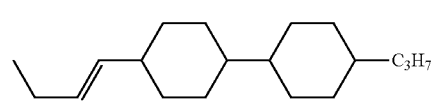
(IV-1a14)
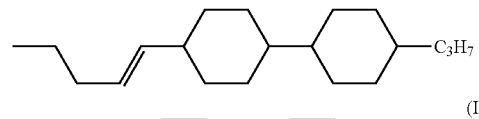
(IV-1a15)
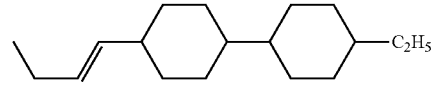
(IV-1a16)
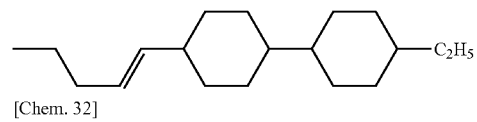
[Chem. 32]
(IV-1b1)
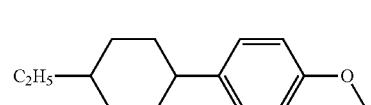
(IV-1b2)
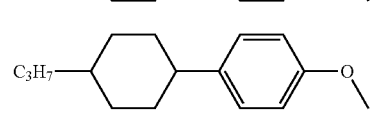
(IV-1b3)
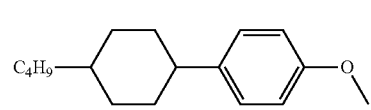
(IV-1b4)
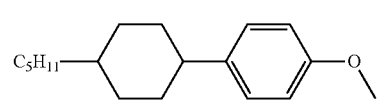
(IV-1b5)
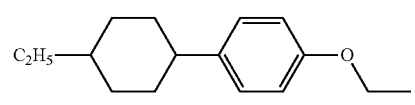
(IV-1b6)
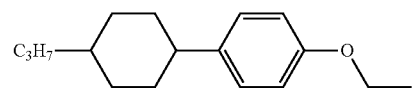
(IV-1b7)
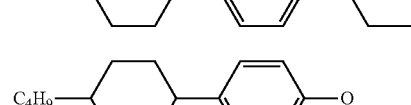
(IV-1b8)
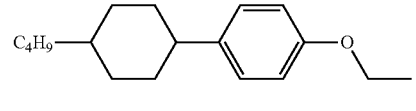
[Chem. 33]
(IV-1c1)
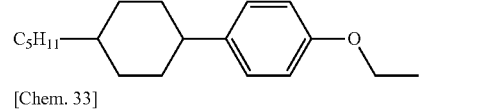
(IV-1c2)
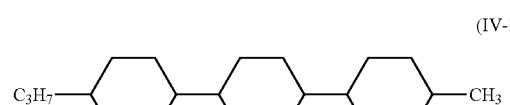
[Chem. 34]
(IV-1d1)
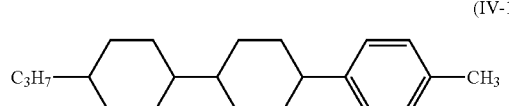
(IV-1d2)
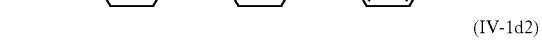
(IV-1d3)
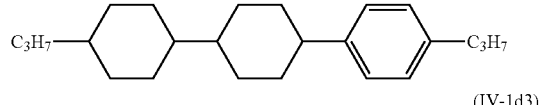
(IV-1d4)
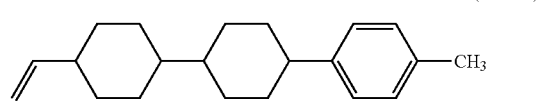
[Chem. 35]
(IV-1e1)
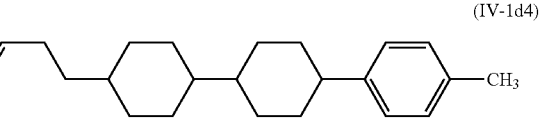
(IV-1e2)
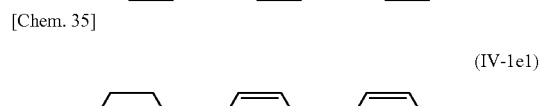
(IV-1e3)
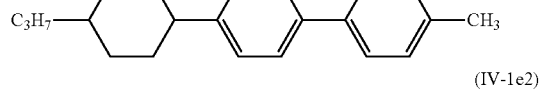
(IV-1e4)
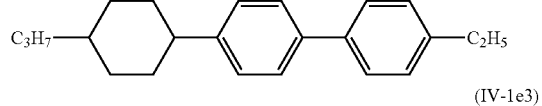
[Chem. 36]
(IV-1e5)
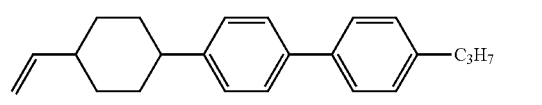
(IV-1e6)
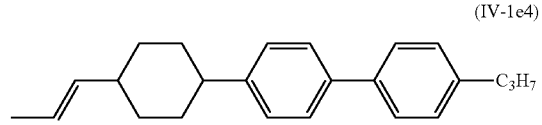
(IV-1e7)
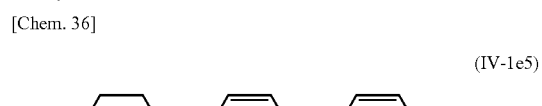
(IV-1e8)
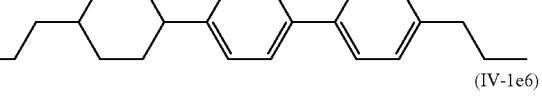
(IV-1e9)
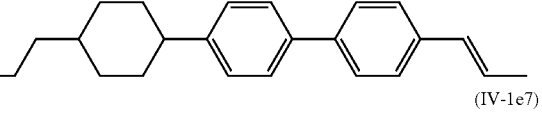
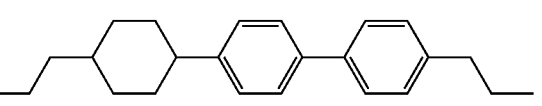

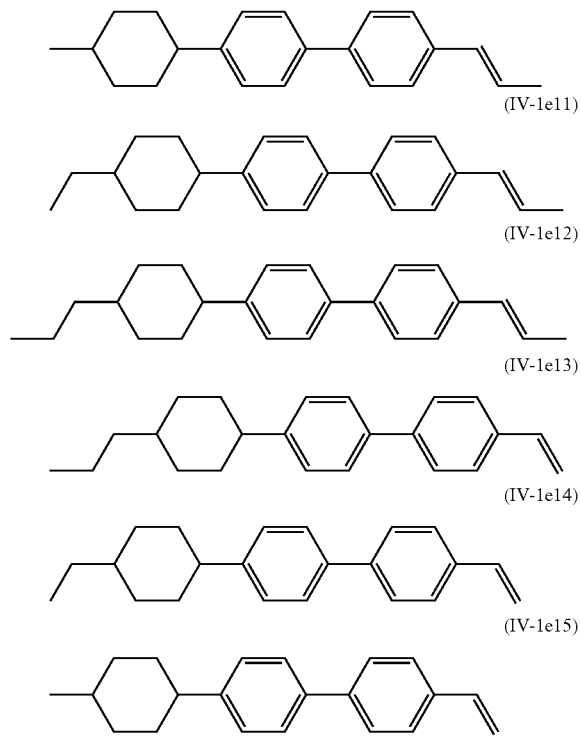

(IV-1e10)
(IV-1e11)
(IV-1e12)
(IV-1e13)
(IV-1e14)
(IV-1e15)

Among the above, the compounds represented by formula (IV-1a1-2), formula (IV-1a1-4), formula (IV-1a1-6), formula (I-1a2) to formula (IV-1a7), formula (IV-1b2), formula (IV-1b6), formula (IV-1d1), formula (IV-1d2), formula (IV-1d3), formula (IV-1e2), formula (IV-1e3), and formula (IV-1e4) are preferable.

In addition, the compound represented by General Formula (IV) is preferably a compound represented by the following General Formula (IV-2) to General Formula (IV-7).

[Chem. 37]

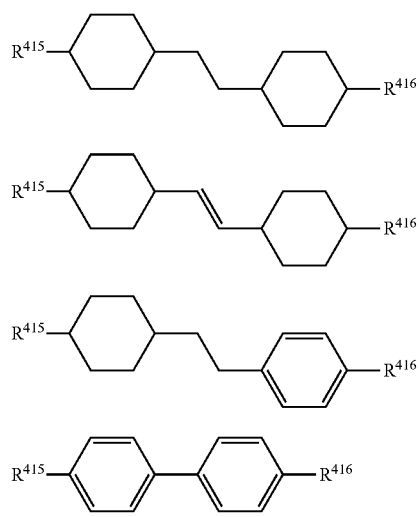

(IV-2)
(IV-3)
(IV-4)
(IV-5)

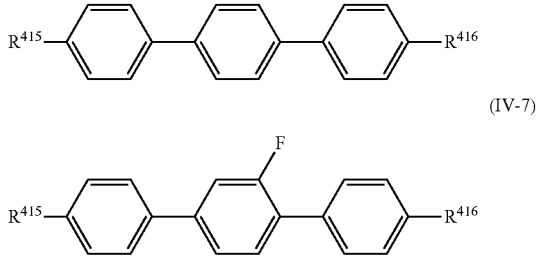

(IV-6)
(IV-7)

In the formulas, $R^{415}$ and $R^{41}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

In addition, as the compound represented by General Formula (IV), compounds represented by General Formula (IV-8), General Formula (IV-9), or General Formula (VI-10) are also preferably contained as 1 type or 2 types or more.

[Chem. 38]

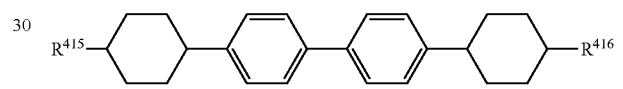

(IV-8)

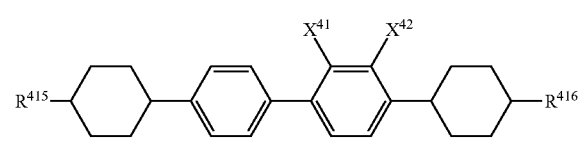

(IV-9)
(IV-10)

In the formulas, $R^{415}$ and $R^{416}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $X^{4'}$ and $X^{42}$ each independently represent a fluorine atom or a hydrogen atom, either one of $X^{41}$ and $X^{42}$ is a fluorine atom, the other one is a hydrogen atom.

In addition, as the compound represented by General Formula (IV), one type or two or more types of compounds represented by General Formula (IV-11-1) to General Formula (IV-11-3) may be contained.

[Chem. 39]

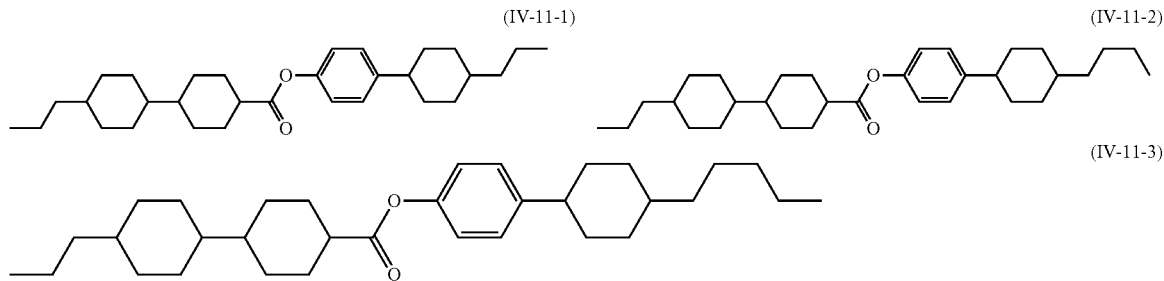

In addition, as the compound represented by General Formula (III), one type or two or more types of compounds represented by General Formula (N-001) may be contained.

[Chem. 40]

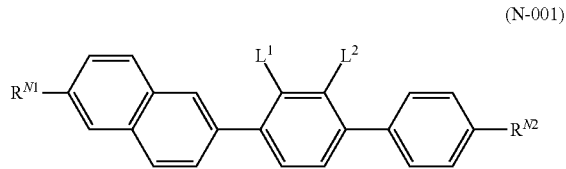

In the formula, $R^{N1}$ and $R^{N2}$ each independently represent an alkyl group having 1 to 8 carbon atoms, an alkoxy group having 1 to 8 carbon atoms, an alkenyl group having 2 to 8 carbon atoms, or an alkenyloxy group having 2 to 8 carbon atoms, and $L^1$ and $L^2$ each independently represent a hydrogen atom, a fluorine atom, or $CH_3$ or $CF_3$, but compounds in which both of $L^1$ and $L^2$ represent a fluorine atom are excluded.

It is preferable that $R^{N1}$ and $R^{N2}$ represent an alkyl group having 1 to 5 carbon atoms.

The liquid crystal composition of the present invention preferably further contains one type or two or more types of compounds represented by General Formula (LC6).

[Chem. 41]

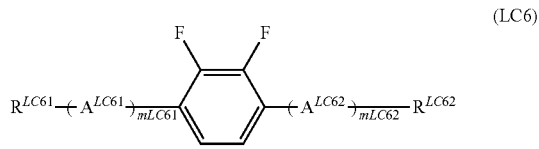

In the formula, $R^{LC61}$ and $R^{LC62}$ each independently represent an alkyl group having 1 to 8 carbon atoms or an alkenyl group having 2 to 15 carbon atoms, one or two or more —$CH_2$—, or two or more non-adjacent —$CH_2$— present in the group may be independently substituted with —O— or —S—, in addition, one or two or more hydrogen atoms present in the group may be independently substituted with a fluorine atom or a chlorine atom, and $A^{LC61}$ and $A^{LC62}$ each independently represent a group selected from the group formed of (a) a 1,4-cyclohexylene group (one —$CH_2$— or two or more non-adjacent —$CH_2$— present in this group may be substituted with —O—), (b) a 1,4-phenylene group (one —CH= or two or more non-adjacent —CH= present in the group may be substituted with —N=) and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=), and group (a), group (b), and group (c) described above may each independently be substituted with a cyano group, a fluorine atom, or a chlorine atom, $m^{LC61}$ and $m^{LC62}$ each independently represent an integer of 0 to 3, $m^{LC61}+m^{LC62}$ is 1, 2 or 3, in the case where a plurality of $A^{LC61}$ and $A^{LC62}$ are present, these may be the same or different.

In General Formula (LC6), $R^{LC61}$ is preferably an alkyl group having 1 to 7 carbon atoms, an alkoxy group having 1 to 7 carbon atoms, an alkenyl group having 2 to 7 carbon atoms and an alkenyloxy group having 2 to 7 carbon atoms, more preferably an alkyl group having 1 to 5 carbon atoms, an alkoxy group having 1 to 5 carbon atoms, an alkenyl group having 2 to 5 carbon atoms or an alkenyloxy group having 2 to 5 carbon atoms, still more preferably an alkyl group having 1 to 5 carbon atoms or an alkenyl group having 2 to 5 carbon atoms, still more preferably an alkyl group having 2 to 5 carbon atoms or an alkenyl group having 2 to 3 carbon atoms, and particularly preferably an alkenyl group having 3 carbon atoms (a propenyl group). $R^{LC62}$ is preferably an alkyl group having 1 to 7 carbon atoms, an alkoxy group having 1 to 7 carbon atoms, an alkenyl group having 2 to 7 carbon atoms, or an alkenyloxy group having 2 to 7 carbon atoms, more preferably an alkyl group having 1 to 5 carbon atoms, an alkoxy group having 1 to 5 carbon atoms, an alkenyl group having 2 to 5 carbon atoms, or an alkenyloxy group having 2 to 5 carbon atoms, and still more preferably an alkoxy group having 1 to 4 carbon atoms. In the case where $R^{LC61}$ and $R^{LC62}$ are alkenyl groups, $R^{LC61}$ and $R^{LC62}$ are preferably selected from a group represented by any one of formulas (R1) to (R5). The black dots in each formula represent the connecting points with the rings.

[Chem. 42]

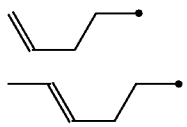
(R4)

(R5)

In order to improve the transmittance of the liquid crystal display, particularly in the case where $m^{LC61}+m^{LC62}$ is 2 or 3, at least one group of $R^{LC61}$ or $R^{LC62}$ is preferably a group other than formula (R2), and more preferably an alkyl group or an alkoxy group.

$A^{LC61}$ and $A^{LC62}$ each independently preferably represent a trans-1,4-cyclohexylene group, a 1,4-phenylene group, a 2-fluoro-1,4-phenylene group, a 3-fluoro-1,4-phenylene group, a 2,5-difluoro-1,4-phenylene group, a 3,5-difluoro-1,4-phenylene group, a 2,3-difluoro-1,4-phenylene group, a 1,4-cyclohexenylene group, a tetrahydro pyran-2,5-diyl group, a 1,3-dioxane-2,5-diyl group, a 1,4-bicyclo [2.2.2] octylene group, a piperidine-1,4-diyl group, a naphthalene-2,6-diyl group, a decahydronaphthalene-2,6-diyl group, or a 1,2,3,4-tetrahydronaphthalene-2,6-diyl group, and more preferably represent a 1,4-phenylene group, a trans-1,4-cyclohexylene group.

The content of the compound represented by General Formula (LC6) is preferably 0 to 50% by mass, more preferably 0 to 40% by mass, still more preferably 0 to 30% by mass, and particularly preferably 1 to 20% by mass.

More specifically, the lower limit value of the content of the compound represented by General Formula (LC6) in the composition is preferably contained as 0% by mass or more (below, % in the composition represents % by mass), preferably contained as 0.5% or more, more preferably 1% or more, more preferably 2% or more, more preferably 3% or more, more preferably 4% or more, more preferably 5% or more, more preferably 10% or more, more preferably 15% or more, more preferably 20% or more, more preferably 25% or more, more preferably 30% or more, more preferably 35% or more, more preferably 38% or more, and more preferably 40% or more. In addition, the upper limit value is preferably 95% or less, more preferably 90% or less, more preferably 88% or less, more preferably 85% or less, more preferably 83% or less, more preferably 80% or less, more preferably 78% or less, more preferably 75% or less, more preferably 73% or less, more preferably 70% or less, more preferably 68% or less, more preferably 65% or less, more preferably 63% or less, more preferably 60% or less, more preferably 55% or less, more preferably 50% or less, more preferably 40% or less, more preferably 30% or less, and more preferably 20% or less.

As the compound represented by General Formula (LC6), it is preferable to contain one type or two or more types of compounds represented by General Formula (II).

[Chem. 43]

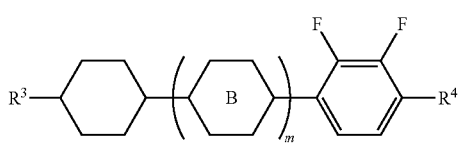
(II)

In the formula, $R^3$ and $R^4$ represent an alkyl group having 1 to 8 carbon atoms, an alkenyl group having 2 to 8 carbon atoms, an alkoxy group having 1 to 8 carbon atoms, an alkenyloxy group having 2 to 8 carbon atoms, one or more hydrogen atoms in the alkyl group, the alkenyl group, the alkoxy group or the alkenyloxy group may be substituted with a fluorine atom, and the methylene group in the alkyl group, the alkenyl group, the alkoxy group or the alkenyloxy group may be substituted with an oxygen atom as long as the oxygen atoms are not bonded consecutively, and B represents a 1,4-phenylene group, a trans-1,4-cyclohexylene group, or a tetrahydropyran-2,5-diyl group, and in the case where B represents a 1,4-phenylene group, one or more hydrogen atoms in the 1,4-phenylene group may be substituted with a fluorine atom, m represents 0, 1, or 2, but in the case where m is 2, two B's may be the same or different.

The lower limit value of the content of the compound represented by General Formula (II) in the liquid crystal composition is preferably 0% by mass, more preferably 0.5% by mass, more preferably 1% by mass or more, more preferably 3% by mass or more, more preferably 5% by mass or more, more preferably 10% by mass, more preferably 20% by mass, still more preferably 25% by mass, particularly preferably 28% by mass, and most preferably 30% by mass, and the upper limit value is preferably 85% by mass, more preferably 75% by mass, even more preferably 70% by mass, particularly preferably 67% by mass, and most preferably 65% by mass.

The compound represented by General Formula (II) is preferably at least one type or more selected from the group of compounds represented by General Formula (IIa) to General Formula (IIc) described below and it is more preferable that two or more types selected therefrom are used.

[Chem. 44]

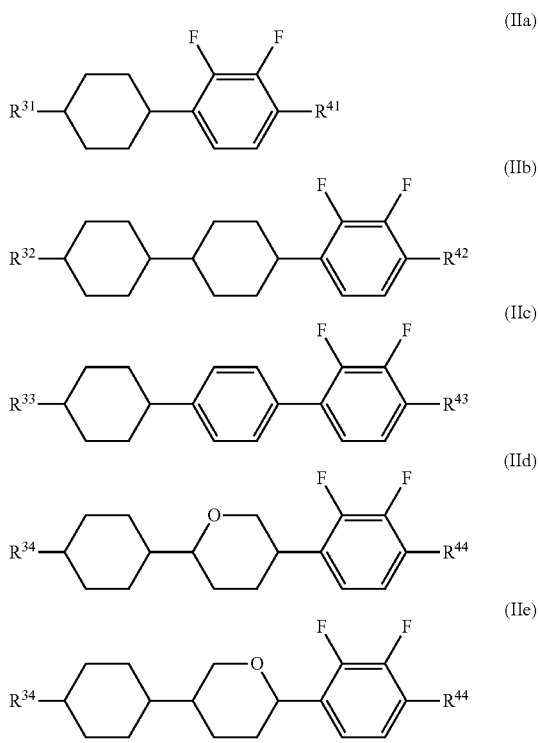

In the formulas, $R^{31}$ to $R^{34}$ and $R^{41}$ to $R^{44}$ represent an alkyl group having 1 to 8 carbon atoms, an alkenyl group having 2 to 8 carbon atoms, an alkoxy group having 1 to 8 carbon atoms or an alkenyloxy group having 2 to 8 carbon atoms.

The compound represented by General Formula (IIa) is specifically preferably a compound represented by formula (IIa-1) to formula (IIa-8) described below.

[Chem. 45]

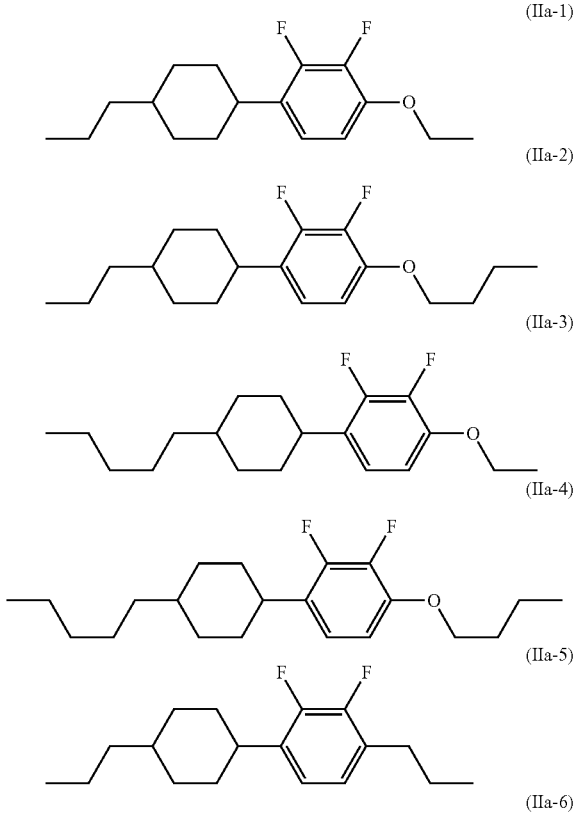

However, a compound represented by formula (IIa-1) to formula (IIa-4) is more preferable, and compounds represented by formula (IIa-1) and formula (IIa-3) are even more preferable.

The lower limit value of the compound represented by General Formula (IIa) is preferably 0% by mass, more preferably 0.5% by mass, more preferably 1% by mass or more, more preferably 3% by mass or more, and more preferably 5% by mass or more, and the upper limit value thereof is preferably 45% by mass, more preferably 35% by mass, even more preferably 30% by mass, particularly preferably 27% by mass, and most preferably 25% by mass.

In the case where four types or more of compounds represented by General Formula (IIa) are used, it is preferable to use a combination of compounds represented by formula (IIa-1) to formula (IIa-4), the content of the compounds represented by formula (IIa-1) to formula (IIa-4) is preferably 50% by mass or more in the compound represented by General Formula (IIa1), more preferably 70% by mass or more, and even more preferably 80% by mass or more.

In the case where three types of compounds represented by General Formula (IIa) are used, it is preferable to use a combination of compounds represented by formula (IIa-1), formula (IIa-2), and formula (IIa-3), the content of the compounds represented by formula (IIa-1), formula (IIa-2), and formula (IIa-3) is preferably 50% by mass or more in the compound represented by General Formula (IIa), more preferably 70% by mass or more, even more preferably 80% by mass or more, particularly preferably 85% by mass or more, and most preferably 90% by mass or more.

In the case where two types of compounds represented by General Formula (IIa) are used, it is preferable to use a combination of compounds represented by formula (IIa-1) and formula (IIa-3), the content of the compounds represented by formula (IIa-1) and formula (IIa-3) is preferably 50% by mass or more in the compound represented by General Formula (IIa), more preferably 70% by mass or more, even more preferably 80% by mass or more, particularly preferably 85% by mass or more, and most preferably 90% by mass or more.

The compounds represented by General Formula (IIb) is specifically preferably a compound represented by formula (IIb-1) to formula (IIb-9) described below.

[Chem. 46]

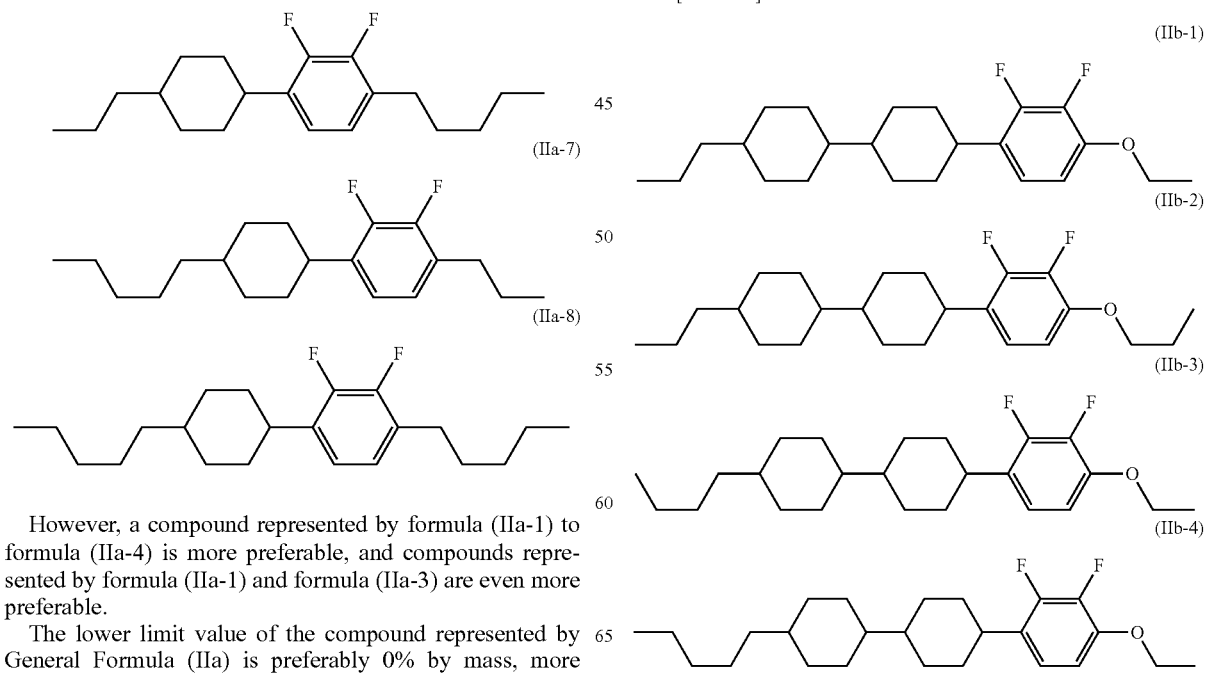

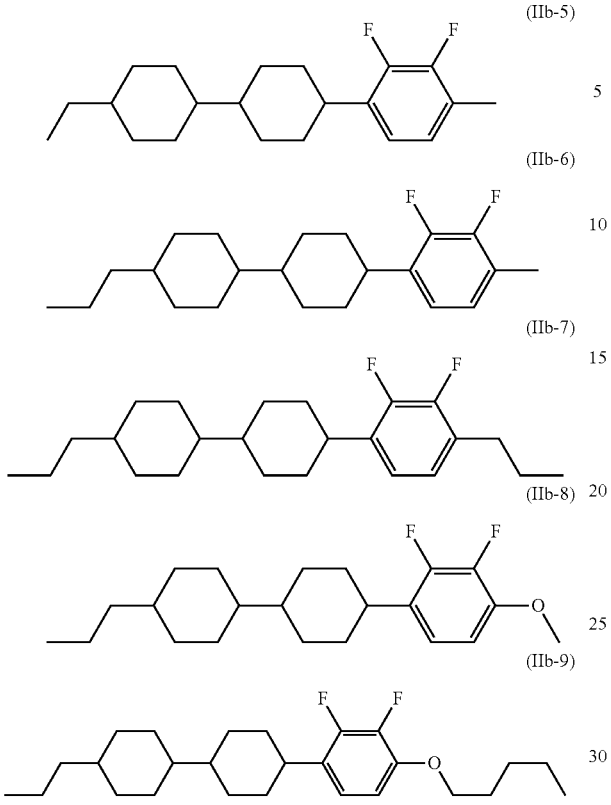

However, the compounds represented by the formula (IIb-1) to the formula (IIb-4), the formula (IIb-7), the formula (IIb-8), and the formula (IIb-9) are more preferable, the compounds represented by the formula (IIb-1) to the formula (IIb-3), the formula (IIb-7), the formula (IIb-8), and the formula (IIb-9) are even more preferable, and the compounds represented by the formula (IIb-1), the formula (IIb-3), the formula (IIb-7), the formula (IIb-8), and the formula (IIb-9) are particularly preferable.

In the case where four or more types of compounds represented by General Formula (IIb) are used, it is preferable to use a combination of compounds represented by formula (IIb-1) to formula (IIb-4), the content of the compounds represented by formula (IIb-1) to formula (IIb-4) is preferably 50% by mass or more in the compound represented by (IIb), more preferably 70% by mass or more, even more preferably 80% by mass or more, particularly preferably 85% by mass or more, and most preferably 90% by mass or more.

In the case where three types of compounds represented by General Formula (IIb) are used, it is preferable to use a combination of compounds represented by formula (IIb-1) to formula (IIb-3), the content of the compounds represented by formula (IIb-1) to formula (IIb-3) is preferably 50% by mass or more in the compound represented by General Formula (IIb), more preferably 70% by mass or more, even more preferably 80% by mass or more, particularly preferably 85% by mass or more, and most preferably 90% by mass or more.

In the case where two types of compounds represented by General Formula (IIb) are used, it is preferable to use a combination of compounds represented by formula (IIb-1) and formula (IIb-3), the content of the compounds represented by formula (IIb-1) and formula (IIb-3) is preferably 50% by mass or more in the compound represented by General Formula (IIa2), more preferably 70% by mass or more, even more preferably 80% by mass or more, particularly preferably 85% by mass or more, and most preferably 90% by mass or more.

The compound represented by General Formula (IIc) is specifically preferably a compound represented by formulas (IIc-1) to (IIc-4) described below.

[Chem. 47]

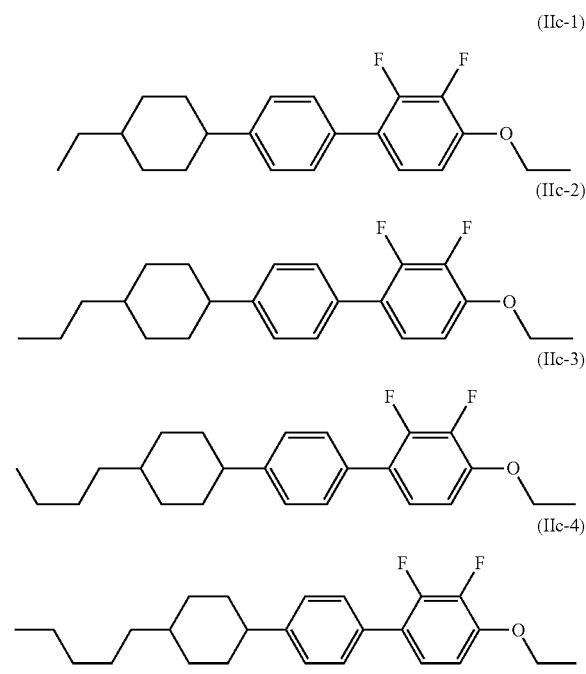

However, a compound represented by formula (IIc-1) or formula (IIc-2) is more preferable.

In the case where two or more types of compounds represented by General Formula (IIc), it is preferable to use a combination of the compounds represented by the formulas (IIc-1) and (IIc-2), and the content of the compounds represented by formula (IIc-1) and formula (IIc-2) is preferably 50% by mass or more in the compound represented by General Formula (IIc), more preferably 70% by mass or more, even more preferably 80% by mass or more, particularly preferably 85% by mass or more, and most preferably 90% by mass or more.

Specifically, as the compounds represented by General Formula (IId) or General Formula (IIe), compounds represented by formulas (IId-1) to (IId-4) and formulas (IIe-1) to (IIe-4):

[Chem. 48]

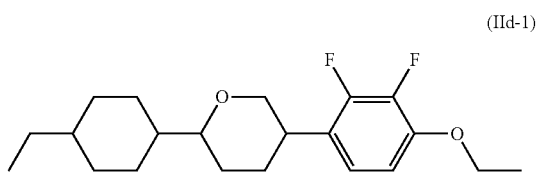

-continued

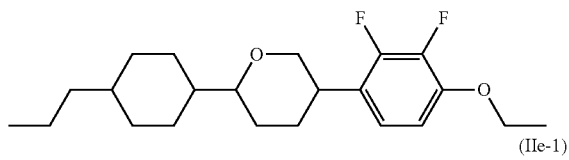
(IId-2)

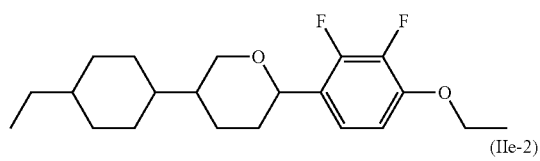
(IIe-1)

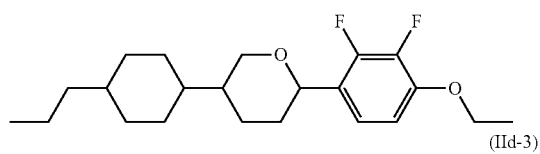
(IIe-2)

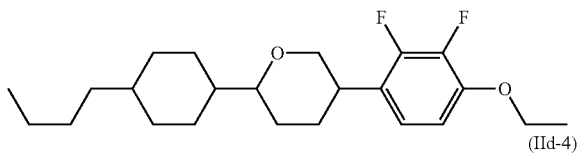
(IId-3)

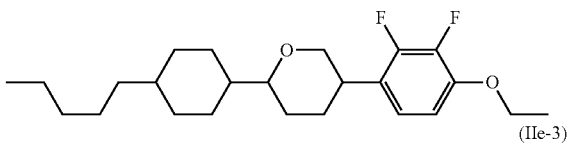
(IId-4)

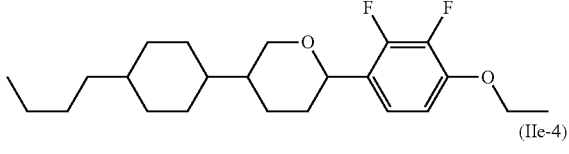
(IIe-3)

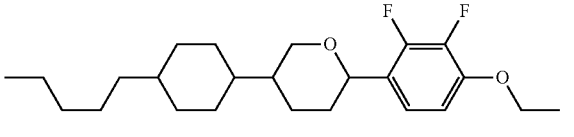
(IIe-4)

are preferable.

The lower limit value of the content of the compound represented by General Formula (IId) in the liquid crystal composition according to present invention is preferably 1% by mass, and more preferably 2% by mass, and the upper limit value thereof is preferably 15% by mass, more preferably 12% by mass, even more preferably 10% by mass, particularly preferably 8% by mass, and most preferably 7% by mass.

The lower limit value of the content of the compound represented by General Formula (IIe) in the liquid crystal composition according to the present invention is preferably 1% by mass, and more preferably 2% by mass, and the upper limit value thereof is preferably 15% by mass, more preferably 12% by mass, even more preferably 10% by mass, particularly preferably 8% by mass, and most preferably 7% by mass.

In addition, as the compound represented by General Formula (LC6), it is preferable to contain a compound represented by General Formula (III). However, the compound represented by General Formula (III) excludes the compound represented by General Formula (II).

[Chem. 49]

(III)

In the formula, $R^7$ and $R^8$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, and one or more hydrogen atoms in the alkyl group, alkenyl group, alkoxy group or alkenyloxy group may be substituted with a fluorine atom, and a methylene group in the alkyl group, the alkenyl group, the alkoxy group, or an alkenyloxy group may be substituted with an oxygen atom as long as the oxygen atom is not bonded consecutively, and $A^1$ and $A^2$ each independently represent a 1,4-cyclohexylene group, a 1,4-phenylene group, or a tetrahydropyran-2,5-diyl group, in the case where $A^1$ and/or $A^2$ represents a 1,4-phenylene group, one or more hydrogen atom in the 1,4-phenylene group may be substituted with a fluorine atom, in addition, one or more carbon atom (—$CH_2$—) of the cyclohexane ring may be substituted with an oxygen atom, and $n^1$ and $n^2$ each independently represent 0, 1, 2, or 3, $n^1+n^2$ is 1 to 3, and in the case where there are a plurality of $A^1$, $A^2$, $Z^1$, and $Z^2$, these may be the same or different, but compounds where $n^1$ is 1 or 2, $n^2$ is 0, and $A^1$ which is directly bonded to $R^7$ is a 1,4-cyclohexylene group are excluded.

The lower limit of the content of the compound represented by General Formula (III) in the liquid crystal composition is preferably 0% by mass, more preferably 0.5% by mass, more preferably 1% or more, more preferably 2% by mass, more preferably 3% by mass, even more preferably 4% by mass, and particularly preferably 5% by mass, and the upper limit value thereof is preferably 45% by mass, more preferably 35% by mass, still more preferably 30% by mass, particularly preferably 27% by mass, and most preferably 25% by mass.

In General Formula (III), $R^7$ and $R^8$ are preferably an alkyl group or an alkenyl group when the ring structure to be bonded is cyclohexane or tetrahydropyran, and when benzene, an alkyl group, an alkoxy group, or an alkenyl group are preferable. When cyclohexane or tetrahydropyran, $R^7$ and $R^8$ preferably represent an alkyl group having 1 to 8 carbon atoms or an alkenyl group having 2 to 8 carbon atoms, more preferably represent an alkyl group having 1 to 8 carbon atoms, more preferably represent an alkyl group having 3 to 5 carbon atoms, still more preferably represent an alkyl group having 3 or 5 carbon atoms, and are preferably linear. In addition, in General Formula (III), when the ring structure to be bonded is benzene, $R^7$ and $R^8$ preferably represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, more preferably represent an alkyl group having 1 to 8 carbon atoms or an alkoxy group having 1 to 8 carbon atoms, more preferably represent an alkyl group having 3 to 5 carbon atoms or an alkoxy group having 2 to 4 carbon atoms, more preferably represent an alkyl group having 3 or 5 carbon atoms or an alkoxy group having 2 or 4 carbon atoms, even more preferably represent an alkoxy group having 2 or 4 carbon atoms, and are preferably linear.

In the case where emphasis is placed on improving the response speed of the display, an alkenyl group is preferable, and in the case where emphasis is placed on reliability of the voltage holding ratio or the like, an alkyl group is preferable. The alkenyl group is preferably selected from the group represented by any one of formulas (R1) to (R5) described below.

[Chem. 50]

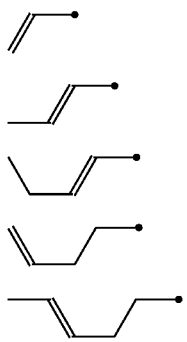

(R1)

(R2)

(R3)

(R4)

(R5)

The black dots in each formula represent the connecting points with the rings.

$A^1$ and $A^2$ each independently preferably represent a 1,4-cyclohexylene group, a 1,4-phenylene group, or a tetrahydropyran-2,5-diyl group.

$Z^1$ and $Z^2$ are each independently preferably a single bond in the case where emphasis is placed on a reduction in viscosity, and in the case where emphasis is placed on increasing the absolute value of Δε, —OCH$_2$—, —OCF$_2$—, —CH$_2$O—, or —CF$_2$O— are preferable, and it is preferable that the oxygen atom is arranged to be linked to the 2,3-difluorobenzene-1,4-diyl group.

$n^1+n^2$ is preferably 2 or less, and in the case where emphasis is placed on reducing the viscosity, 1 is preferable, and in the case where emphasis is placed on $T_{ni}$ or in the case where emphasis is placed on increasing Δn, 2 is preferable.

The compound represented by General Formula (III) is preferably selected from the group of compounds represented by the following General Formulas (IIIa1) and (IIIa2).

[Chem. 51]

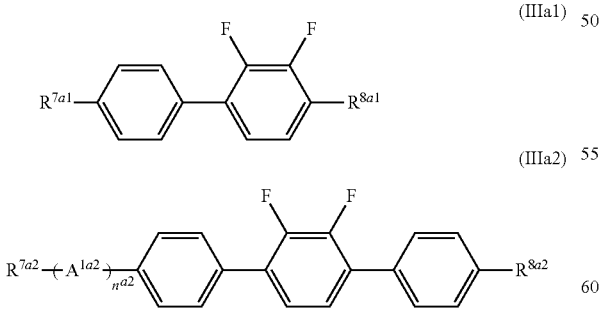

(IIIa1)

(IIIa2)

In the formulas, $R^{7a1}$ and $R^{7a2}$ and $R^{8a1}$ and $R^{8a2}$ each independently represent an alkyl group having 1 to 8 carbon atoms, an alkenyl group having 2 to 8 carbon atoms, an alkoxy group having 1 to 8 carbon atoms or an alkenyloxy group having 2 to 8 carbon atoms, one or more hydrogen atoms in the alkyl group, the alkenyl group, the alkoxy group, or the alkenyloxy group may be substituted with a fluorine atom, and the methylene group in the alkyl group, the alkenyl group, the alkoxy group, or the alkenyloxy group may be substituted with an oxygen atom as long as the oxygen atoms are not bonded consecutively, and may be substituted with a carbonyl group as long as the carbonyl groups are not bonded consecutively, $n^{a2}$ represents 0 or 1, $A^{1a2}$ represents a 1,4-cyclohexylene group, a 1,4-phenylene group, or a tetrahydropyran-2,5-diyl group, and one or more hydrogen atoms in the 1,4-phenylene group in General Formula (IVa1) and General Formula (IVa2) may be substituted with a fluorine atom.

The compound represented by General Formula (IIIa1) is specifically preferably a compound represented by the following formulas (IIIa1-1) to (IIIa1-8).

[Chem. 52]

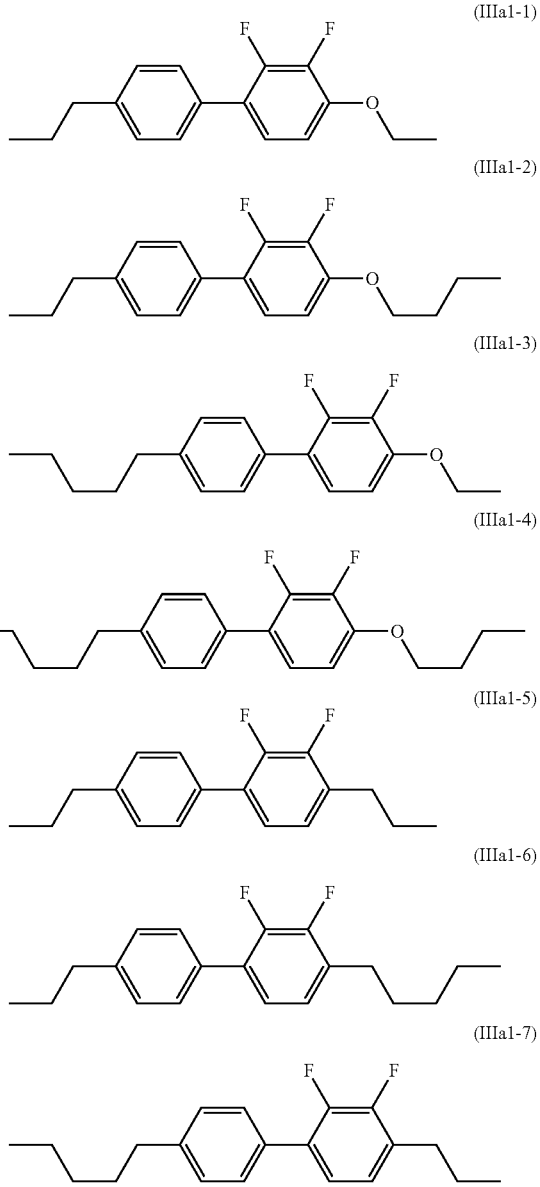

(IIIa1-1)

(IIIa1-2)

(IIIa1-3)

(IIIa1-4)

(IIIa1-5)

(IIIa1-6)

(IIIa1-7)

-continued (IIIa1-8)

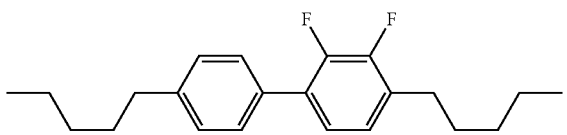

However, the compounds represented by the formula (IIIa1-1) to the formula (IIIa1-4) are more preferable, the compounds represented by the formula (IIIa1-1) and the formula (IIIa1-3) are even more preferable, and the compound represented by formula (IIIa1-1) is particularly preferable.

In the case where four or more types of the compounds represented by General Formula (IIIa1) are used, it is preferable to use a combination of the compounds represented by the formulas (IIIa1-1) to (IIIa1-4), and the content of the compound represented by formula (IIIa1-1) to formula (IIIa1-4) is preferably 50% by mass or more in the compound represented by General Formula (IIIa1), more preferably 70% by mass or more, even more preferably 80% by mass or more, particularly preferably 85% by mass or more, and most preferably 90% by mass or more.

In the case where three types of the compounds represented by General Formula (IIIa1) are used, it is preferable to use a combination of the compounds represented by the formulas (IIIa1-1) to (IIIa1-3), the content of the compounds represented by formula (IIIa1-1) to formula (IIIa1-3) in the compound represented by General Formula (IIIa1) is preferably 50% by mass or more, more preferably 70% by mass or more, even more preferably 80% by mass or more, particularly preferably 85% by mass or more, and most preferably 90% by mass or more.

In the case where two types of compounds represented by General Formula (IIIa1), it is preferable to use a combination of compounds represented by formula (IIIa1-1) and formula (IIIa1-3), and the content of the compound represented by formula (IIIa1-1) and formula (IIIa1-3) in the compound represented by General Formula (IIIa1) is preferably 50% by mass or more, more preferably 70% by mass or more, even more preferably 80% by mass or more, particularly preferably 85% by mass or more, and most preferably 90% by mass or more.

The compound represented by General Formula (IIIa2) are specifically preferably the compounds represented by the following General Formula (IIIa2-1) to General Formula (IIIa2-9)

[Chem. 53]

(IIIa2-1)

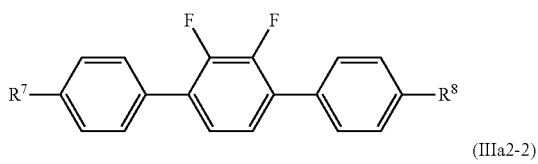

(IIIa2-2)

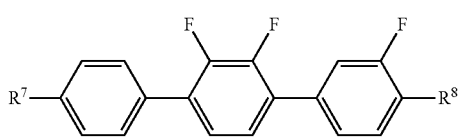

(IIIa2-3)

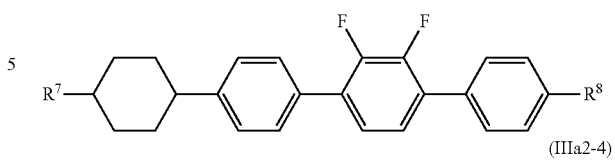

(IIIa2-4)

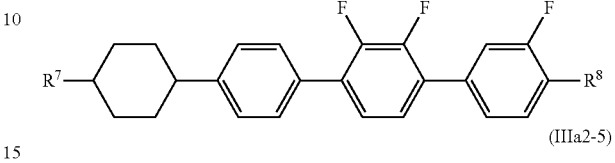

(IIIa2-5)

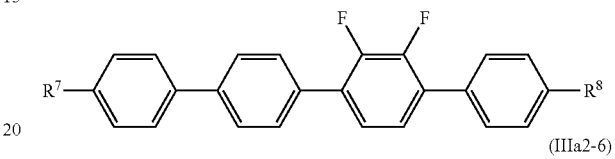

(IIIa2-6)

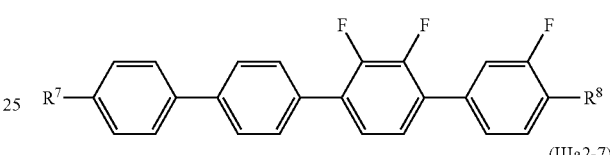

(IIIa2-7)

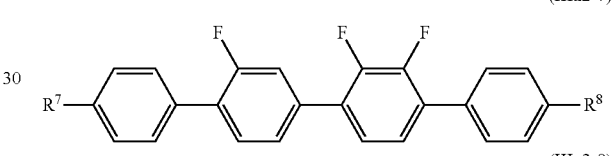

(IIIa2-8)

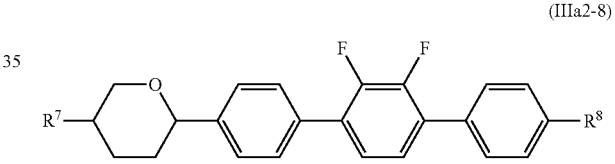

(IIIa2-9)

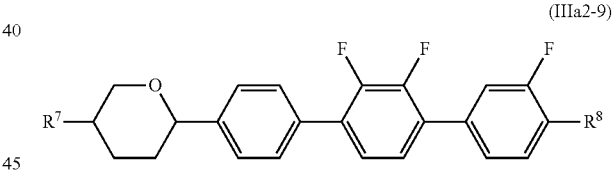

In the formulas, $R^7$ represents the same meaning as $R^7$ in General Formula (III), and $R^8$ represents the same meaning as $R^8$ in General Formula (III).

In the case where the compound represented by General Formula (IIIa2) is used, it is preferable to use the compound represented by the formula (IIIa2-1), but the content of the compound represented by the formula (IIIa2-1) is preferably 50% by mass or more in the compound represented by General Formula (IIIa2), more preferably 70% by mass or more, even more preferably 80% by mass or more, particularly preferably 85% by mass or more, and most preferably 90% by mass or more.

$R^7$ and $R^8$ in General Formula (IIIa2) each independently represent an alkyl group having 1 to 8 carbon atoms, an alkenyl group having 2 to 8 carbon atoms, an alkoxy group having 1 to 8 carbon atoms, an alkenyloxy group having 2 to 8 carbon atoms, and preferably represent an alkyl group having 1 to 8 carbon atoms or an alkenyl group having 2 to 8 carbon atoms, more preferably an alkyl group having 2 to 5 carbon atoms or an alkenyl group having 2 to 5 carbon atoms, even more preferably an alkyl group having 2 to 5 carbon atoms, and are preferably linear, and in the case where both of $R^7$ and $R^8$ are alkyl groups, it is preferable that the number of carbon atoms be different for each.

More specifically, a compound where $R^7$ represents a propyl group and $R^8$ represents an ethyl group, or a compound where $R^7$ represents a butyl group and $R^3$ represents an ethyl group is preferable.

In order to improve the transmittance of the liquid crystal display, it is more preferable that at least one group of $R^7$ or $R^8$ be an alkyl group or an alkoxy group.

The 1,4-cyclohexylene group in the present application is preferably a trans-1,4-cyclohexylene group.

In the liquid crystal composition of the present invention, the total content of the compound selected from the group of compounds represented by General Formula (i) to General Formula (iii) and the compound represented by General Formula (IV) is preferably 50 to 99% by mass, more preferably 55 to 99% by mass, even more preferably 60 to 99% by mass, even more preferably 65 to 99% by mass, even more preferably 70 to 99% by mass, and particularly preferably 75 to 99% by mass.

More specifically, the lower limit value of the total content of the compound selected from the group of compounds represented by General Formula (i) to General Formula (iii) and the compound represented by General Formula (IV) in the composition is preferably contained as 30% by mass (below, % in the composition represents % by mass) or more, more preferably contained as 35% or more, more preferably contained as 40% or more, more preferably contained as 45% or more, more preferably contained as 50% or more, more preferably contained as 55% or more, more preferably contained as 60% or more, more preferably contained as 65% or more, more preferably contained as 70% or more, more preferably contained as 75% or more, more preferably contained as 78% or more, more preferably contained as 80% or more, more preferably contained as 83% or more, more preferably contained as 85% or more, more preferably contained as 90% or more, and more preferably contained as 91% or more. In addition, the upper limit value is preferably contained as 100% or less, more preferably contained as 99% or less, more preferably contained as 95% or less, more preferably contained as 90% or less, more preferably contained as 85% or less, more preferably contained as 80% or less, more preferably contained as 75% or less, more preferably contained as 70% or less, more preferably contained as 65% or less, more preferably contained as 60% or less, more preferably contained as 55% or less, and more preferably contained as 50% or less.

In the liquid crystal composition of the present invention, the total content of the compound selected from the group of compounds represented by General Formula (i) to General Formula (iii) and the compound represented by General Formula (LC6) is preferably 10 to 90% by mass, more preferably 20 to 80% by mass, and particularly preferably 30 to 70% by mass.

More specifically, the lower limit of the content of the compound selected from the group of compounds represented by General Formula (i) to General Formula (iii) and the compound represented by General Formula (LC6) in the composition is preferably 1% by mass (below, % in the composition represents % by mass) or more, more preferably contained as 5% or more, more preferably contained as 10% or more, more preferably contained as 13% or more, more preferably contained as 15% or more, more preferably contained as 18% or more, more preferably contained as 20% or more, more preferably contained as 23% or more, more preferably contained as 25% or more, more preferably contained as 28% or more, more preferably contained as 30% or more, more preferably contained as 33% or more, more preferably contained as 35% or more, more preferably contained as 38% or more, and more preferably contained as 40% or more. In addition, the upper limit is preferably contained as 95% or less, more preferably contained as 90% or less, more preferably contained as 88% or less, more preferably contained as 85% or less, more preferably contained as 83% or less, more preferably contained as 80% or less, more preferably contained as 78% or less, more preferably contained as 75% or less, more preferably contained as 73% or less, more preferably contained as 70% or less, more preferably contained as 68% or less, more preferably contained as 65% or less, more preferably contained as 63% or less, more preferably contained as 60% or less, more preferably contained as 55% or less, more preferably contained as 50% or less, and more preferably contained as 40% or less.

The liquid crystal composition of the present invention preferably does not contain a compound having a structure in which oxygen atoms are bonded to each other, such as a peroxycarboxylic acid (—CO—OO—) structure in the molecule.

In the case where emphasis is placed on the reliability and long-term stability of the liquid crystal composition, the content of the compound having a carbonyl group with respect to the total mass of the composition is preferably 5% by mass or less, more preferably 3% by mass or less, even more preferably 1% by mass or less, and most preferably substantially not contained.

It is preferable to increase the content of the compound where all the ring structures in the molecule are 6-membered rings, and the content of the compound where all the ring structures in the molecule are 6-membered rings with respect to the total mass of the composition is preferably 80% by mass or more, more preferably 90% by mass or more, even more preferably 95% by mass or more, and the liquid crystal composition is most preferably formed only by the compound where substantially all the ring structures in the molecule are 6-membered rings.

In order to suppress deterioration due to oxidation of the liquid crystal composition, it is preferable to reduce the content of the compound having a cyclohexenylene group as a ring structure, and the content of the compound having a cyclohexenylene group with respect to the total mass of the composition is preferably 10% by mass or less, more preferably 5% by mass or less, and even more preferably substantially not contained.

In order to suppress the deterioration due to oxidation of the liquid crystal composition, it is preferable to reduce the content of the compound having —CH=CH— as a linking group, and the content of the compound with respect to the total mass of the composition is preferably 10% by mass or less, more preferably 5% by mass or less, and the compound is even more preferably substantially not contained.

In the case where emphasis is placed on improvement in viscosity and improvement in $T_{NI}$, the content of a compound having a 2-methylbenzene-1,4-diyl group in the molecule in which a hydrogen atom may be substituted with a halogen is preferably reduced, the content of the compound having the 2-methylbenzene-1,4-diyl group in the molecule with respect to the total mass of the composition is preferably 10% by mass or less, more preferably 5% by mass or less, and the compound is even more preferably substantially not contained.

In the case where the compound contained in the composition of the present invention has an alkenyl group as a side chain, in the case where the alkenyl group is bonded to cyclohexane, the number of carbon atoms of the alkenyl group is preferably 2 to 5, and in the case where the alkenyl group is bonded to benzene, the number of carbon atoms of the alkenyl group is preferably 4 to 5, and the unsaturated bond of the alkenyl group and the benzene are preferably not directly bonded. In addition, in the case where emphasis is placed on the stability of the liquid crystal composition, it is preferable to reduce the content of the compound having an alkenyl group as a side chain and having a 2,3-difluorobenzene-1,4-diyl group, the content of the compound with respect to the total mass of the composition is preferably 10% by mass or less, more preferably 5% by mass or less, and the compound is even more preferably substantially not contained.

The liquid crystal composition of the present invention may contain additives such as ordinary nematic liquid crystal, smectic liquid crystal, cholesteric liquid crystal, antioxidants, ultraviolet absorbers, and infrared absorbers in addition to the above compound.

The following are preferable as additives which are able to be used in the present invention.

[Chem. 54]

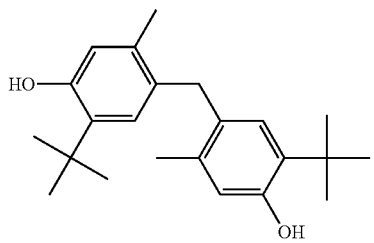
(III-1)

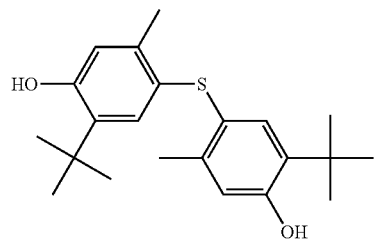
(III-2)

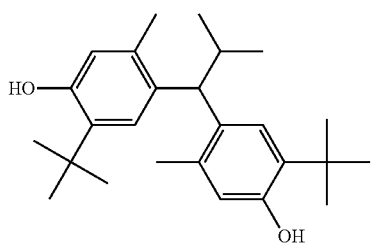
(III-3)

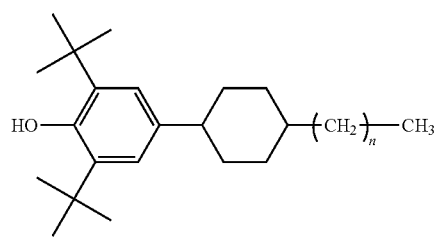
(III-4)

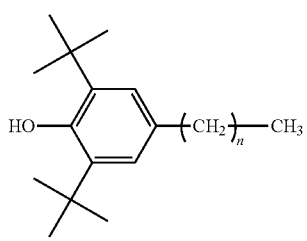
(III-5)

[Chem. 55]

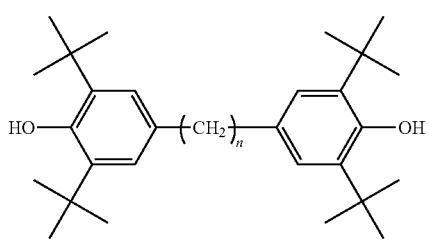
(III-6)

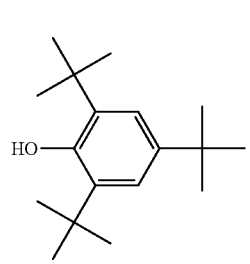
(III-7)

-continued
(III-8)
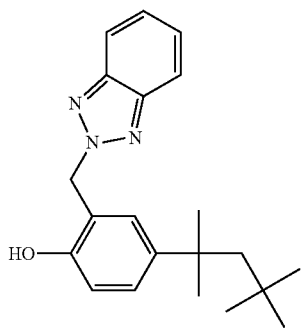
(III-9)
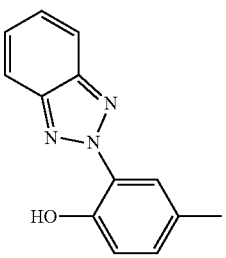
(III-10)
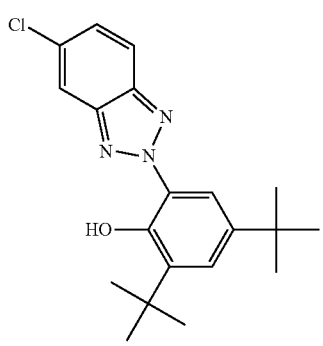
[Chem. 56]
(III-11)
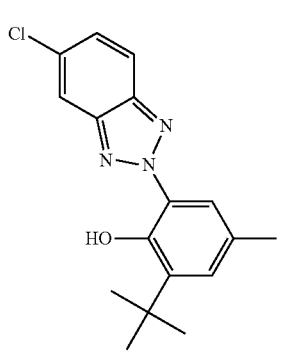
(III-12)
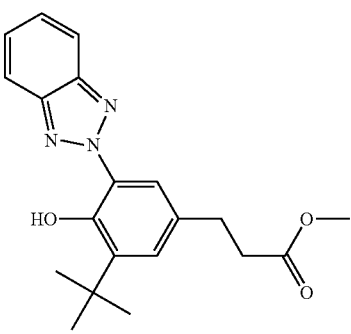
(III-13)
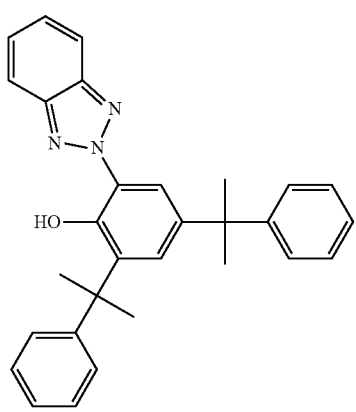
(III-14)
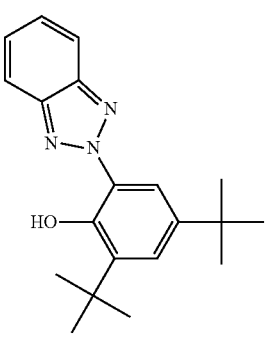

(III-15)
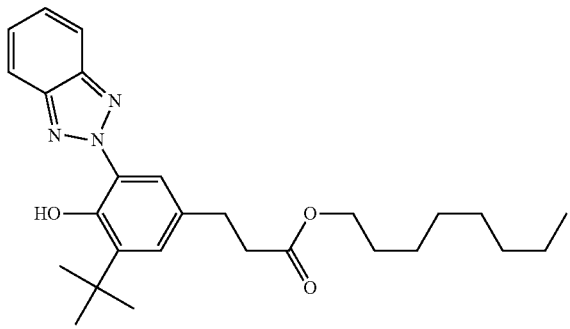
[Chem. 57]
(III-16)
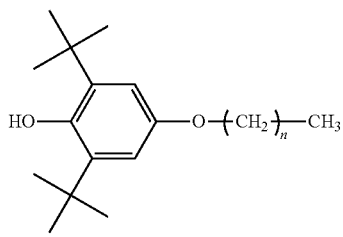
(III-17)
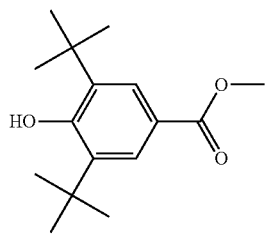
(III-18)
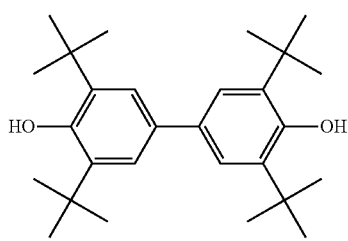
(III-19)
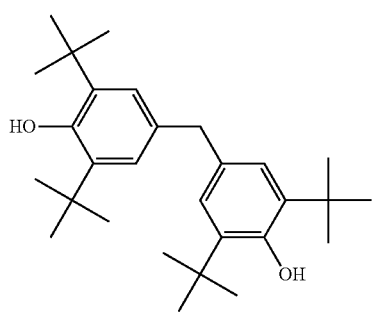
(III-20)
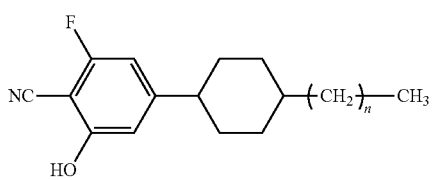
[Chem. 58]
(III-21)
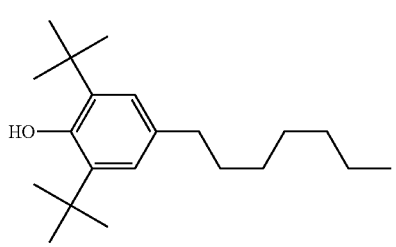
(III-22)
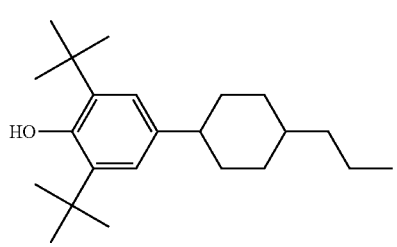
(III-23)
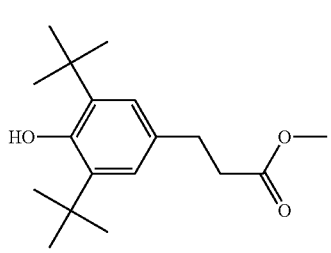
(III-24)
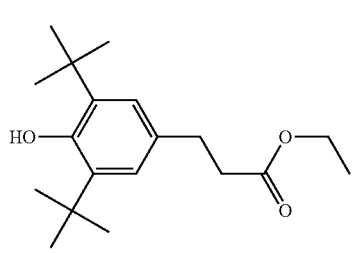

(III-25)
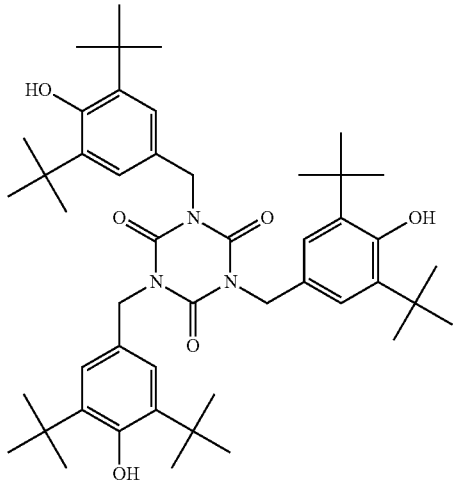
[Chem. 59]
(III-26)
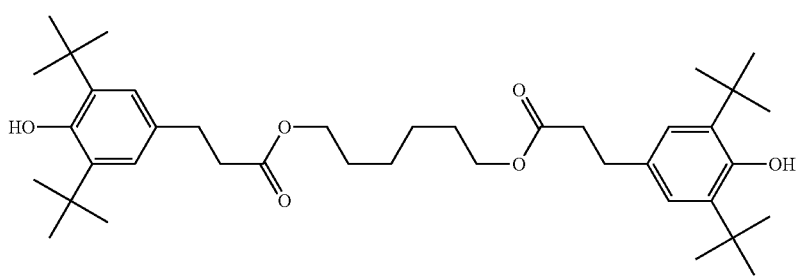
(III-27)
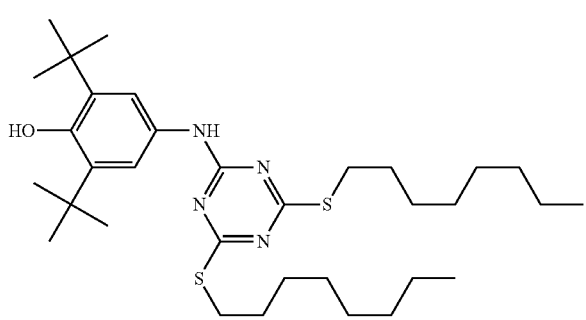
(III-28)
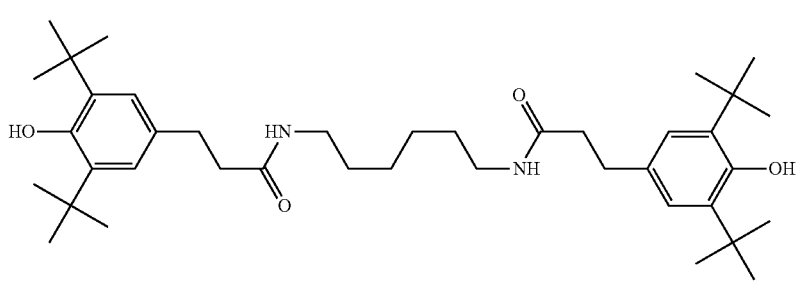
(III-29)
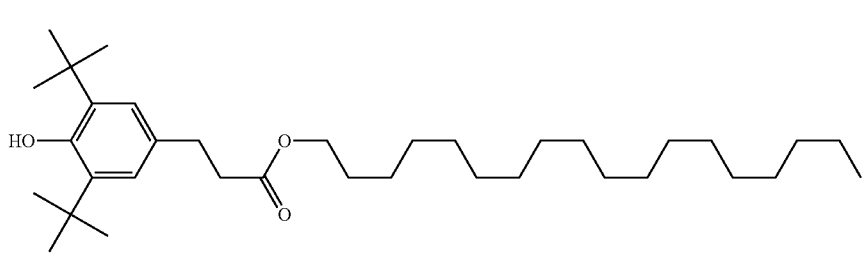

(III-30)
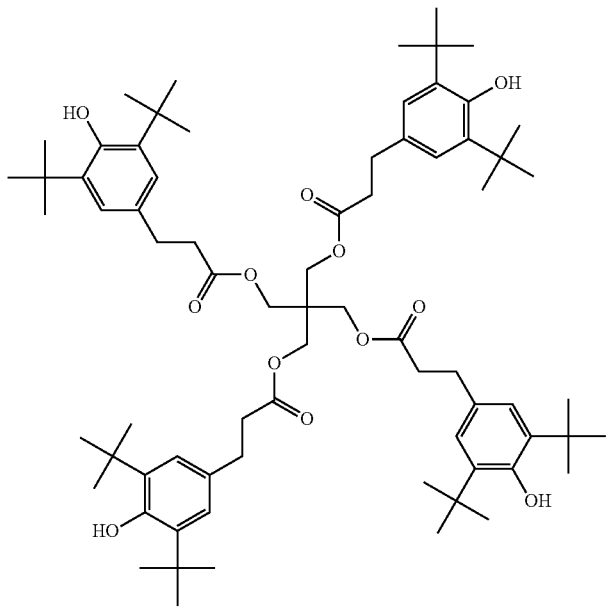
[Chem. 60]
(III-31)
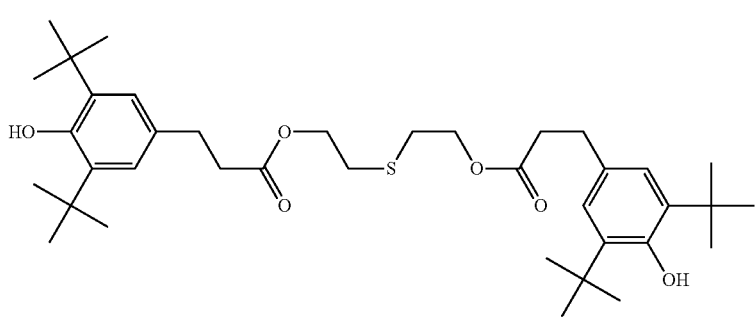
(III-32)
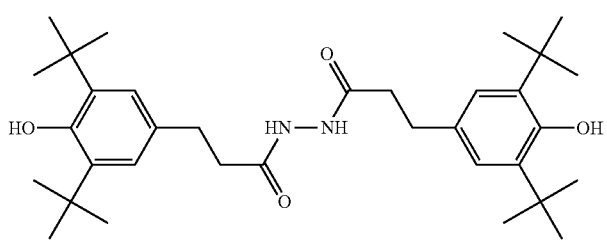
(III-33)
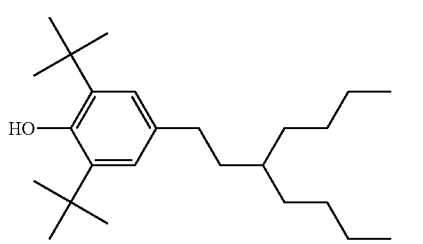
(III-34)
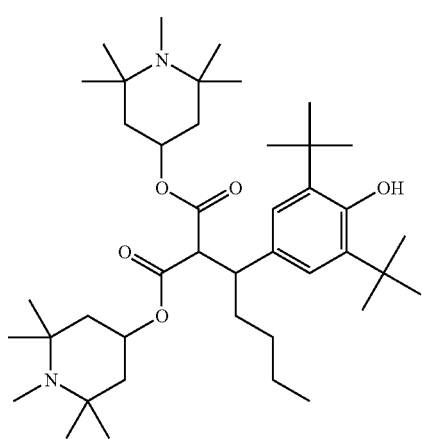

(III-35)

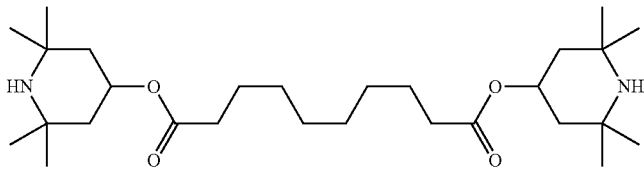

(III-36)

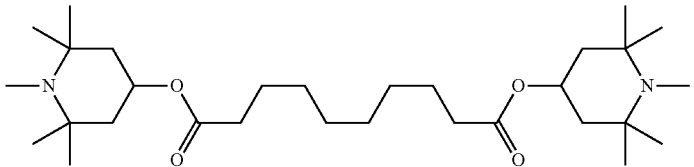

[Chem. 61]

(III-37)

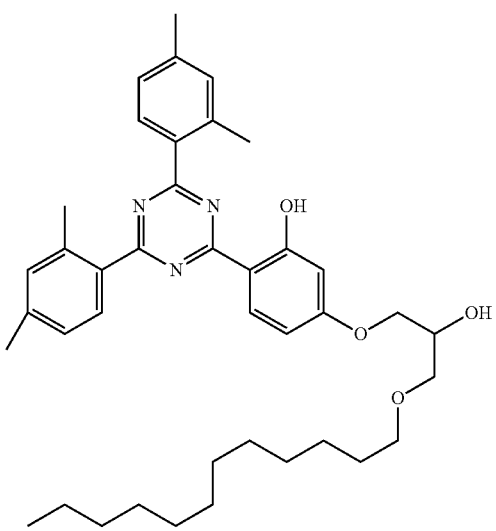

(III-38)

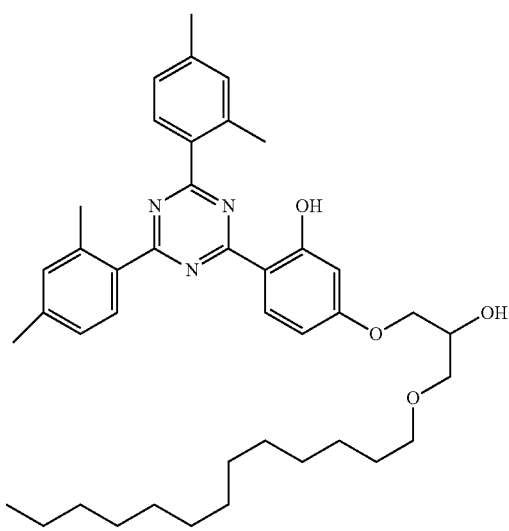

In the formulas, n represents an integer of 0 to 20.

The value of the dielectric anisotropy Δε of the liquid crystal composition of the present invention has negative dielectric anisotropy, and the absolute value of the dielectric anisotropy is 2 or more. The value of the dielectric anisotropy Δε is preferably −2.0 to −6.0 at 25° C., more preferably −2.5 to −5.0, and particularly preferably −2.5 to −4.0 and in more detail, preferably −2.5 to −3.4 in the case where emphasis is placed on the response speed, and preferably −3.4 to −4.0 in the case where emphasis is placed on the driving voltage.

The value of the refractive index anisotropy Δn of the liquid crystal composition in the present invention is preferably 0.08 to 0.13 at 25° C. and 0.09 to 0.12 is more preferable. More specifically, preferably 0.10 to 0.12 in the case of corresponding to a thin cell gap, and preferably 0.08 to 0.10 in the case of corresponding to a thick cell gap.

The rotational viscosity ($\gamma_1$) of the liquid crystal composition in the present invention is preferably 150 or less, more preferably 130 or less, and particularly preferably 120 or less.

In the liquid crystal composition of the present invention, it is preferable that Z, which is a function of the rotational viscosity and refractive index anisotropy, exhibit a specific value.

$$Z = \gamma_1 / \Delta n^2 \quad \text{[Formula 1]}$$

In the formula, $\gamma_1$ represents rotational viscosity and Δn represents refractive index anisotropy.

Z is preferably 13,000 or less, more preferably 12,000 or less, and particularly preferably 11,000 or less.

The nematic phase-isotropic liquid phase transition temperature ($T_{NI}$) of the liquid crystal composition of the present invention is 60° C. or more, preferably 75° C. or more, more preferably 80° C. or more, and even more preferably 90° C. or more.

The liquid crystal composition of the present invention needs to have a specific resistance of $10^{12}$ (Ω·m) or more, preferably $10^{13}$ (Ω·m), and more preferably $10^{14}$ (Ω·m) or more.

The liquid crystal composition of the present invention may contain ordinary nematic liquid crystals, smectic liquid crystals, cholesteric liquid crystals, antioxidants, ultraviolet absorbers, and the like in addition to the compounds described above depending on the application and in the case where chemical stability of the liquid crystal composition is required, it is preferable not to have a chlorine atom in the molecule, and in the case where stability for light such as ultraviolet rays is required in the liquid crystal composition, it is desirable not to have a condensed ring or the like representing a naphthalene ring or the like having a long conjugation length and an absorption peak in the ultraviolet region in the molecule.

(Liquid Crystal Display)

The liquid crystal composition of the present invention as described above is applied to an FFS mode liquid crystal display. Below, an example of the FFS mode liquid crystal display according to the present invention will be described with reference to FIGS. 1 to 6.

FIG. 1 is a diagram schematically showing a configuration of a liquid crystal display. In FIG. 1, the constituent elements are illustrated separately for the sake of convenience of explanation. As shown in FIG. 1, the configuration of the liquid crystal display 10 according to the present invention is an FFS mode liquid crystal display which has a liquid crystal composition (or a liquid crystal layer 5) interposed between a first transparent insulating substrate 2 and a second transparent insulating substrate 7 disposed to oppose each other, in which the liquid crystal composition of the present invention is used as the liquid crystal composition. In the first transparent insulating substrate 2, an electrode layer 3 is formed on the surface of the liquid crystal layer 5 side. In addition, the liquid crystal display 10 also has the liquid crystal layer 5 and a pair of alignment layer 4 for inducing homogeneous alignment by directly coming into contact with the liquid crystal composition forming the liquid crystal layer 5 between the first transparent insulating substrate 2 and the second transparent insulating substrate 7, and the liquid crystal molecules in the liquid crystal composition are aligned to be substantially parallel with respect to the substrates 2 and 7 when no voltage is applied. As shown in FIG. 1 and FIG. 3, the first substrate 2 and the second substrate 7 may be interposed between a pair of polarizing plates 1 and 8. Furthermore, in FIG. 1, a color filter 6 is provided between the second substrate 7 and the alignment layer 4.

That is, the liquid crystal display 10 according to the present invention is formed by sequentially laminating the first polarizing plate 1, the first substrate 2, the electrode layer 3 including a thin film transistor, the alignment layer 4, the liquid crystal layer 5 including a liquid crystal composition, the alignment layer 4, the color filter 6, the second substrate 7, and the second polarizing plate 8. As the first substrate 2 and the second substrate 7, it is possible to use a transparent material having flexibility such as glass or plastic, and one substrate may be an opaque material such as silicon. The two substrates 2 and 7 are bonded together by a sealing material and a sealant such as an epoxy type thermosetting composition or the like disposed in the peripheral region and, in order to maintain the distance between the substrates, for example, a granular spacer such as glass particles, plastic particles, alumina particles or the like or a spacer column made of a resin formed by a photolithography method may be disposed therebetween.

FIG. 2 is an enlarged plan view of a region surrounded by the II line of the electrode layer 3 formed on the substrate 2 in FIG. 1. FIG. 3 is a cross-sectional view of the liquid crystal display shown in FIG. 1 taken along the line III-III in FIG. 2. As shown in FIG. 2, the electrode layer 3 including the thin film transistor formed on the surface of the first substrate 2 includes a plurality of gate bus lines 26 for supplying scanning signals and a plurality of data bus lines 25 for supplying display signals, which are disposed in a matrix shape to cross each other. Note that, in FIG. 2, only a pair of gate bus lines 25 and a pair of data bus lines 24 are shown.

A region surrounded by the plurality of gate bus lines 26 and the plurality of data bus lines 25 forms a unit pixel of the liquid crystal display device, and a pixel electrode 21 and a common electrode 22 are formed in the unit pixel. Thin film transistors including a source electrode 27, a drain electrode 24, and a gate electrode 28 are provided in the vicinity of the intersections where the gate bus lines 26 and the data bus lines 25 intersect each other. This thin film transistor is connected to the pixel electrode 21 as a switch element for supplying a display signal to the pixel electrode 21. In addition, a common line 29 is provided in parallel with the gate bus lines 26. This common line 29 is connected to the common electrode 22 in order to supply a common signal to the common electrode 22.

As shown in FIG. 3, a preferable aspect of the structure of the thin film transistor has, for example, a gate electrode 11 formed on the surface of the substrate 2, a gate insulating layer 12 provided so as to cover the gate electrode 11 and to cover substantially the entire surface of the substrate 2, a semiconductor layer 13 formed on the surface of the gate insulating layer 12 so as to oppose the gate electrode 11, a protective layer 14 provided so as to cover a part of the surface of the semiconductor layer 13, a drain electrode 16 provided so as to cover one side end section of the protective layer 14 and the semiconductor layer 13 and to come into contact with the gate insulating layer 12 formed on the substrate 2 surface, a source electrode 17 provided so as to cover the other side end portion of the protective layer 14 and the semiconductor layer 13 and to come into contact with the gate insulating layer 12 formed on the substrate 2 surface, and an insulating protective layer 18 provided so as to cover the drain electrode 16 and the source electrode 17. An anodic oxide coating (not shown) may be formed on the surface of the gate electrode 11 for a reason such as eliminating a step difference with the gate electrode.

For the semiconductor layer 13, it is possible to use amorphous silicon, polycrystalline polysilicon or the like and when a transparent semiconductor film such as ZnO, IGZO (In—Ga—Zn—O), ITO or the like is used, it is possible to suppress adverse effects on the light carrier caused by light absorption, which is preferable from the viewpoint of increasing the opening ratio of the display.

Furthermore, for the purpose of reducing the width and the height of the Schottky barrier, an ohmic contact layer 15 may be provided between the semiconductor layer 13 and the drain electrode 16 or the source electrode 17. For the ohmic contact layer, it is possible to use a material obtained by adding an impurity such as phosphorus such as n-type amorphous silicon or n-type polycrystalline polysilicon at a high concentration.

The gate bus lines 26, the data bus lines 25 and the common line 29 are preferably metal films, more preferably Al, Cu, Au, Ag, Cr, Ta, Ti, Mo, W, Ni or an alloy thereof, and a wiring of Al or an alloy thereof is particularly preferably used. In addition, the insulating protective layer 18 is a layer having an insulating function, and is formed of silicon nitride, silicon dioxide, a silicon oxynitride film, or the like.

In the embodiment shown in FIGS. 2 and 3, the common electrode 22 is a flat plate-shaped electrode formed on substantially the entire surface of the gate insulating layer 12, while the pixel electrode 21 is a comb shaped electrode formed on the insulating protective layer 18 covering the common electrode 22. That is, the common electrode 22 is disposed at a position closer to the first substrate 2 than the pixel electrode 21, and these electrodes are disposed to overlap with the insulating protective layer 18 interposed therebetween. The pixel electrode 21 and the common electrode 22 are formed of a transparent conductive material such as Indium Tin Oxide (ITO), Indium Zinc Oxide (IZO), Indium Zinc Tin Oxide (IZTO), or the like. Since the pixel electrode 21 and the common electrode 22 are formed of a transparent conductive material, the area to be opened in the unit pixel area is increased, and the opening ratio and the transmittance are increased.

In order to form a fringe electric field between the electrodes, the pixel electrode 21 and the common electrode 22 are formed such that an inter-electrode distance R in the horizontal direction on the substrate between the pixel electrode 21 and the common electrode 22 is smaller than the distance G between the first substrate 2 and the second substrate 7. Note that, the inter-electrode distance R represents the horizontal direction distance between the electrodes on the substrate. FIG. 3 shows an example in which, since the flat, plate-shaped common electrode 22 and the comb-shaped pixel electrode 21 are overlapped with each other, the inter-electrode distance R=0, and since the inter-electrode distance R is smaller than the distance (that is, cell gap) G between the first substrate 2 and the second substrate 7, the fringe electric field E is formed. Accordingly, in the FFS type liquid crystal display, it is possible to use a horizontal electric field formed in a direction perpendicular with respect to a line forming the comb shape of the pixel electrode 21 and a parabolic electric field. The electrode width l of the comb-shaped portion of the pixel electrode 21 and the width m of the gap of the comb-shaped portion of the pixel electrode 21 are preferably formed at a width such that all the liquid crystal molecules in the liquid crystal layer 5 are able to be driven by the generated electric field.

From the viewpoint of preventing the leakage of light, it is preferable that the color filter 6 forms a black matrix shape (not shown) in a portion corresponding to the thin film transistor and a storage capacitor 23.

On the electrode layer 3 and the color filter 6, a pair of alignment layer 4 directly coming into contact with the liquid crystal composition forming the liquid crystal layer 5 to induce homogeneous alignment are provided. The alignment layer 4 is, for example, a polyimide film subjected to a rubbing treatment, and the alignment directions of each alignment layer are in parallel. Here, the rubbing direction (alignment direction of the liquid crystal composition) of the alignment layer 4 in the present embodiment will be described using FIG. 4. FIG. 4 is a diagram schematically showing the alignment direction of the liquid crystal induced by the alignment layer 4. In the present invention, a liquid crystal composition having negative dielectric anisotropy is used. Accordingly, when the direction perpendicular to the line forming the comb shape of the pixel electrode 21 (the direction in which the horizontal electric field is formed) is an x axis, the angle θ formed by the x axis and the major axis direction of the liquid crystal molecules 30 is preferably aligned to be approximately 0 to 45°. In the example shown in FIG. 3, an example is shown in which the angle θ between the x axis and the major axis direction of the liquid crystal molecules 30 is approximately 0°. The reason why the alignment direction of the liquid crystal is induced is to increase the maximum transmittance of the liquid crystal display device.

In addition, the polarizing plate 1 and the polarizing plate 8 are able to be adjusted such that the viewing angle and contrast are favorable by adjusting the polarizing axes of the respective polarizing plates, and it is preferable to have transmission axes orthogonal to each other such that these transmission axes are operated in a normally black mode. In particular, it is preferable that any one of the polarizing plate 1 and the polarizing plate 8 be disposed so as to have a transmission axis parallel to the alignment direction of the liquid crystal molecules 30. In addition, it is preferable to adjust the product of the refractive index anisotropy Δn of the liquid crystal and a cell thickness d so that the contrast is maximized. Furthermore, it is also possible to use a retardation film for widening the viewing angle.

In the FFS type liquid crystal display 10 formed as described above, by supplying an image signal (voltage) to the pixel electrode 21 via the thin film TFT, a fringe electric field is formed between the pixel electrode 21 and the common electrode 22 and the liquid crystal is driven by this electric field. That is, in a state in which no voltage is applied, the liquid crystal molecules 30 are disposed such that the major axis direction thereof is parallel to the alignment direction of the alignment layer 4. When a voltage is applied, an equipotential line of a parabolic electric field is formed between the pixel electrode 21 and the common electrode 22 up to the upper portion of the pixel electrode 21 and the common electrode 22, and the liquid crystal molecules 30 in the liquid crystal layer 5 rotate in the liquid crystal layer 5 along the formed electric field. In the present invention, since the liquid crystal molecules 30 having negative dielectric anisotropy are used, the major axis direction of the liquid crystal molecules 30 rotates so as to be orthogonal to the generated electric field direction. The liquid crystal molecules 30 positioned near the pixel electrode 21 are susceptible to the influence of the fringe electric field, but the liquid crystal molecules 30 having the negative dielectric anisotropy have a polarization direction on the minor axis of the molecule, the major axis direction does not rotate in the direction orthogonal with respect to the alignment layer 4 and the major axis direction of all of the liquid crystal molecules 30 in the liquid crystal layer 5 is able to be maintained in a parallel direction with respect to the alignment layer 4. Accordingly, in comparison with an FFS type liquid crystal display using the liquid crystal molecules 30 having positive dielectric anisotropy, it is possible to obtain excellent transmittance characteristics.

The FFS type liquid crystal display described with reference to FIG. 1 to FIG. 4 is merely an example and various other embodiments are possible as long as these embodiments do not depart from the technical idea of the present invention. For example, FIG. 5 is another example of a plan view enlarging a region surrounded by the II line of the electrode layer 3 formed on the substrate 2 in FIG. 1. As shown in FIG. 5, the pixel electrode 21 may be formed to have a slit. In addition, the slit pattern may be formed so as to have an inclination angle with respect to the gate bus lines 26 or the data bus lines 25.

In addition, FIG. 6 is another example of a cross-sectional view of the liquid crystal display shown in FIG. 1 taken along the line III-III in FIG. 2. In the example shown in FIG. 6, the common electrode 22 having a comb shape or a slit is used, and the inter-electrode distance in the horizontal direction on the substrate of the pixel electrode 21 and the common electrode 22 is R=α. Furthermore, an example is given in FIG. 3 in which the common electrode 22 is formed on the gate insulating film 12; however, as shown in FIG. 6, the common electrode 22 may be formed on the first substrate 2 and the pixel electrode 21 may be provided via the gate insulating film 12. The electrode width l of the pixel electrode 21, the electrode width n of the common electrode 22, and the inter-electrode distances R are preferably appropriately adjusted to a width such that all the liquid crystal molecules in the liquid crystal layer 5 can be driven by the generated electric field.

In addition, as shown in FIG. 7, a pixel electrode 41 and a common electrode 42 may be provided in a state of being meshed while spaced apart on the same surface. Also in the FFS type display having the structure shown in FIG. 7, the inter-electrode distance R in the horizontal direction on the substrate is formed to be smaller than the distance G between the first substrate 2 and the second substrate 7.

Since the FFS mode liquid crystal display according to the present invention uses a specific liquid crystal composition, it is possible to achieve both a high-speed response and suppression of display failure at the same time.

In addition, in the FFS mode liquid crystal display, when injecting the liquid crystal layer 5 between the first substrate 2 and the second substrate 7, for example, a vacuum injection method, one drop fill (ODF) method, or the like is performed; however, in the present invention, in the ODF method, it is possible to suppress the occurrence of drip marks when the liquid crystal composition is dropped onto the substrate. Note that, a drip mark is defined as a phenomenon in which a white trace appears where the liquid crystal composition is dropped when black is displayed.

Although the occurrence of drip marks is greatly affected by the liquid crystal material to be injected, the occurrence of drip marks is also unavoidably influenced by the configuration of the displays. In the FFS mode liquid crystal display, for the thin film transistor formed in the display, the pixel electrode 21 having a comb shape or a slit, and the like, since there is no member separating the liquid crystal composition except for the thin alignment layer 4 or the thin alignment layer 4, the thin insulating protective layer 18, and the like, there is a high possibility that it is not possible to completely block the ionic substance, and it is not possible to avoid the generation of drip marks due to the interaction between the metal material forming the electrode and the liquid crystal composition; however, by using a combination of the liquid crystal composition of the present invention in an FFS type liquid crystal display, the occurrence of drip marks is able to be effectively suppressed.

In addition, in the manufacturing steps of the liquid crystal display using the ODF method, it is necessary to drop an optimum liquid crystal injection amount according to the size of the liquid crystal display; however, for the liquid crystal composition of the present invention, for example, since the influence with respect to sudden pressure changes or impacts in the dripping apparatus generated when dripping the liquid crystal is small and it is possible to continue stably dripping the liquid crystal over a long period, it is also possible to keep the yield of the liquid crystal display high. In particular, for small liquid crystal displays frequently used in smartphones which have recently come into wide use, control of the deviations from an optimum value within a certain range is itself difficult due to the optimum liquid crystal injection amount being small; however, by using the liquid crystal composition of the present invention, it is possible to realize a stable discharging amount of the liquid crystal material even in small liquid crystal displays.

EXAMPLES

Hereinafter, the present invention will be described in more detail with examples, and the present invention is not limited to the examples. In addition, "%" in the compositions of the following examples and Comparative Examples means "% by mass".

In the examples, the measured characteristics are as follows.

$T_{NI}$: nematic phase-isotropic liquid phase transition temperature (° C.)

$\Delta n$: refractive index anisotropy at 25° C.

$\Delta\epsilon$: dielectric anisotropy at 25° C.

$\eta$: viscosity (mPa·s) at 20° C.

$\gamma_1$: rotational viscosity (mPa·s) at 25° C.

VHR: voltage holding ratio (%) at 60° C. under the conditions of a frequency of 60 Hz and an applied voltage of 1 V.

Burn-in:

After displaying a predetermined fixed pattern in the display area for 1,000 hours, by visually inspecting the residual image level of the fixed pattern at the time when full screen was uniformly displayed, the evaluation of the burn-in on a liquid crystal display was performed on a scale of four stages described below.

A: Residual image was not observed

B: Residual image was very slightly observed, however it was an acceptable level C: Residual image was observed, and it was an unacceptable level D: Residual image was observed, and it was a very severe level Drip Marks:

By visually observing drip marks appearing in white when the entire screen was displayed in black, the evaluation of the drip marks on a liquid crystal display device was performed on a scale of four stages described below.

A: Residual image was not observed

B: Residual image was very slightly observed, however it was an acceptable level C: Residual image was observed, and it was an unacceptable level D: Residual image was observed, and it was a very severe level Process Adaptability:

In ODF process, dropping the liquid crystal by 50 pL at one time was performed 100,000 times using a constant volume measuring pump, and the change in amount of liquid crystal dropped each 100 times of the following "0 to 100 times, 101 to 200 times, 201 to 300 times, . . . , 99,901 to 100,000 times" was evaluated on a scale of four stages described below.

A: Change was extremely small (liquid crystal display could be stably produced)

B: Change was slightly observed, but it was an acceptable level

C: Change was observed, and it was an unacceptable level (yield was deteriorated by generation of spots)

D: Change was observed, and it was a very severe level (liquid crystal leakage or vacuum bubbles were generated)

Solubility at Low Temperatures:

After preparing a liquid crystal composition, 1 g of the liquid crystal composition was weighed and placed in a sample bottle of 2 mL, the temperature change having one cycle of "−20° C. (maintained for 1 hour)→heating (0.1° C./min)→0° C. (maintained for 1 hour)→heating (0.1° C./min)→20° C. (maintained for 1 hour)→cooling (−0.1° C./min)→0° C. (maintained for 1 hour)→cooling (−0.1° C./min)→−20° C." was continuously given thereto in a temperature controlled test chamber, the generation of precipitates from the liquid crystal composition was visually observed, and the solubility evaluation at low temperatures was performed on a scale of four stages described below.

A: Precipitates were not observed for equal to or longer than 600 hours.

B: Precipitates were not observed for equal to or longer than 300 hours.

C: Precipitates were observed within 150 hours.

D: Precipitates were observed within 75 hours.

Moreover, in the examples, the following abbreviations were used for describing the compounds.

(Side Chain)
-n —$C_nH_{2n+1}$ linear alkyl group having n carbon atoms
-On —$OC_nH_{2n+1}$ linear alkoxy group having n carbon atoms
-V —CH=$CH_2$ vinyl group
-Vn —CH=C—$C_nH_{2n+1}$ 1-alkene having (n+1) carbon atoms (Linking Group)
—$CF_2O$— —$CF_2$—O—
—$OCF_2$— —O—$CF_2$—
-1O— —$CH_2$—O—
—O1— —O—$CH_2$—
-2- —$CH_2$—$CH_2$—
—COO— —COO—

(Ring Structure)

[Chem. 62]

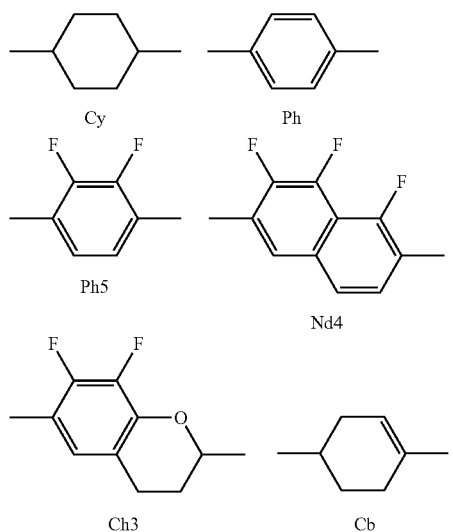

Cy, Ph, Ph5, Nd4, Ch3, Cb

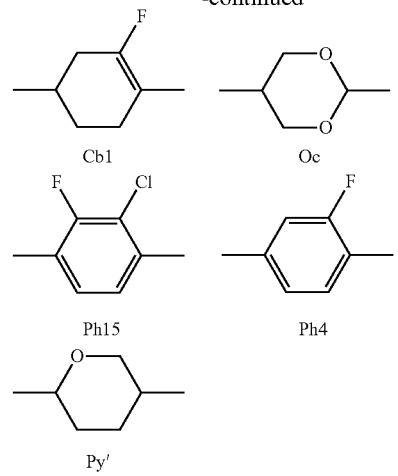

Cb1, Oc, Ph15, Ph4, Py'

Examples 1 to 9 (Liquid Crystal Compositions 1 to 9)

The liquid crystal composition (liquid crystal composition 1) having the compositional ratio described below was prepared, and the physical property values thereof were measured. The results are shown in the following table.

Using the liquid crystal compositions 1 to 9, the FFS mode liquid crystal display was produced having a cell thickness of 3.0 μm, which is general for TVs. The injection of the liquid crystal composition was carried out by a dripping method, and evaluations of burn-in, drip marks, process adaptability, and solubility at low temperature were carried out.

The references on the left side of the content are abbreviations of the compounds described above.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| $T_{NI}/°$ C. | 84.4 | 84.4 | 84.3 | 84.2 | 84.1 | 74.3 | 74.9 | 74.9 | 74.1 |
| Δn | 0.089 | 0.090 | 0.0892 | 0.0899 | 0.0896 | 0.0908 | 0.0908 | 0.0902 | 0.0895 |
| Δε | −3.9 | −4.0 | −4 | −4.01 | −3.98 | −3.92 | −3.99 | −3.91 | −3.89 |
| γ1/mPa·s | 122 | 122 | 151 | 123 | 119 | 119 | 115 | 109 | 105 |
| η/mPa·s | 16.2 | 15.9 | 19.2 | 16.2 | 15.9 | 16.2 | 15.6 | 15 | 14.8 |
| γ1/Δn² × 10⁻² | 15.3 | 15.2 | 19.0 | 15.2 | 14.8 | 14.4 | 13.9 | 13.4 | 13.1 |
| 3CyCyV | 20 | 30 | 10 | 25 | 37.5 | 11 | 20 | 29 | 39 |
| 3CyCyV1 | 7 | 5.5 | 7 | 6 |  | 7 | 7 | 5 |  |
| 2CyCyV1 | 14 | 6 | 5 | 8 |  | 15 | 13 | 5 |  |
| 5CyCyV |  |  | 21 |  |  | 7 |  |  |  |
| 3CyPhPh2 |  | 1 |  | 4 | 4 | 3 |  | 4 | 2 |
| VCyPhPh3 | 5 |  | 2 | 1.5 | 2 | 3 | 2 | 2 |  |
| 1VCyPhPh3 | 3.5 | 5 | 3 | 4 | 4.5 |  | 3 |  | 4 |
| 3Cy-1O—Ph5O1 | 1 | 3 | 5 |  |  | 4 | 5 | 4 | 2 |
| 3-Cy-1O—Ph5O2 | 8 | 7.5 | 6 | 9 | 9 | 8 | 9 | 8 | 10 |
| 1VCy-1O—Ph5O1 | 2 |  | 3 | 3 | 3 | 4 | 2 | 3 | 3 |
| 1VCy-1O—Ph5O2 | 4 | 4 |  | 5 | 5 | 4 | 4 | 5 | 5 |
| 2CyCy-1O—Ph5O2 | 7 | 8 | 7 | 7 | 6 | 6 | 7 | 7 | 8 |
| 3CyCy-1O—Ph5O2 | 10 | 12 | 9 | 10.5 | 12 | 9 | 10 | 10 | 8 |
| VCyCy-1O—Ph5O2 | 5 | 4 | 4 | 4 | 4 | 4 | 4 | 4 | 5 |
| VCyCy-1O—Ph5O3 | 4 | 3 | 4 | 4 | 4 | 4 | 4 | 4 | 4 |
| 1VCyCy-1O—Ph5O1 | 4 | 3 | 4 | 4 | 4 |  |  |  |  |
| 1VCyCy-1O—Ph5O2 | 4.5 | 5 | 4 | 4 | 4 | 4 | 4 | 4 | 4 |
| 3PhPh5Ph1 |  |  | 6 | 1 | 1 |  | 2 | 2 | 2 |
| 3PhPh5Ph2 | 1 | 3 |  |  |  | 7 | 4 | 4 | 4 |
| Initial voltage holding ratio | 99.5 | 99.6 | 99 | 99.3 | 99.6 | 99.2 | 99.6 | 99.6 | 99.5 |

TABLE 1-continued

|  | Example 1 | Example 2 | Example 3 | Example 4 | Example 5 | Example 6 | Example 7 | Example 8 | Example 9 |
|---|---|---|---|---|---|---|---|---|---|
| Voltage holding ratio % after 1 hour at 150° C. | 99.1 | 99.2 | 97.8 | 99 | 99.2 | 98.1 | 99.1 | 99.2 | 99.1 |
| Burn in evaluation | A | A | B | A | A | B | A | A | A |
| Drip trace | A | A | A | A | A | A | A | A | A |
| Process adaptability | A | A | A | A | A | A | A | A | A |
| Solubility at low temperature evaluation | A | A | C | A | A | C | A | A | A |

It was understood that the liquid crystal compositions 1 to 9 has a practical $T_{NI}$ range in terms of a liquid crystal composition for a TV, has a large Δε absolute value, a low q, and an optimum Δn. FFS mode liquid crystal displays were produced using the liquid crystal compositions 1 to 9 and evaluated for voltage holding ratio, burn-in, drip marks, process adaptability, and solubility at low temperature using the method described above, and the evaluation results were extremely excellent.

Comparative Examples 1 to 9

Vertically aligned liquid crystal displays (VA mode liquid crystal displays) having a cell thickness of 3.5 μm, which is general for TVs, were produced using liquid crystal compositions 1 to 9.

The transmittance, the contrast ratio, and the response speed were compared between the FFS mode liquid crystal displays produced in Examples 1 to 9 and the VA mode liquid crystal displays produced in Comparative Examples 1 to 9, respectively. The results are shown below. Note that, the transmittances of the liquid crystal displays of Examples 1 and 2 and Comparative Examples 1 and 2 are the values when the transmittance of the display before injection of the liquid crystal composition in each mode is taken as 100%.

TABLE 2

|  | Example 1 | Comparative Example 1 | Example 2 | Comparative Example 2 | Example 3 | Comparative Example 3 | Example 4 | Comparative Example 4 | Example 5 | Comparative Example 5 |
|---|---|---|---|---|---|---|---|---|---|---|
| Display mode | n-FFS | VA | n-FFS | VA | n-FFS | VA | n-FFS | VA | n-FFS | VA |
| Used liquid crystal composition | Liquid crystal composition 1 | | Liquid crystal composition 2 | | Liquid crystal composition 3 | | Liquid crystal composition 4 | | Liquid crystal composition 5 | |
| Maximum transmittance (%) | 92% | 88% | 93% | 89% | 92% | 89% | 92% | 89% | 93% | 88% |
| Contrast ratio | 548 | 483 | 562 | 497 | 596 | 528 | 560 | 495 | 545 | 491 |
| Response speed/ms | 5.3 | 8.5 | 5.2 | 8.4 | 6.2 | 9.8 | 5.3 | 8.6 | 5.2 | 8.5 |

TABLE 3

|  | Example 6 | Comparative Example 6 | Example 7 | Comparative Example 7 | Example 8 | Comparative Example 8 | Example 9 | Comparative Example 9 |
|---|---|---|---|---|---|---|---|---|
| Display mode | n-FFS | VA | n-FFS | VA | n-FFS | VA | n-FFS | VA |
| Used liquid crystal composition | Liquid crystal composition 6 | | Liquid crystal composition 7 | | Liquid crystal composition 8 | | Liquid crystal composition 9 | |
| Maximum transmittance (%) | 93% | 87% | 93% | 86% | 93% | 88% | 91% | 87% |
| Contrast ratio | 578 | 485 | 567 | 479 | 551 | 473 | 594 | 465 |
| Response speed/ms | 5.3 | 8.6 | 5.2 | 8.4 | 5.1 | 8.1 | 5 | 7.9 |

The FFS mode displays (Examples 1 to 9) produced using the liquid crystal compositions 1 to 9 exhibited excellent characteristics in all of the maximum transmittance, the contrast ratio and the response speed compared with the VA mode liquid crystal display (Comparative Examples 1 to 9) prepared using the same liquid crystal composition.

Examples 10 to 15 (Liquid Crystal Compositions 10 to 15)

Liquid crystal compositions (liquid crystal compositions 10 to 15) having the following composition designed to have an equivalent $T_{NI}$, an equivalent Δn value, and an equivalent 1A value to those of liquid crystal compositions 1 to 9 were prepared, and the physical property values thereof were measured. The results are shown in the following table.

Using the liquid crystal compositions 10 to 15, FFS mode liquid crystal displays were produced in the same manner as in Examples 1 to 9, and the results of evaluations of burn-in, drip mark, process adaptability, and solubility at low temperature are shown in the same table.

TABLE 4

|  | Example 10 | Example 11 | Example 12 | Example 13 | Example 14 | Example 15 |
|---|---|---|---|---|---|---|
| $T_{NI}/°C$ | 84.8 | 85.6 | 75.8 | 74.9 | 75.8 | 75.8 |
| Δn | 0.0898 | 0.0927 | 0.0897 | 0.0893 | 0.0906 | 0.0901 |
| Δε | −4 | −3.92 | −4 | −3.97 | −3.99 | −3.89 |
| γ1/mPa·s | 124 | 122 | 111 | 105 | 127 | 120 |
| η/mPa·s | 14.8 | 15.1 | 14.1 | 13.8 | 15.5 | 15 |
| γ1/Δn² × 10⁻² | 15.4 | 14.2 | 13.8 | 13.2 | 15.5 | 14.8 |
| 3CyCyV | 20.0 | 33.0 | 20.0 | 36.0 | 20.0 | 35 |
| 3CyCyV1 | 8 | 7 | 8 | 6 | 4 |  |
| 2CyCyV1 | 15 |  | 15 |  | 12 |  |
| 3CyPhPh2 | 4 | 5 | 3 | 3 | 4 | 5 |
| VCyPhPh3 | 6 | 8 | 6 | 6 | 6 | 6 |
| 3Cy-1O-Ph5O1 |  |  | 2 | 2 |  |  |
| 3-Cy-1O-Ph5O2 | 6 | 6 | 6 | 6 | 6 | 6 |
| 1VCy-1O-Ph5O2 |  |  | 2 | 2 |  |  |
| 2CyCy-1O-Ph5O2 | 9 | 8 | 8 | 8 | 8 | 8 |
| 3CyCy-1O-Ph5O2 | 14 | 14 | 13 | 13 | 8 | 8 |
| VCyCy-1O-Ph5O2 | 3 | 3 | 2 | 2 |  |  |
| VCyC-1O-Ph5O3 | 3 | 3 |  |  |  |  |
| 3PhPh5Ph2 | 3 | 2 | 4 | 4 | 3 | 3 |
| 3PhPh5O2 | 3 | 5 | 5 | 6 | 5 | 5 |
| 5PhPh5O2 | 3 | 3 | 3 | 3 | 3 | 3 |
| 3CyPy'Ph5O2 | 3 | 3 | 3 | 3 | 3 | 3 |
| 3Cy-2-Ph5O3 |  |  |  |  | 4 | 4 |
| 3Cy-2-Ph5O4 |  |  |  |  | 4 | 4 |
| 3CyCy-2-Ph5O3 |  |  |  |  | 5 | 5 |
| 3CyCy-2-Ph5O4 |  |  |  |  | 5 | 5 |
| Initial voltage holding ratio | 99.2 | 99.1 | 99.4 | 99.3 | 99.5 | 99.4 |
| Voltage holding ratio % after 1 hour at 150° C. | 98 | 98.4 | 98.8 | 98.7 | 99.1 | 99.1 |
| Burn in evaluation | A | A | A | A | A | A |
| Drip trace | A | A | A | A | A | A |
| Process adaptability | A | A | A | A | A | A |
| Solubility at low temperature evaluation | B | B | B | B | B | B |

It was understood that the liquid crystal compositions 10 to 15 has a practical $T_{NI}$ in terms of a liquid crystal composition for a TV, has a large GA absolute value, a low r, and an optimum Δn. FFS mode liquid crystal displays were produced using the liquid crystal compositions 10 to 15 in the same manner as Examples 1 to 9 and evaluated for voltage holding ratio, burn-in, drip marks, process adaptability, and solubility at low temperature using the method described above, and the evaluation results were practical in terms of a liquid crystal composition for TVs.

Comparative Examples 10 to 15

Using the liquid crystal compositions 10 to 15, VA mode liquid crystal displays were produced in the same manner as Comparative Examples 1 to 9.

The transmittance, the contrast ratio, and the response speed were compared between the FFS mode liquid crystal displays produced in Examples 10 to 15 and the VA mode liquid crystal displays produced in Comparative Examples 10 to 15, respectively. The results are shown below.

TABLE 5

|  | Example 10 | Comparative Example 10 | Example 11 | Comparative Example 11 | Example 12 | Comparative Example 12 |
|---|---|---|---|---|---|---|
| Display mode | n-FFS | VA | n-FFS | VA | n-FFS | VA |
| Used liquid crystal composition | Liquid crystal composition 10 | | Liquid crystal composition 11 | | Liquid crystal composition 12 | |
| Maximum transmittance (%) | 92% | 87% | 92% | 88% | 93% | 88% |
| Contrast ratio | 562 | 497 | 537 | 485 | 558 | 472 |
| Response speed/ms | 5.4 | 8.6 | 5.3 | 8.5 | 5.1 | 8 |

TABLE 6

|  | Example 13 | Comparative Example 13 | Example 14 | Comparative Example 14 | Example 15 | Comparative Example 15 |
|---|---|---|---|---|---|---|
| Display mode | n-FFS | VA | n-FFS | VA | n-FFS | VA |
| Used liquid crystal composition | Liquid crystal composition 13 | | Liquid crystal composition 14 | | Liquid crystal composition 15 | |
| Maximum transmittance (%) | 91% | 87% | 91% | 88% | 91% | 88% |
| Contrast ratio | 568 | 492 | 581 | 516 | 576 | 497 |
| Response speed/ms | 5.1 | 7.9 | 5.2 | 8.7 | 5.4 | 8.8 |

The FFS mode display (Examples 10 to 15) prepared using the liquid crystal compositions 10 to 15 exhibited excellent characteristics in all of the maximum transmittance, the contrast ratio and the response speed compared with the VA mode liquid crystal display (Comparative Examples 10 to 15) prepared using the same liquid crystal composition.

Examples 16 to 19 (Liquid Crystal Compositions 16 to 19)

Liquid crystal compositions (liquid crystal compositions 16 to 23) having the following composition designed to have an equivalent $T_{NI}$, an equivalent $\Delta n$ value, and an equivalent 1A value to those of liquid crystal compositions 1 to 9 were prepared, and the physical property values thereof were measured. The results are shown in the following table.

FFS mode liquid crystal displays were produced in the same manner as in Examples 1 to 9 using liquid crystal compositions 16 to 19 and the results of evaluating burn-in, drip marks, process adaptability, and solubility at low temperature are shown in the same table.

TABLE 7

|  | Example 16 | Example 17 | Example 18 | Example 19 |
|---|---|---|---|---|
| $T_{NI}/°C$ | 84.6 | 83.4 | 84.8 | 85.5 |
| $\Delta n$ | 0.0907 | 0.0907 | 0.0902 | 0.0908 |
| $\Delta \varepsilon$ | −4 | −4 | −4.04 | −4.05 |
| γ1/mPa · s | 125 | 124 | 122 | 121 |
| η/mPa · s | 16.8 | 17.8 | 18.6 | 19.1 |

TABLE 7-continued

|  | Example 16 | Example 17 | Example 18 | Example 19 |
|---|---|---|---|---|
| $\gamma1/\Delta n^2 \times 10^{-3}$ | 15.2 | 15.1 | 15.0 | 14.7 |
| 3CyCyV | 38.0 | 36.0 | 34.0 | 34.0 |
| VCyPhPh3 | 4 | 3 | 4 | 2 |
| 3Cy-1O—Ph5O1 | 3 | 3 | | |
| 3-Cy-1O—Ph5O2 | 9 | 8 | 5 | 1 |
| 2CyCy-1O—Ph5O2 | 4 | 2 | | |
| 3CyCy-1O—Ph5O2 | 10 | 11 | 4 | 1 |
| 1VCyCy-1O—Ph5O2 | 5 | | 4 | |
| 3CyPhPh5O2 | 5 | 5 | 4 | 6 |
| 3CyPhPh5O4 | 5 | 5 | 4 | 6 |
| 3CyPh5O2 | 4 | 2 | 7 | 6 |
| 3CyPh5O3 | | | 6.5 | 5 |
| 3CyPh5O4 | | | | 5 |
| VCyPh5O2 | | 5 | | |
| 2CyCyPh5O2 | 5 | 5 | 5.5 | 7 |
| 2CyCyPh5O3 | 4 | 5 | 5 | 7 |
| 3CyCyPh5O3 | | | 5 | 7 |
| 3CyCyPh5O4 | | 5 | 6 | 7 |
| 4CyCyPh5O2 | 4 | | 6 | 6 |
| VCyCyPh5O2 | | 5 | | |
| Initial voltage holding ratio | 99.6 | 99.5 | 99.5 | 99.6 |
| Voltage holding ratio % after 1 hour at 150° C. | 99.1 | 99.2 | 99.2 | 99.3 |
| Burn in evaluation | A | A | A | A |

TABLE 7-continued

|  | Example 16 | Example 17 | Example 18 | Example 19 |
|---|---|---|---|---|
| Drip trace | A | A | A | A |
| Process adaptability | A | A | A | A |
| Solubility at low temperature | A | A | A | C |

It was understood that the liquid crystal compositions 16 to 19 has a practical $T_{NI}$ in terms of a liquid crystal composition for a TV, has a large $\Delta\varepsilon$ absolute value, a low η, and an optimum Δn. FFS mode liquid crystal displays were produced using the liquid crystal compositions 16 to 19 in the same manner as Examples 1 to 9 and evaluated for voltage holding ratio, burn-in, drip marks, process adaptability, and solubility at low temperature using the method described above, and the evaluation results were practical in terms of a liquid crystal composition for TV.

Comparative Examples 16 to 19

VA mode liquid crystal displays were produced in the same manner as Comparative Examples 1 to 9 using liquid crystal compositions 16 to 19.

The transmittance, the contrast ratio, and the response speed were compared between the FFS mode liquid crystal displays produced in Examples 16 to 19 and the VA mode liquid crystal displays produced in Comparative Examples 16 to 19, respectively. The results are shown below.

TABLE 8

|  | Example 16 | Comparative Example 16 | Example 17 | Comparative Example 17 | Example 18 | Comparative Example 18 | Example 19 | Comparative Example 19 |
|---|---|---|---|---|---|---|---|---|
| Display mode | FFS | VA | FFS | VA | FFS | VA | FFS | VA |
| Used liquid crystal composition | Composition 16 | | Composition 17 | | Composition 18 | | Composition 19 | |
| Maximum transmittance (%) | 90 | 87 | 91 | 88 | 92 | 88 | 93 | 89 |
| Contrast ratio | 564 | 489 | 532 | 471 | 562 | 495 | 572 | 480 |
| Response speed/ms | 5.3 | 8.4 | 5.4 | 8.6 | 5.3 | 8.4 | 5.3 | 8.6 |

The FFS mode displays (Examples 16 to 19) produced using the liquid crystal compositions 16 to 19 exhibited excellent characteristics in all of the maximum transmittance, the contrast ratio and the response speed compared with the VA mode liquid crystal display (Comparative Examples 16 to 19) prepared using the same liquid crystal composition.

Examples 20 to 23 (Liquid Crystal Compositions 20 to 23)

Liquid crystal compositions (liquid crystal compositions 20 to 23) having the following composition designed to have an equivalent $T_{NI}$, an equivalent Δn value, and an equivalent Δε value to those of liquid crystal compositions 1 to 9 were prepared, and the physical property values thereof were measured. The results are shown in the following table.

FFS mode liquid crystal displays were produced in the same manner as in Examples 1 to 9 using liquid crystal compositions 20 to 23 and the results of evaluating burn-in, drip marks, process adaptability, and solubility at low temperature are shown in the same table.

TABLE 9

|  | Example 20 | Example 21 | Example 22 | Example 23 |
|---|---|---|---|---|
| $T_{NI}/°$ C. | 85.5 | 85.1 | 85.5 | 84.6 |
| Δn | 0.1053 | 0.1049 | 0.1054 | 0.1046 |
| Δε | −4.01 | −3.94 | −3.97 | −4.02 |
| γ1/mPa · s | 140 | 142 | 141 | 139 |
| η/mPa · s | 16.9 | 19.3 | 19.6 | 21.3 |
| γ1/Δn² × 10 | 12.6 | 12.9 | 12.7 | 12.7 |
| 3CyCyV | 35 | 30 | 31 | 30 |
| 3CyCyV1 | | | | |
| VCyPhPh3 | 5 | 5 | 3 | 3 |
| 1VCyPhPhV1 | | | | |
| 3Cy-1O—Ph5O | 3 | 4 | | |
| 3-Cy-1O—Ph5O | 12 | 7 | 6 | 3 |
| 1V-Cy-1O—Ph5O2 | | | | |
| 2CyCy-1O~Ph | 8 | 4 | | |
| 3CyCy-1O—Ph | 8 | 10 | 8 | |
| 1VCyCy-1O—P | 8 | | | 3 |
| 3PhPh5Ph2 | 6 | 7 | 5 | 4 |
| 1VPhPh5PhV1 | | | | |
| 3CyPhPh5O2 | 2 | 2 | | 2 |
| 3CyPhPh5O4 | 2 | 2 | | 2 |
| 2Ph-2-PhPh5 | 3 | 3 | 5 | 3 |
| 2Ph-2-PhPh5 | 3 | | 5 | 3 |
| 3PhPh5O2 | | | | 4 |
| 3CyPh5O2 | | 2 | | 4 |
| 3CyPh5O3 | | | 5 | 4 |
| 3CyPh5O4 | | | | 3 |
| VCyPh5O2 | | | 5 | 5 |
| 1VCyPh5O2 | | | | |
| 2CyCyPh5O2 | | 4 | 5 | 6 |
| 2CyCyPh5O3 | | 5 | 5 | 6 |
| 3CyCyPh5O3 | | | 5 | 6 |

TABLE 9-continued

|  | Example 20 | Example 21 | Example 22 | Example 23 |
|---|---|---|---|---|
| 3CyCyPh5O4 | 2 | 5 | 6 | 6 |
| 4CyCyPh5O2 | 3 | | | 6 |
| VCyCyPh5O2 | | 5 | 6 | |
| 3CyOcPh5O2 | | | | 2 |
| Initial voltage holding ratio | 99.4 | 99.5 | 99.6 | 99.4 |
| Voltage holding ratio % after 1 hour at 150° C. | 99 | 99.2 | 99.3 | 99 |
| Burn in evaluation | A | A | A | A |
| Drip trace | A | A | A | A |
| Process adaptability | A | A | A | A |
| Solubility at low temperature | A | A | A | C |

It was understood that the liquid crystal compositions 20 to 23 has a practical $T_{NI}$ in terms of a liquid crystal composition for a TV, has a large Δε absolute value, a low η, and an optimum Δn. FFS mode liquid crystal displays were produced using the liquid crystal compositions 20 to 23 in the same manner as Examples 1 to 9 and evaluated for voltage holding ratio, burn-in, drip marks, process adaptability, and solubility at low temperature using the method described above, and the evaluation results were practical in terms of a liquid crystal composition for TV.

Comparative Examples 20 to 23

VA mode liquid crystal displays were produced in the same manner as Comparative Examples 1 to 9 using liquid crystal compositions 20 to 23.

The transmittance, the contrast ratio, and the response speed were compared between the FFS mode liquid crystal displays produced in Examples 20 to 23 and the VA mode liquid crystal displays produced in Comparative Examples 20 to 23, respectively. The results are shown below.

TABLE 10

| | Example 20 | Comparative Example 20 | Example 21 | Comparative Example 21 | Example 22 | Comparative Example 22 | Example 23 | Comparative Example 23 |
|---|---|---|---|---|---|---|---|---|
| Display mode | FFS | VA | FFS | VA | FFS | VA | FFS | VA |
| Used liquid crystal composition | Composition 20 | | Composition 21 | | Composition 22 | | Composition 23 | |
| Maximum transmittance (%) | 90 | 88 | 92 | 89 | 92 | 88 | 93 | 89 |
| Contrast ratio | 568 | 476 | 596 | 493 | 595 | 497 | 588 | 481 |
| Response speed/ms | 5.2 | 8.1 | 5.2 | 8.0 | 5.3 | 8.1 | 5.1 | 8.2 |

The FFS mode displays (Examples 20 to 23) produced using the liquid crystal compositions 20 to 23 exhibited excellent characteristics in both of the maximum transmittance and the response speed compared with the VA mode liquid crystal display (Comparative Examples 20 to 23) prepared using the same liquid crystal composition.

REFERENCE SIGNS LIST 1, 8 POLARIZING PLATE
2 FIRST SUBSTRATE
3 ELECTRODE LAYER
4 ALIGNMENT LAYER
5 LIQUID-CRYSTAL LAYER
6 COLOR FILTER
7 SECOND SUBSTRATE
11 GATE ELECTRODE
12 GATE INSULATING LAYER
13 SEMICONDUCTOR LAYER
14 INSULATING LAYER
15 OHMIC CONTACT LAYER
16 DRAIN ELECTRODE
17 SOURCE ELECTRODE
18 INSULATING PROTECTIVE LAYER
21 PIXEL ELECTRODE
22 COMMON ELECTRODE
23 STORAGE CAPACITOR
25 DATA BUS LINE
27 SOURCE BUS LINE
29 COMMON LINE

The invention claimed is:

1. A liquid crystal display comprising:
   a first transparent insulating substrate and a second transparent insulating substrate, which are disposed so as to face each other;
   a liquid crystal layer containing a liquid crystal composition, which is interposed between the first substrate and the second substrate;
   for each pixel on the first substrate, a common electrode containing a transparent conductive material, a plurality of gate bus lines and data bus lines disposed in a matrix shape, a thin film transistor provided at an intersection between the gate bus lines and data bus lines, and a pixel electrode containing a transparent conductive material which is driven by the transistor; and
   alignment layers which induce homogeneous alignment between the liquid crystal layer and each of the first and second substrates,
   wherein an alignment direction of each alignment layer is parallel,
   a distance R between the pixel electrodes and the common electrode is smaller than a distance G between the first substrate and the second substrate so that the pixel electrodes and a common electrode form fringe electric fields therebetween,
   the common electrode is disposed closer to the first substrate than the pixel electrodes over nearly the entire surface of the first substrate, and
   the liquid crystal composition has negative dielectric anisotropy and contains one or more of compounds selected from the group of compounds represented by General Formula (i), General Formula (ii), and General Formula (iii) and one or more of compound selected from the compound represented by General Formula (IV):

[Chem. 1]

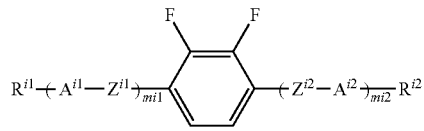

(i)

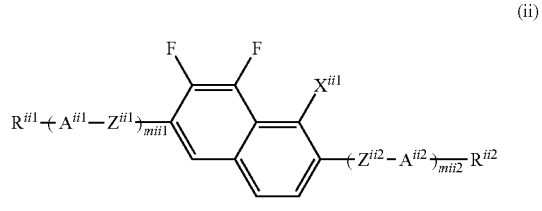

(ii)

-continued (iii)

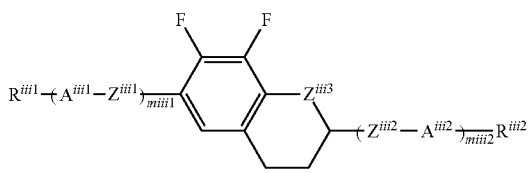

wherein $R^{i1}$, $R^{i2}$, $R^{ii1}$, $R^{ii2}$, $R^{iii1}$, and $R^{iii2}$ each independently represent an alkyl group having 1 to 10 carbon atoms, one or two or more non-adjacent —$CH_2$— in the alkyl group may each independently be substituted with —CH=CH—, —C≡C—, —O—, —CO—, —COO— or —OCO—, $A^{i1}$, $A^{i2}$, $A^{ii1}$, $A^{ii2}$, $A^{iii1}$, and $A^{iii2}$ each independently represent a group selected from the group consisting of (a) a 1,4-cyclohexylene group (one —$CH_2$— or two or more non-adjacent —$CH_2$— present in this group may be substituted with —O—), and (b) a 1,4-phenylene group (one —CH= or two or more non-adjacent —CH= present in the group may be substituted with —N=), (c) (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=), and group (a), group (b), and group (c) described above may each independently be substituted with a cyano group, a fluorine atom, or a chlorine atom, $Z^{i1}$, $Z^{i2}$, $Z^{ii1}$, $Z^{ii2}$, $Z^{iii1}$ and $Z^{iii2}$ each independently represent a single bond, —$OCH_2$—, —$CH_2O$—, —$OCF_2$—, —$CF_2O$—, —$CH_2CH_2$—, or —$CF_2CF_2$—, provided that at least one $Z^{i1}$ represents —$OCH_2$—, —$CH_2O$—, —$OCF_2$—, —$CF_2O$—, —$CH_2CH_2$—, or —$CF_2CF_2$—, $Z^{iii3}$ represents —$CH_2$— or an oxygen atom, $X^{iii1}$ represents a hydrogen atom or a fluorine atom, $m^{i1}$, $m^{i2}$, $m^{ii1}$, $m^{ii2}$, $m^{iii1}$, and $m^{iii2}$ each independently represent an integer of 0 to 3, $m^{i1}+m^{i2}$ is 0, 1, 2, or 3, provided that, in the case where $m^{i1}+m^{i2}$ is 1, 2, or 3, $m^{i1}$ represents 1, 2, or 3, and $m^{ii1}+m^{ii2}$ and $m^{iii1}+m^{iii2}$ are 1, 2, or 3, and in the case where there are a plurality of $A^{i1}$ to $A^{iii2}$ and $Z^{i1}$ to $Z^{iii2}$, these may be the same or different:

[Chem. 2]

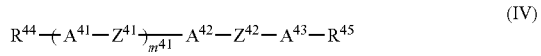

(IV)

wherein $R^{44}$ and $R^{45}$ each independently represent an alkyl group having 1 to 8 carbon atoms, and one or two or more of —$CH_2$— in the group may be substituted with —O—, —CH=CH—, —CO—, —OCO—, —COO—, —C≡C—, —$CF_2O$—, or —$OCF_2$— as long as the oxygen atoms are not directly adjacent to each other, one or two or more hydrogen atoms in the group may be each independently substituted with a fluorine atom or a chlorine atom, $A^{41}$ to $A^{43}$ each independently represent a group selected from the group consisting of (a) a 1,4-cyclohexylene group (one —$CH_2$— or two or more non-adjacent —$CH_2$— present in this group may be substituted with —O—), and (b) a 1,4-phenylene group (one —CH= or two or more non-adjacent —CH= present in the group may be substituted with —N=), (c) (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=), and group (a), group (b), and group (c) described above may each independently be substituted with a cyano group, a fluorine atom, or a chlorine atom, $Z^{41}$ and $Z^{42}$ each independently represent a single bond, —CH=CH—, —C≡C—, —$CH_2CH_2$—, —$(CH_2)_4$—, —$OCH_2$—, —$CH_2O$—, —$OCF_2$—, or —$CF_2O$—, $m^{41}$ represents an integer of 0 to 2, and in the case where a plurality of $A^{41}$ and $Z^{41}$ are present, these may be the same or different.

2. The liquid crystal display according to claim 1, further comprising one or more of compounds represented by General Formula (i-1) as General Formula (i):

[Chem. 3]

(i-1)

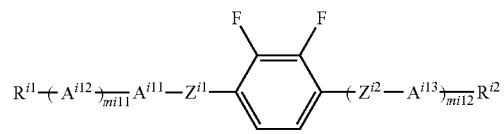

wherein $A^{i11}$, $A^{i12}$ and $A^{i13}$ each independently represent a 1,4-cyclohexylene group or a 1,4-phenylene group, but one —$CH_2$— or two or more non-adjacent —CH— present in the 1,4-cyclohexylene group may be substituted with —O— or —S—, one hydrogen atom present in the 1,4-phenylene group may be independently substituted with a fluorine atom or a chlorine atom, $m^{i11}$ and $m^{i12}$ each independently represent 0 or 1, and $R^{i1}$, $R^{i2}$, $Z^{i1}$, and $Z^{i2}$ each independently represent the same meaning as $R^{i1}$, $R^{i2}$, $Z^{i1}$, and $Z^{i2}$ in General Formula (i).

3. The liquid crystal display according to claim 1 or claim 2, further comprising one or more of compounds represented by General Formula (IV-1) as a compound represented by General Formula (IV):

[Chem. 4]

(IV-1)

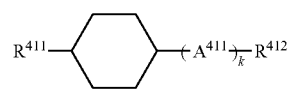

wherein $R^{411}$ and $R^{412}$ each independently represent an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, $A^{411}$ represents a 1,4-phenylene group or a trans-1,4-cyclohexylene group, k represents 1 or 2, and in the case where k is 2, two $A^{411}$'s may be the same or different.

4. The liquid crystal display according to claim 3, further comprising one or more of compounds represented by General Formula (IV-1a) as a compound represented by General Formula (IV-1):

[Chem. 5]

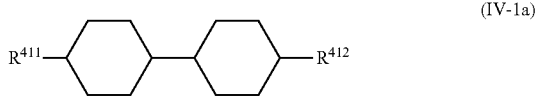

(IV-1a)

wherein $R^{411}$ and $R^{412}$ each independently represent the same meanings as $R^{411}$ and $R^{412}$ in General Formula (IV-1).

5. The liquid crystal display according to any one of claims 1 to 4, further comprising one or more of compounds selected from a group of compounds represented by General Formula (LC6)

[Chem. 6]

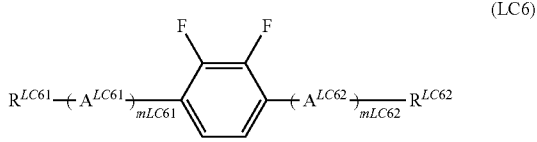

(LC6)

wherein $R^{LC61}$ and $R^{LC62}$ each independently represent an alkyl group having 1 to 8 carbon atoms, one —$CH_2$— or two or more non-adjacent —$CH_2$— present in the alkyl group may each independently be substituted with —CH=CH—, —CC—, —O—, —CO—, —COO— or —OCO—, $A^{LC61}$ and $A^{LC62}$ each independently represent a group selected from the group consisting of (a) a 1,4-cyclohexylene group (one —$CH_2$— or two or more non-adjacent —$CH_2$— present in this group may be substituted with —O—), (b) a 1,4-phenylene group (one —CH= or two or more non-adjacent —CH= present in the group may be substituted with —N=) and (c) a naphthalene-2,6-diyl group, a 1,2,3,4-tetrahydronaphthalene-2,6-diyl group or a decahydronaphthalene-2,6-diyl group (one —CH= or two or more non-adjacent —CH= present in the naphthalene-2,6-diyl group or the 1,2,3,4-tetrahydronaphthalene-2,6-diyl group may be substituted with —N=); and group (a), group (b), and group (c) described above may each independently be substituted with a cyano group, a fluorine atom, or a chlorine atom, $m^{LC61}$ and $m^{LC62}$ each independently represent an integer of 0 to 3, $m^{LC61}+m^{LC62}$ is 1, 2 or 3, and in the case where there are a plurality of $A^{LC61}$ and $A^{LC62}$ these may be the same or different.

6. The liquid crystal display according to any one of claims 1 to 5, wherein the pixel electrode has a comb shape or has a slit.

7. The liquid crystal display according to any one of claims 1 to 6, wherein the inter-electrode distance R is zero.

8. A liquid crystal display using a liquid crystal composition obtained by mixing an additive with the liquid crystal composition according to any one of claim 1 to claim 7.

* * * * *